United States Patent
Suzuki et al.

(10) Patent No.: US 7,989,105 B2
(45) Date of Patent: Aug. 2, 2011

(54) BATTERY PACK

(75) Inventors: Fumihiko Suzuki, Fukushima (JP);
Osamu Takahashi, Miyagi (JP);
Hiroyuki Yamada, Fukushima (JP);
Kazuo Togashi, Fukushima (JP); Toru Ishii, Fukushima (JP); Takayuki Yamahira, Fukushima (JP)

(73) Assignee: Sony Corporation, Tokyo (JP)

( * ) Notice: Subject to any disclaimer, the term of this patent is extended or adjusted under 35 U.S.C. 154(b) by 1273 days.

(21) Appl. No.: 11/334,217

(22) Filed: Jan. 17, 2006

(65) Prior Publication Data

US 2006/0166089 A1   Jul. 27, 2006

(30) Foreign Application Priority Data

Jan. 21, 2005 (JP) .................... P2005-013862
Jan. 21, 2005 (JP) .................... P2005-013863
Jan. 21, 2005 (JP) .................... P2005-014616
Jan. 21, 2005 (JP) .................... P2005-014758

(51) Int. Cl.
*H01M 2/08* (2006.01)
*H01M 6/12* (2006.01)
*H01M 6/46* (2006.01)
*H01M 2/02* (2006.01)

(52) U.S. Cl. ........ 429/185; 429/162; 429/163; 429/177; 429/178

(58) Field of Classification Search .......... 429/122–347; 29/623.1–623.5
See application file for complete search history.

(56) References Cited

U.S. PATENT DOCUMENTS

| | | | | |
|---|---|---|---|---|
| 6,080,508 A | * | 6/2000 | Dasgupta et al. | 429/127 |
| 7,262,956 B2 | * | 8/2007 | Suzuki et al. | 361/679.01 |
| 7,556,885 B2 | * | 7/2009 | Yamada et al. | 429/163 |
| 2003/0180582 A1 | * | 9/2003 | Masumoto et al. | 429/7 |
| 2005/0136324 A1 | * | 6/2005 | Yamada et al. | 429/175 |
| 2005/0181242 A1 | * | 8/2005 | Suzuki et al. | 429/7 |

FOREIGN PATENT DOCUMENTS

| | | | |
|---|---|---|---|
| EP | 1473785 A2 | * | 11/2004 |
| JP | 2002-260608 | | 9/2002 |
| JP | 2002-260621 | | 9/2002 |
| JP | 2003151646 A | * | 5/2003 |
| KR | 1020030096718 | * | 12/2003 |

OTHER PUBLICATIONS

Machine Translation of JP 2003151646 to Takahashi originally published May 2003.*
Machine Translation of KR 1020030096718 to Kim et al originally published Dec. 2003.*

* cited by examiner

*Primary Examiner* — Basia Ridley
*Assistant Examiner* — Jonathan G Leong
(74) *Attorney, Agent, or Firm* — K&L Gates LLP

(57) ABSTRACT

A battery pack is provided. For example, the battery pack includes a box-shaped or plate-shaped battery pack. The battery pack has a hard outer jacket member, a box-shaped or plate-shaped battery element, a cover, and a circuit board. The hard outer jacket member has a first opening and a second opening formed at both ends. The box-shaped or plate-shaped battery element is contained in the outer jacket member and has electrode terminals. The cover is molded from resin and is fitted to the first opening. The circuit board is connected to the electrode terminal leads and contained in the cover. At least the electrode terminal leads extends from the first opening. The cover has concave portions on both ends of one longer side. The outer jacket member has cut portions that expose at least the concave portions of the cover. At least a longer side of the cover and the outer jacket member are heat-adhered.

6 Claims, 50 Drawing Sheets

Fig. 7A
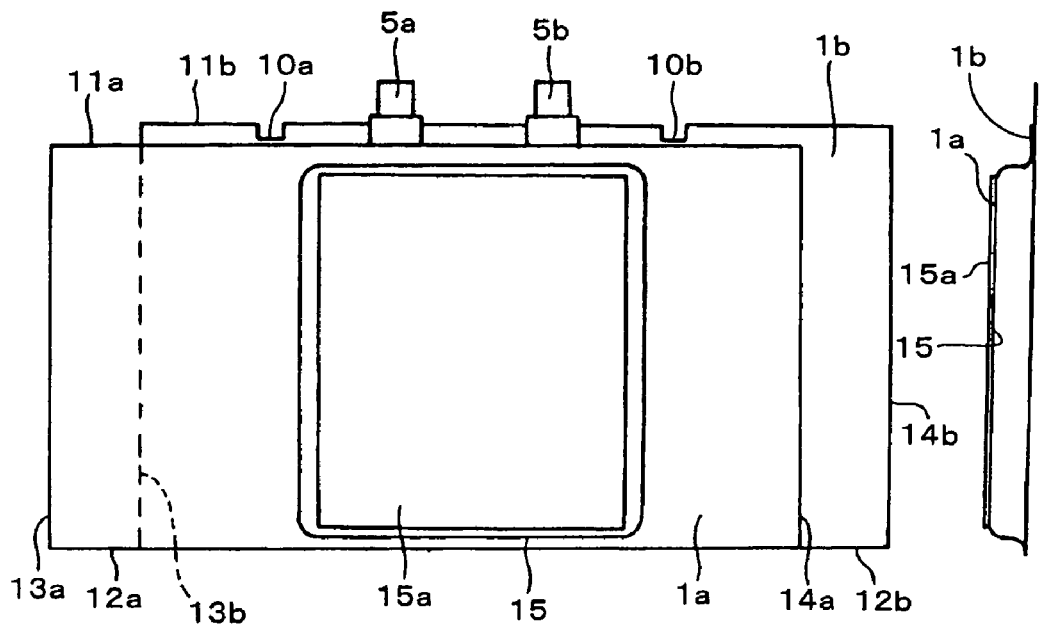
Fig. 7B
Fig. 7C
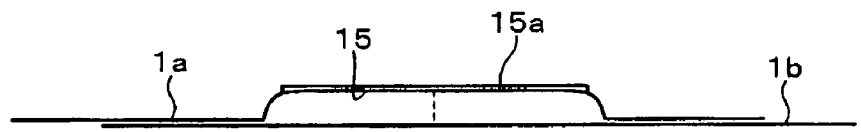

Fig. 14
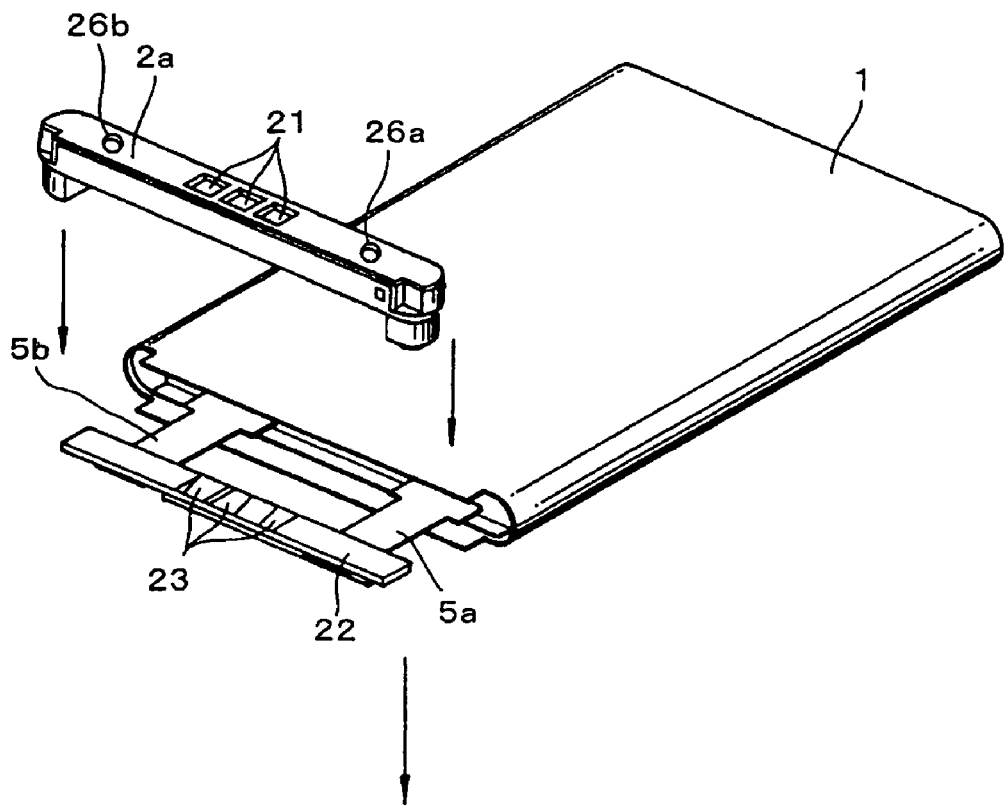
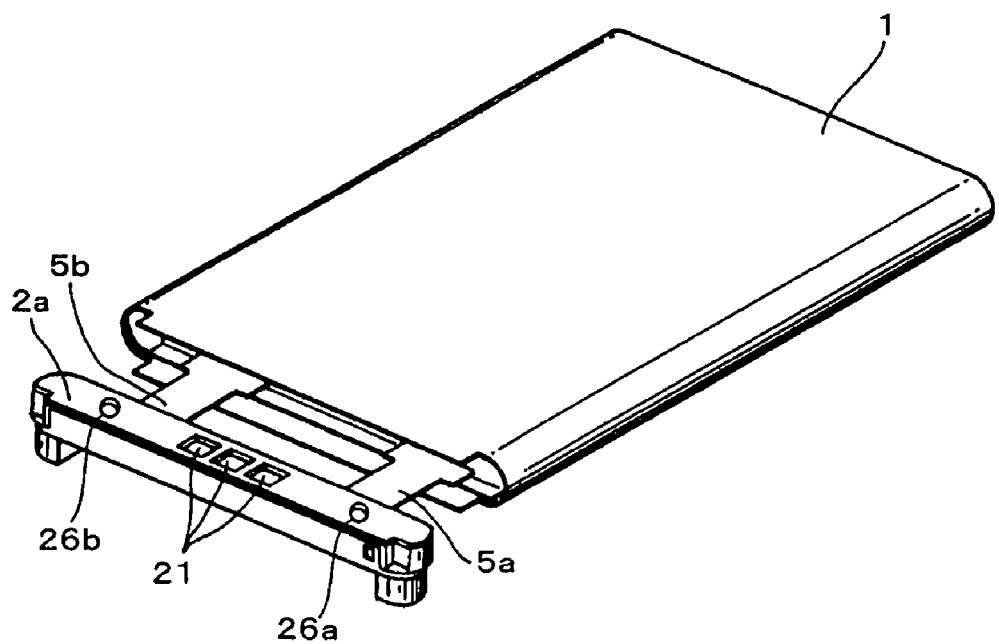

Fig. 15
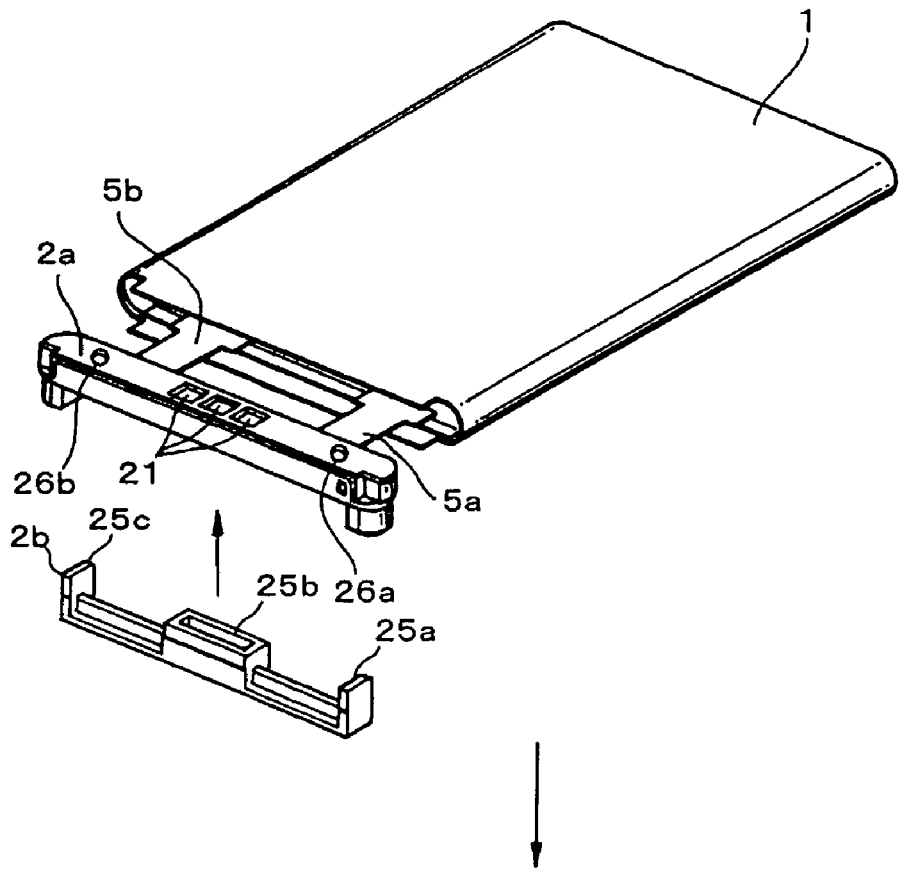
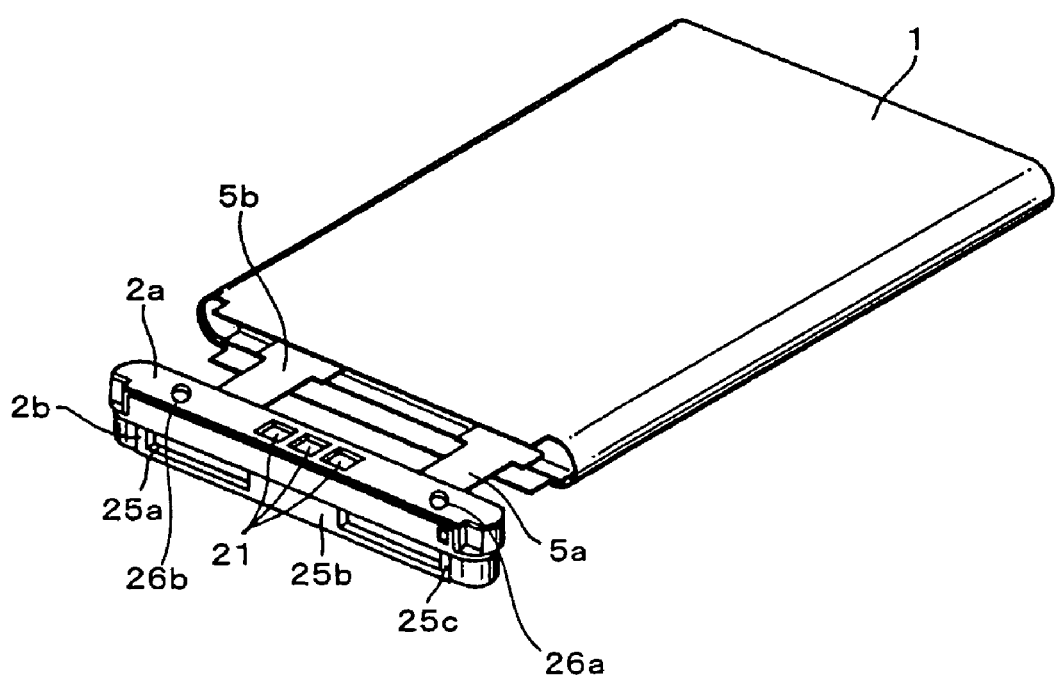

Fig. 23
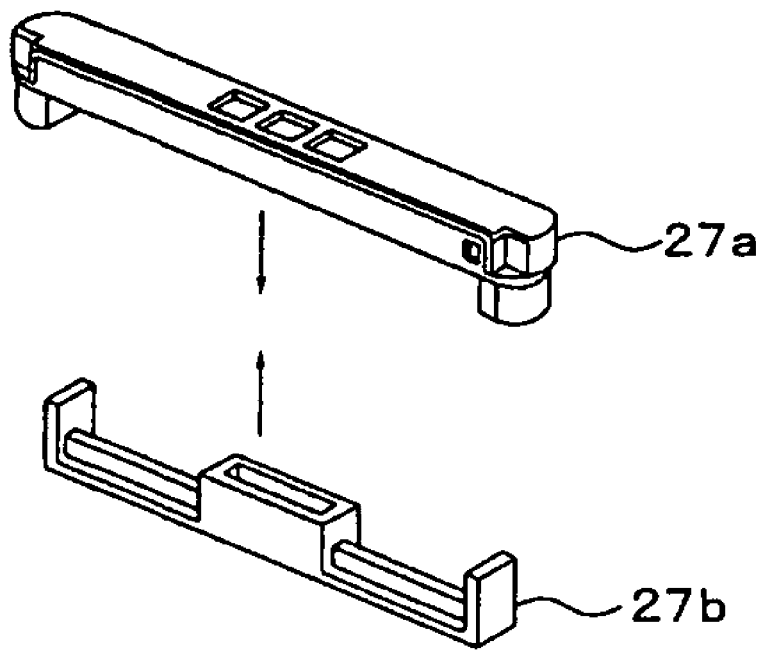
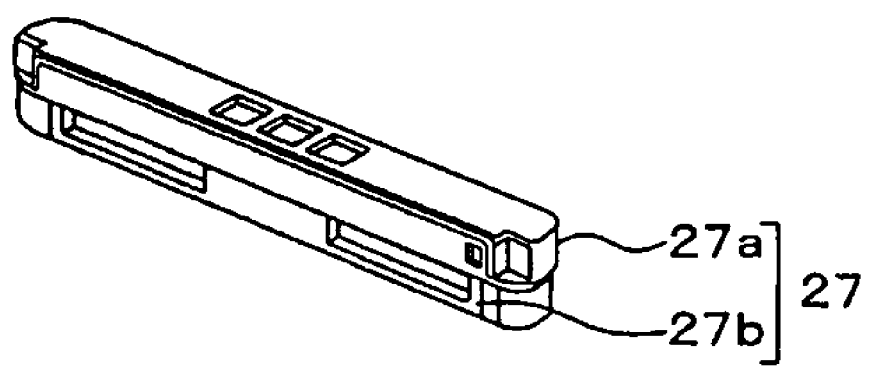

Fig. 26
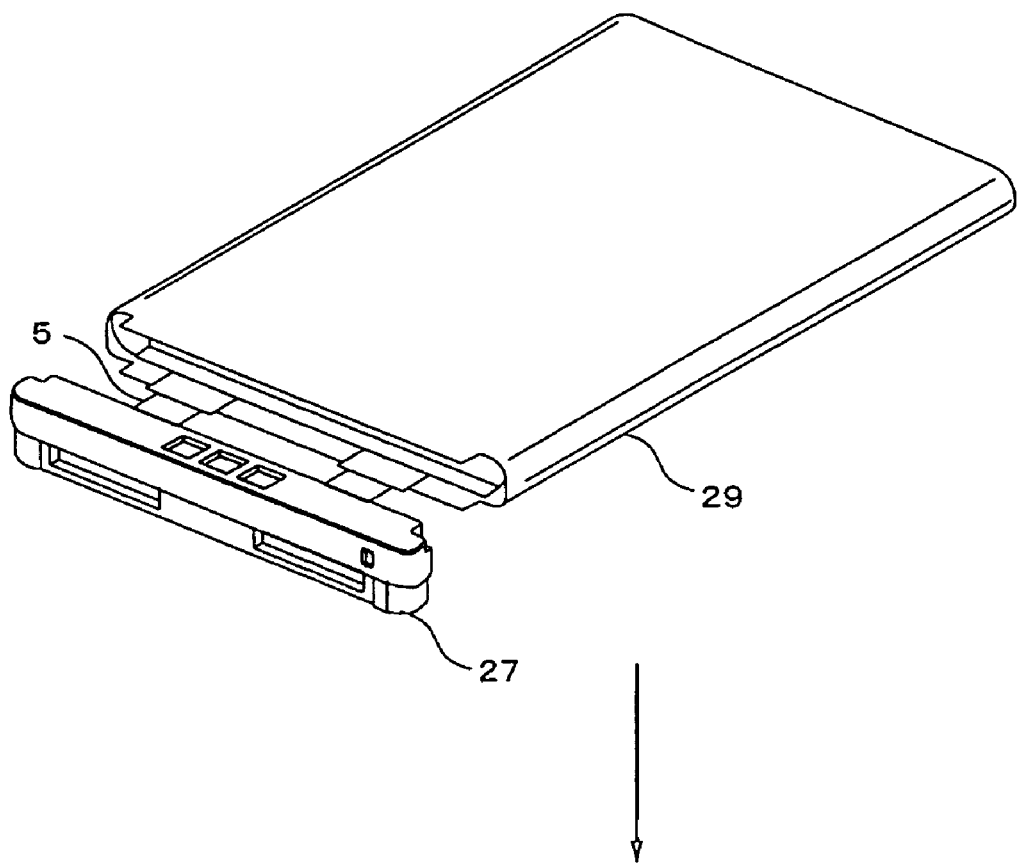
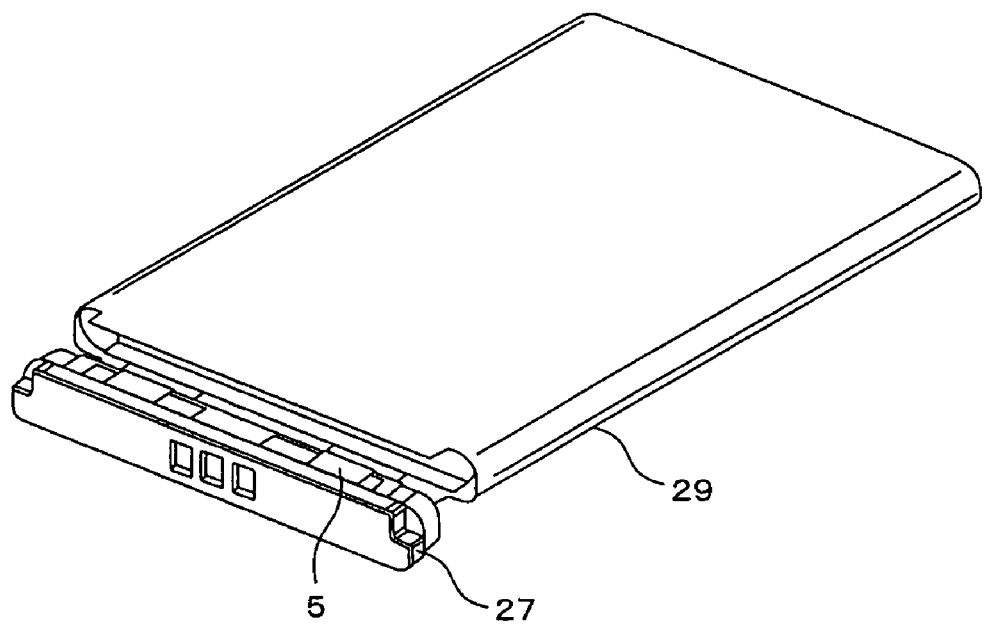

Fig. 33
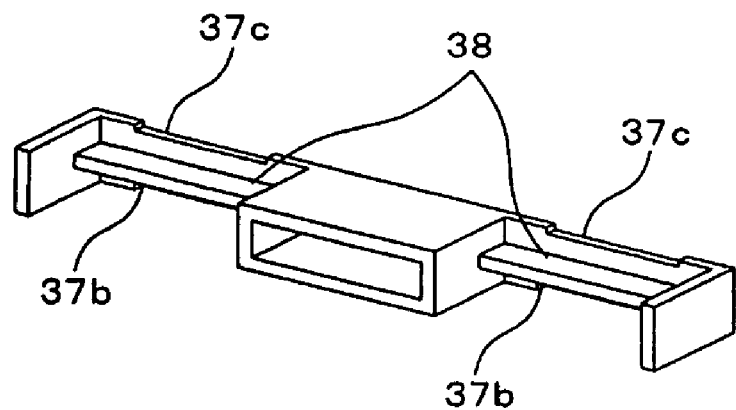
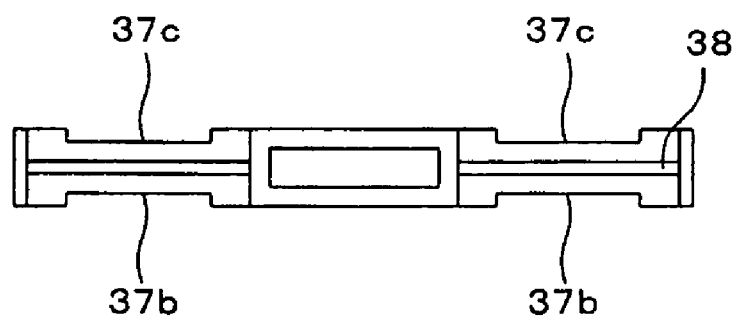
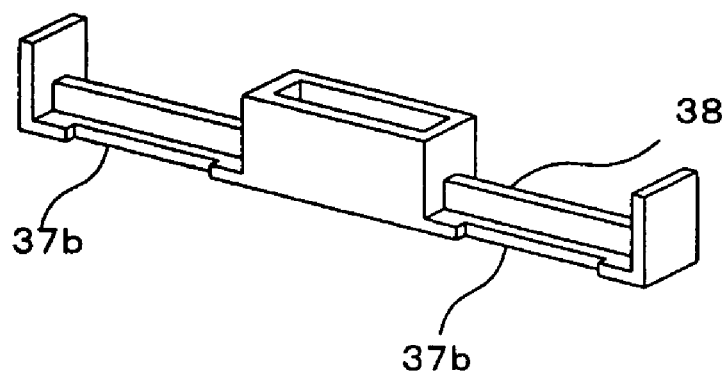

Fig. 40
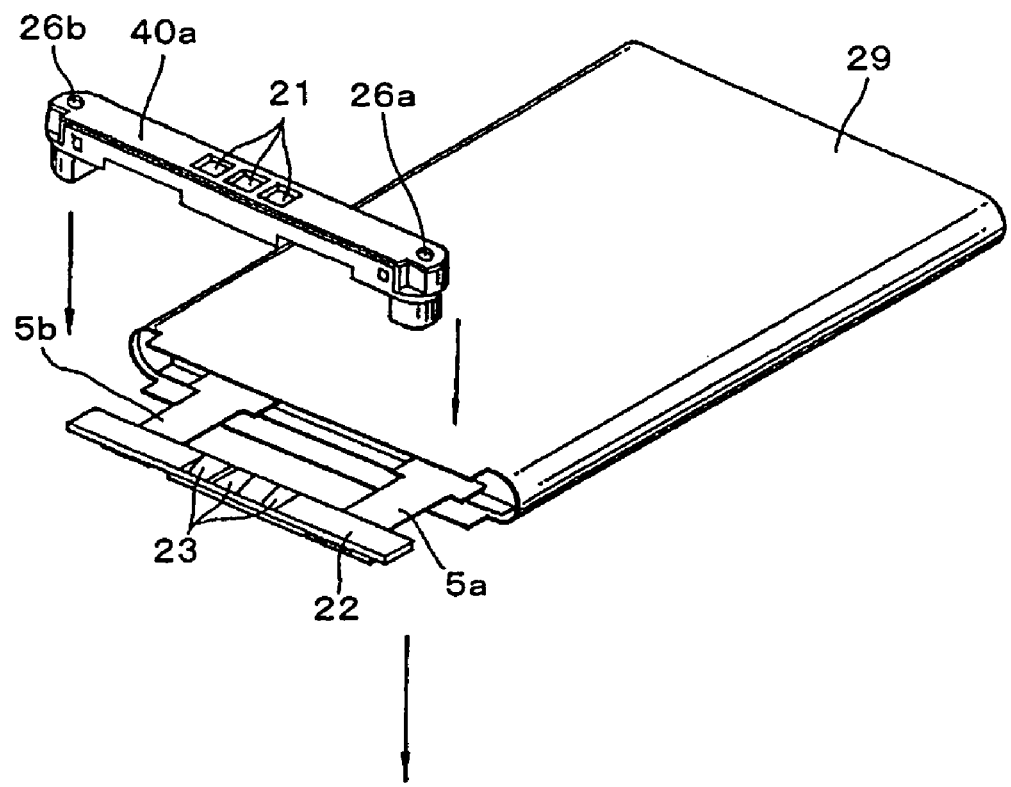
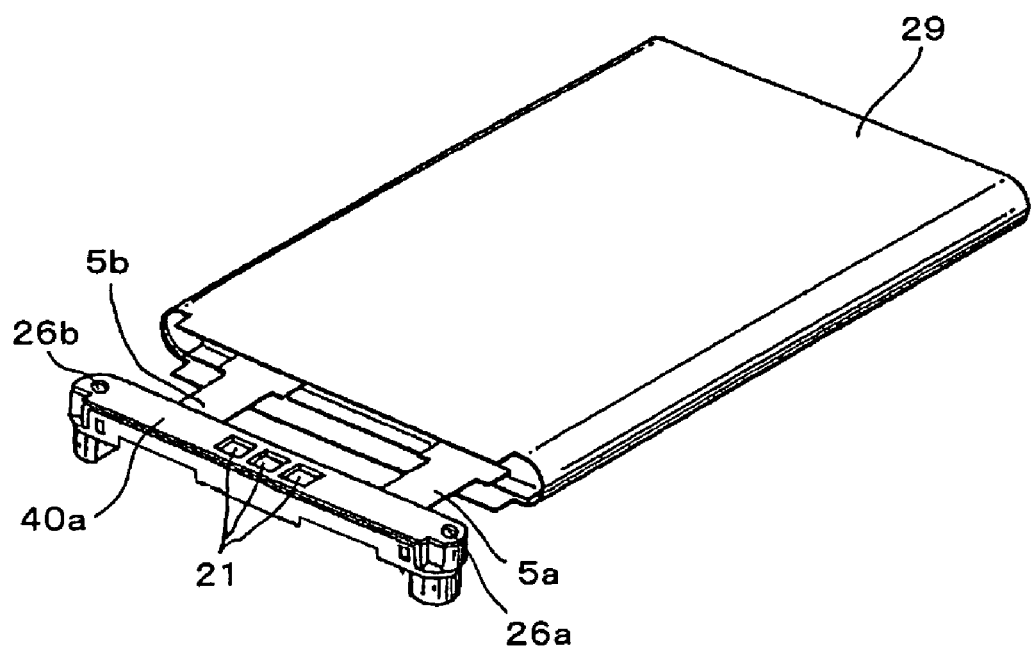

Fig. 42
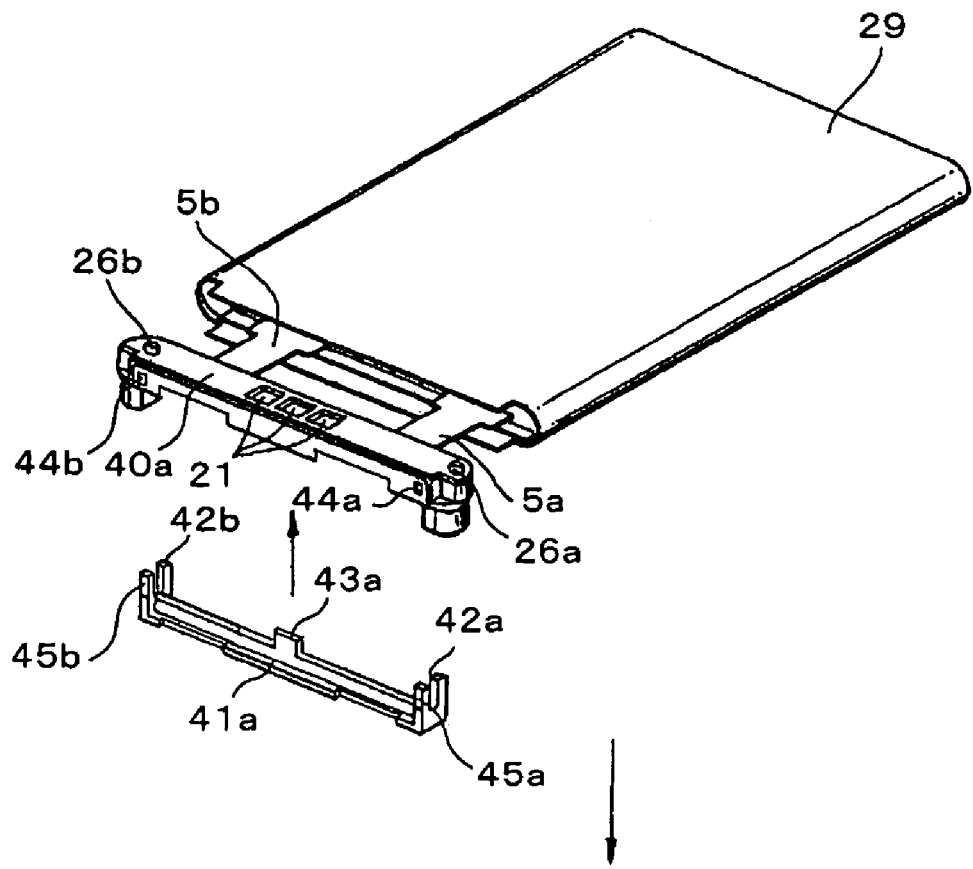
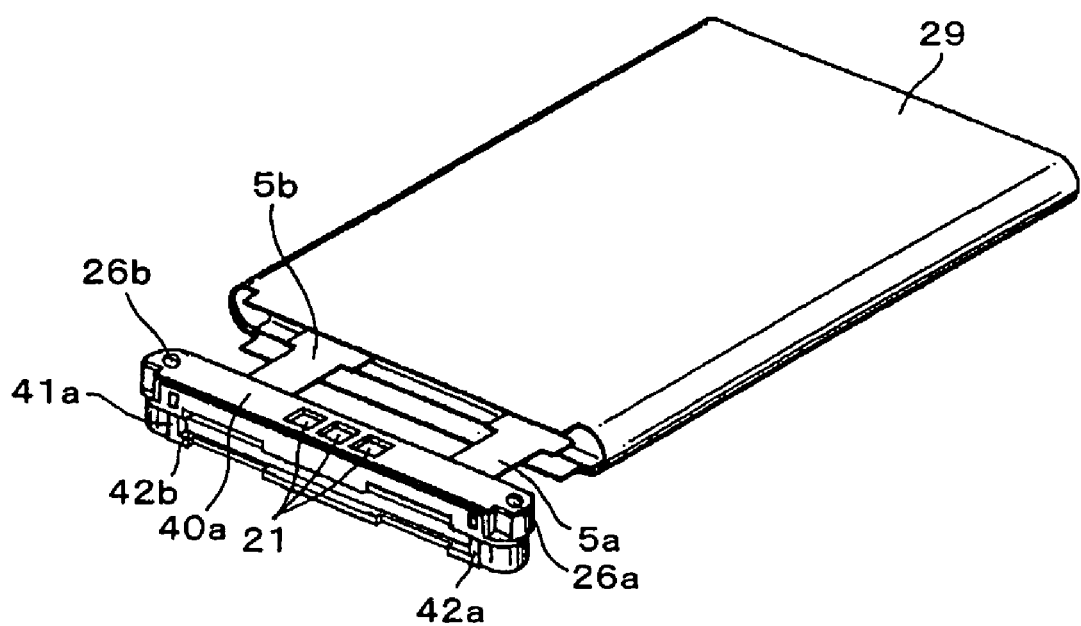

BATTERY PACK

CROSS REFERENCES TO RELATED APPLICATIONS

The present application claims priority to Japanese Patent Application No. 2005-013862 filed on Jan. 21, 2005, Japanese Patent Application No. 2005-013863 filed on Jan. 21, 2005, Japanese Patent Application No. 2005-014616 filed on Jan. 21, 2005, and Japanese Patent Application No. 2005-014758 filed on Jan. 21, 2005, the entire contents of which being incorporated herein by reference.

BACKGROUND

The present invention relates to a battery pack of which a battery element is coated with an outer jacket member.

In recent years, as portable electronic devices such as note-type personal computers, mobile phones, and personal digital assistants (PDAs) have been widespread, lithium ion batteries that feature high voltages, high energy densities, and light weight have been widely used for their power sources.

When a battery uses liquid electrolyte, a problem of which the liquid electrolyte tends to leak out of the battery takes place. To solve this problem, a lithium ion polymer secondary battery that uses a gel type polymer film of which polymer is soaked in nonaqueous electrolyte solution and a lithium ion polymer secondary battery that uses solid electrolyte have been practically used.

The lithium ion polymer secondary battery has a cell structure. The cell is composed of a battery element and an outer jacket member made of an aluminum laminate. The battery element is composed of a cathode, an anode, and polymer electrolyte. The battery element has electrode terminals that extend from the cathode and the anode. The battery element is coated with the outer jacket member. The cell and a wiring board on which a circuit portion is mounted are contained in a box-shaped plastic mold case composed of an upper case and a lower case. Japanese Patent Application Laid-Open Publication No. 2002-260608 describes an example of such a lithium ion polymer secondary battery.

In the structure of related art of which a battery element is contained in a mold case, the wall thickness of the mold case is around 0.3 mm to 0.4 mm. When a fixing double-adhesive tape and tolerance are considered, the thickness of the cell increases by around 0.8 mm to 1 mm. In addition, the shape that allows both the upper mold case and the lower mold case of the cell to be ultrasonic-adhered is required. To do that, the wall thickness increases by around 0.7 mm. As a result, the volume of the battery pack increases 1.3 to 1.4 times compared with the volume of the cell.

In addition, when the battery cell is contained in the mold case, the heat radiation will deteriorate. As a result, the battery performance will lower and/or generate heat.

SUMMARY

In view of the aspects described above a battery pack is provided having the following structure. The battery pack is composed of a hard outer jacket member and a battery element. The hard outer jacket member has a first opening and a second opening at both ends. The battery element is contained in the outer jacket member. A first cover and a second cover made by resin molding are fitted to the first opening and the second opening, respectively. A circuit board is contained in the first cover fitted to the first opening. The circuit board has electrode terminals connected to the battery element.

Since this battery pack has an excellent volume efficiency (electric capacity per unit volume/one battery pack) and high heat radiation property, this battery pack contributes to the improvement of the battery performance. In addition, the battery pack can be easily assembled and high yield can be accomplished. However, since the shape of the battery pack is simple, the inventor has recognized that there is a risk of which the battery pack is attached to an electronic device with reverse polarities. To solve this problem, a protrusion portion may be added at an edge surface of the battery pack. However, this protrusion portion will decrease the volume efficiency of the battery pack.

In addition, when the foregoing battery pack is used, since the structure is simple, it is important to protect the battery pack against external shocks. In the battery pack that has the foregoing structure, as shown in FIG. 1A, a soft outer jacket member 101a is spin-molded so that a concave portion that contains a battery element is formed. After the battery element is contained in the concave portion, a hard outer jacket member 101b is placed on the soft outer jacket member 101a so that the hard outer jacket member 101b covers the opening portion of the concave portion. The periphery of the battery element is heat-adhered. Thereafter, as shown in FIG. 1B, the hard outer jacket member 101b and the soft outer jacket member 101a are folded. As a result, resultant structure has an elliptical section. The end portions of the outer jacket members 101a and 101b are adhered. As a result, a battery cell is obtained. Covers having an elliptical section are fitted to the openings at the top portion and the bottom portion of the battery cell. As a result, a battery pack is obtained.

However, as shown in FIG. 2, in the battery pack having such a structure, the hard outer jacket member 101b and the soft outer jacket member 101a are folded along lines that connect the left side surface portion and the right side surface portion of the battery element 104 and the opening portion that contains the battery element 104. Thus, the radius of curvature of these folded portions is smaller than that radius of curvature of the portions that connect the left side surface portion and the right side surface portion of the battery element 104 and the bottom surface portion of the battery element 104. Thus, the section of the battery element 104 is not elliptical.

This is because the concave portion that contains the battery element 104 is formed by spin-mold and end portions 108 of the concave portion can be easily folded. When covers having a nearly elliptical section are tried to be fitted to the opening portions of the battery element 104, the hard outer jacket member 101b does not match the shape of the covers. Since their contact property lowers, they are not sufficiently heat-adhered. Thus, when the battery pack is dropped to the floor or a shock is applied to the battery pack, the hard outer jacket member 101b tends to be easily peeled off.

As another problem of the foregoing battery pack, when the battery pack is designated so that it has an elliptical section, since the side surfaces are curved, it is difficult to align the battery pack with a battery pack slot portion of an electronic device. In addition, after the battery pack that has been attached to the electronic device, the battery pack is easily detached from the slot portion.

In the foregoing battery pack, a circuit board 103 is contained in a top cover 102 composed of an upper holder 102a and a lower holder 102b. The top cover 102 is fitted to one opening portion of an outer jacket member 101. At this point, as shown in FIG. 3A and FIG. 3B, electrode terminals 105 connected to the circuit board 103 are folded and contained in the battery pack. In this case, when there is a sufficient space between the battery element 104 and the top cover 102, the folded electrode terminals 105 does not interfere with a portion 109 that is opposite to an electrode terminal lead portion and that is disposed in the upper holder 102a. However, this structure is in contradiction to the primary objective of the battery pack that has high volume efficiency.

When the space between the battery element 104 and the top cover 102 is narrowed, because of the structure of the electrode terminal lead portion, heat-adhered portion of the electrode terminal lead portion disposed in the upper holder 102a and the outer jacket member 100 becomes very small. Thus, the heat adhesion strength between the top cover 102 and the outer jacket member 101 becomes insufficient. In addition, when the battery thickness is relatively small, as shown in FIG. 3B, a portion 110 that is opposite to the electrode terminal lead portion and that is disposed on the bottom surface of the lower holder 102b presses the electrode terminals 105. As a result, the electrode terminals are protruded and folded and in the direction of the thickness of the battery element. Thus, the thickness of the electrode terminal portion becomes larger than the thickness of the other portions. In this case, the battery pack may not match the battery pack slot of the electronic device.

In addition, the inventor of the present patent application has proposed a battery pack that has the same structure as the foregoing battery pack except that hot melt resin or the like is injected into the first cover to fix the circuit board contained therein.

However, in this battery pack, resin is not sufficiently injected into the first cover and the cover has a cavity. Thus, the circuit board is not sufficiently secured. When the battery pack is dropped to the floor, the circuit board is deformed. Occasionally, the circuit is damaged.

In view of the foregoing, it would be desirable to provide a battery pack that is prevented from being attached to a device with reverse polarities without a tradeoff of the deterioration of the volume efficiency.

In addition, it would be desirable to provide a battery pack that has an excellent volume efficiency and external shock resistance and that can be easily aligned with a battery pack slot.

In addition, it would be desirable to provide a battery pack that prevents electrode terminals from interfering with a top cover, the electrode terminals from being protruded and curved, and the thickness of an electrode terminal portion from becoming larger than the other portion of the battery pack and that allows the yield to increase.

In addition, it would be desirable to provide a battery pack that allows hot melt resin to be sufficiently injected into a cover that holds a circuit board and the injected resin to securely hold the circuit board and improve mechanical strength of the battery pack.

According to an embodiment, there is provided a box-shaped or plate-shaped battery pack that has a hard outer jacket member, a box-shaped or plate-shaped battery element, a cover, and a circuit board. The hard outer jacket member has a first opening and a second opening formed at both ends. The box-shaped or plate-shaped battery element is contained in the outer jacket member and has electrode terminals. The cover is molded from resin and is fitted to the first opening. The circuit board is connected to the electrode terminal leads and contained in the cover. At least the electrode terminal lead extends from the first opening. The cover has concave portions on both ends of one longer side. The outer jacket member has cut portions that expose at least the concave portions of the cover. At least a longer side of the cover and the outer jacket member are heat-adhered.

According to an embodiment, there is provided a battery pack that has an outer jacket member, a battery element, and at least one resin molded cover. The outer jacket member is composed of a first laminate member and a second laminate member. The first laminate member has a concave portion. The battery element is contained in the concave portion formed in the first laminate member. The first laminate member and the second laminate member are layered so that the second laminate member covers the opening of the concave portion. The periphery of the opening of the first laminate member is sealed. Both ends of the second laminate member are connected outside the bottom of the concave portion of the first laminate member. Both sides of the second laminate member are formed nearly in an elliptical shape of which they protrude. At least one resin molded cover are fitted to an opening portion formed of the outer jacket member. Corner portions are formed on both shorter sides of the cover. The radius of curvature of the corner portion of a curved surface from the opening of the concave portion of the first laminate member to each of the shorter sides is smaller than the radius of curvature of the corner of a curved surface from the outer surface of the bottom of the concave portion of the first laminate member to each of the shorter sides.

According to an embodiment, there is provided a box-shaped or plate-shaped battery pack that has a hard outer jacket member, a box-shaped or plate-shaped battery element, a first cover, and a second cover. The hard outer jacket member has a first opening and a second opening at both ends. The box-shaped or plate-shaped battery element is contained in the outer jacket member and has electrode terminal leads connected to a circuit board. A first cover and a second cover cover the first opening and the second opening. The first cover is fitted to the first opening. The circuit board is contained in the first cover. The first cover has at least an upper holder that is molded from resin and that holds the circuit board on the opposite side of the battery element and a lower holder that is molded from resin and that holds the circuit board on the side of the battery element. The upper holder and the lower holder are adhered or mechanically connected. The upper holder has cut portions corresponding to an electrode terminal lead portion of electrode terminals extending from the battery element.

According to an embodiment, there is provided a box-shaped or plate-shaped battery pack that has a hard outer jacket member, a box-shaped or plate-shaped battery element, a first cover, and a second cover. The hard outer jacket member has a first opening and a second opening at both ends. The box-shaped or plate-shaped battery element is contained in the outer jacket member and has electrode terminal leads connected to a circuit board. The first cover and a second cover cover the first opening and the second opening. The first cover is fitted to the first opening. The circuit board is contained in the first cover. The first cover has at least an upper holder that is molded from resin and that holds the circuit board on the opposite side of the battery element and a lower holder that is molded from resin and that holds the circuit board on the side of the battery element. The upper holder and the lower holder are adhered or mechanically connected. The upper holder has a through-hole through which resin is injected into a space formed between the battery element and the first cover. The lower holder has protrusions at both ends, the protrusions having a cut portion at the center portion, the lower holder having at least one substrate support protrusion that protrudes on the side of the circuit substrate in the vicinity of the center portion. Resin is injected into the space formed between the battery element and the first cover.

It is preferred that one end of the outer jacket member protrude from one end of the battery element by around the thickness of the cover through the opening fitted to the cove. It is preferred that a heat adhesive layer be disposed inside the protruded portion of the outer jacket member.

It is preferred that the outer jacket member be composed of a first laminate member and a second laminate member having nearly the same size. It is preferred that the first laminate member have a concave portion that contains the battery element, the first laminate member and the second laminate member being layered so that the second laminate sheet member covers the opening of the concave portion, the periphery of the opening of the first laminate member being sealed, the electrode terminal leads connected to the battery element extending from the sealed portion, ends of the first laminate member and the second laminate member being connected outside the bottom of the concave portion of the first laminate member, the both sides of the first laminate member and the second laminate member being formed in an elliptical shape of which they protrude.

As described above, according to an embodiment, a cover has concave portions at both ends of one longer side and an outer jacket member has cut portions that expose at least the concave portions of the cover. Thus, a battery pack that has excellent volume efficiency can be provided with a structure that prevents the battery pack from being attached with reveres polarities.

In addition, according to another embodiment, since the contact property of the fitting portion of the cover and the outer jacket member is improved, the heat adhered portion can be prevented from being peeled off. As a result, when the battery pack is dropped or shocked, it can be prevented from being damaged. In addition, since the battery pack can be easily aligned with the battery pack slot of an electronic device and the battery pack can be prevented from being misaligned therefrom, the quality of the battery pack can be improved.

In addition, according to another embodiment, since a cover that contains a circuit board has cut portions, when the cover is fitted to an outer jacket member, the cut portions can contain curved electrode terminals. Thus, after the cover and the outer jacket member are heat-adhered, the thickness of the battery pack does not increase. In addition, since the heat-adhered portion is prevented from being peeled off, the quality of the battery pack can be improved.

In addition, according to an embodiment, since a holder that does not resist the flow of resin that is injected is used, the resin can be sufficiently injected into a top cover, a circuit board can be securely held. In addition, the mechanical strength of the battery pack can be improved.

In addition, according to an embodiment, since ribs at both ends of a lower holder have protrusion portions in the longitudinal direction of the battery pack, when resin is injected, the flow of the resin can be simplified. Thus, the resin can be sufficiently injected into a top cover.

In addition, according to an embodiment, since a lower holder has protrusion portions, when an upper holder and the lower holder are fitted, since through-holes are opposite to the protrusion portions, even if a metal pin is inserted into a through-hole, the metal pin can be prevented from contacting a battery element. Thus, an accident such as short-circuit can be prevented.

These and other objects, features and advantages will become more apparent in light of the following detailed description of a best mode embodiment thereof, as illustrated in the accompanying drawings.

Additional features and advantages are described herein, and will be apparent from, the following Detailed Description and the figures.

BRIEF DESCRIPTION OF THE FIGURES

A battery pack according to embodiments of the present invention will now be described with reference to the drawings.

FIG. 7A, FIG. 7B, and FIG. 7C are a plan view, a shorter side sectional view, and a longer side sectional view showing a first example of an outer jacket member;

FIG. 14 is a perspective view describing the production method of the battery pack according to the first embodiment of the present invention;

FIG. 15 is a perspective view describing the production method of the battery pack according to the first embodiment of the present invention;

FIG. 23 is a schematic diagram showing the structure of a top cover used in the battery pack according to the second embodiment of the present invention;

FIG. 26 is a schematic diagram showing the state of which the top cover produced according to the second embodiment of the present invention is fitted to the battery cell;

FIG. 33 is a schematic diagram showing the structure of a lower holder that composes the top cover used in the battery pack according to the third embodiment of the present invention;

FIG. 40 is a perspective view showing the state of which an upper holder is fitted to a battery cell according to a fourth embodiment of the present invention;

FIG. 42 is a perspective view showing the state of which the upper holder and the lower holder are fitted according to the fourth embodiment of the present invention;

DETAILED DESCRIPTION

Figure 4:
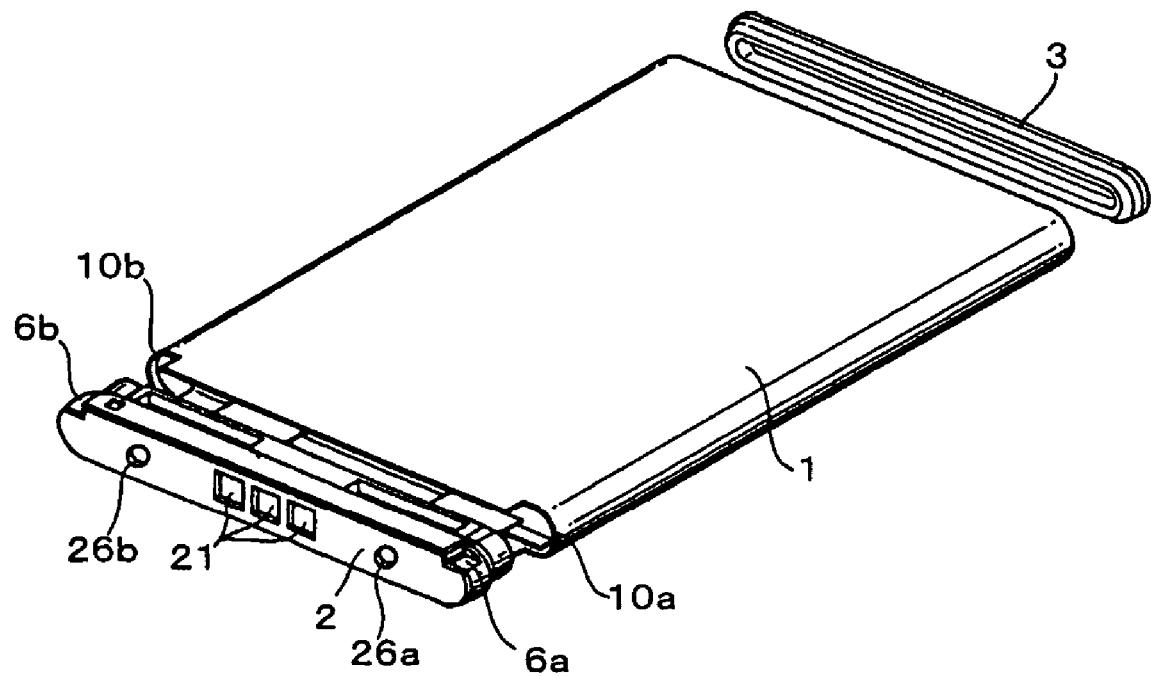
FIG. 4 is an exploded perspective view showing an example of the structure of a battery pack according to a first embodiment of the present invention.
Figure 5:
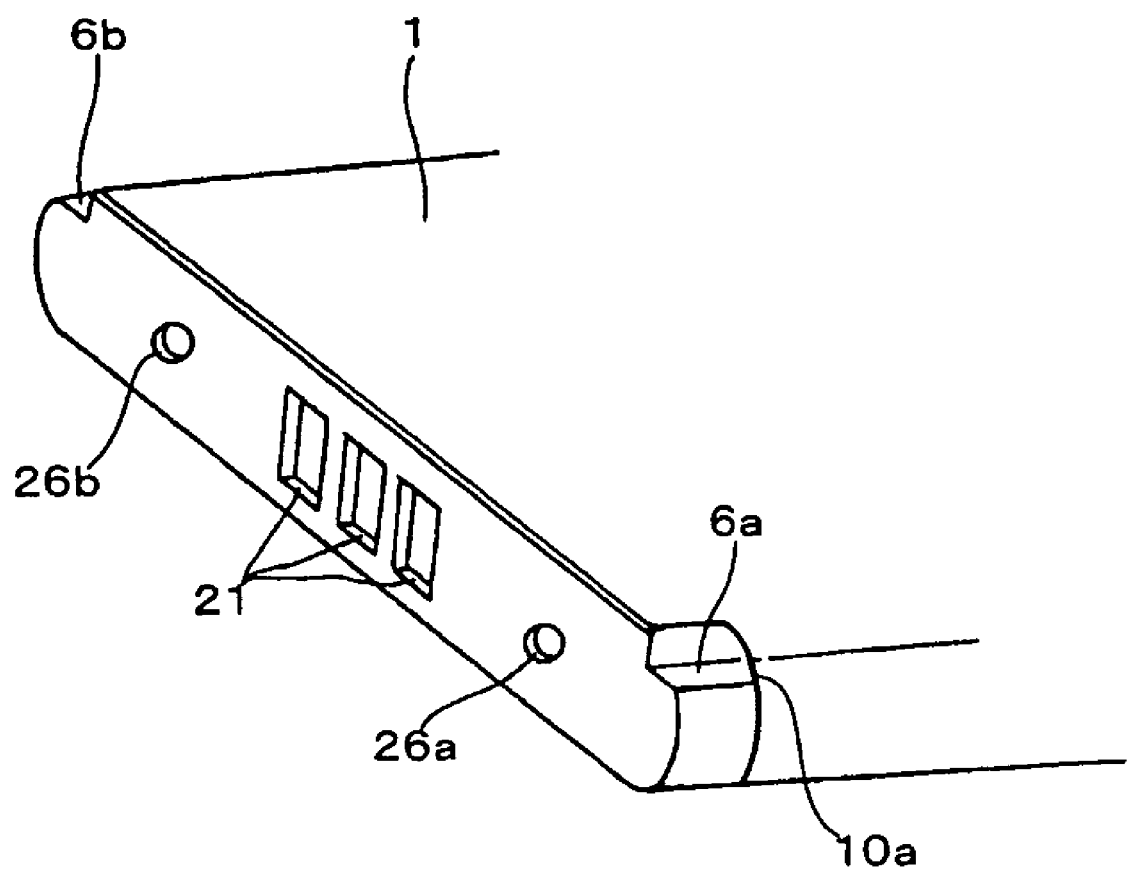
FIG. 5 is a perspective view showing an example of the shape of one end of the battery pack according to the first embodiment of the present invention.

Next, with reference to the accompanying drawings, a first embodiment will be described. FIG. 4 is an exploded perspective view showing an example of the structure of a battery pack according to the first embodiment. FIG. 5 is a perspective view showing an example of the shape of one end of the battery pack according to the first embodiment. The battery pack is a battery pack of a box-shaped or plate-shaped lithium ion polymer battery. As shown in FIG. 4, the battery pack has an outer jacket member 1 that has open ends, a battery element contained in the outer jacket member 1, and a top cover 2 and a bottom cover 3 that are fitted to both the open ends of the outer jacket member 1. In the following description, the open end to which the top cover 2 is fitted is referred to as the top end and the open end to which the bottom cover 3 is fitted is referred to as the bottom end.

The battery element is for example a box-shaped or plate-shaped roll type battery element. The outer jacket member 1 has a plate shape. When viewed from the major plane, the outer jacket member 1 has a rectangular shape. The outer jacket member 1 has cut portions 10a and 10b that expose at least concave portions 6a and 6b formed on both ends of a longer sides of the top cover 2. The openings at both ends of the outer jacket member 1 have a rectangular shape. Both shorter sides of each of the openings protrude in an elliptical arc shape.

In addition, the top cover 2 and the bottom cover 3 are shaped so that they are fitted to the openings at both ends of the outer jacket member 1. When viewed from the front of the top cover 2 and the bottom cover 3, they have a rectangular shape and their shorter sides protrude in an elliptical arc shape. As shown in FIG. 5, the concave portions 6a and 6b are formed at both ends of one longer side of the top cover 2 so that the battery pack is prevented from being attached to a battery pack slot of an electronic device with reveres polarities. In addition, through-holes 26a and 26b are formed on the front surface of the top cover 2.

Next, with reference to FIG. 6 to 10, the battery element 4, the outer jacket member 1, the top cover 2, and the bottom cover 3 will be described.

Battery Element

Figure 6A:
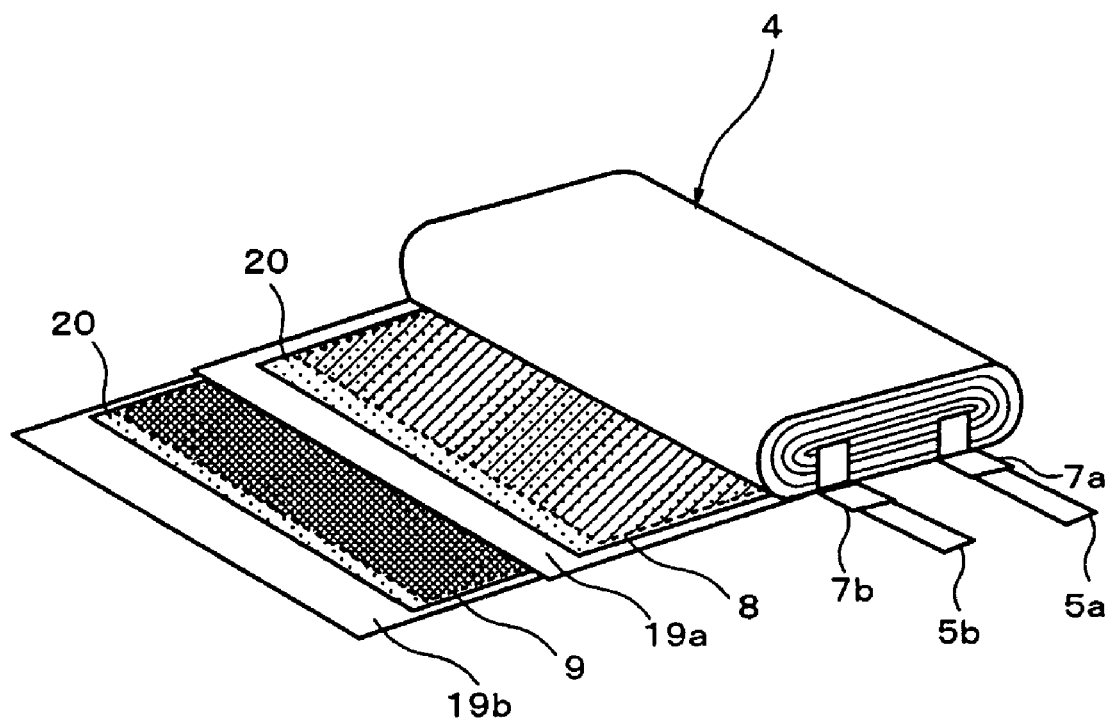
FIG. 6A and FIG. 6B are a perspective view and a sectional view showing an example of the structure of a battery element according to the first embodiment of the present invention, respectively.
Figure 6B:
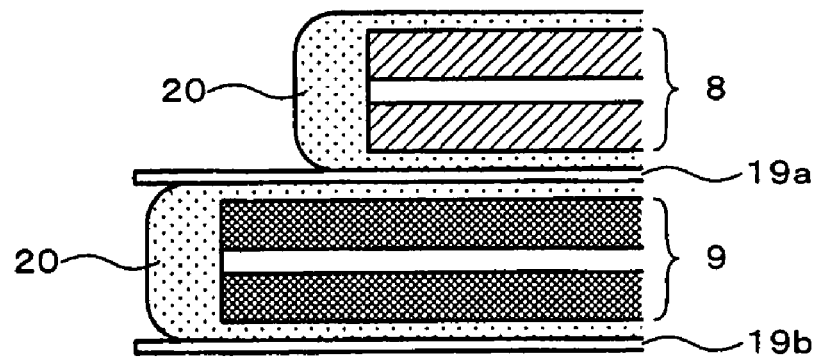

FIG. 6A and FIG. 6B are a perspective view and a sectional view showing an example of the appearance of the battery element 4 according to the first embodiment of the present invention, respectively. FIG. 6B shows the structure of end portions of rolls of a cathode 8 and an anode 9. The battery element 4 is composed of the cathode 8, a separator 19a, the anode 9 disposed opposite to the cathode 8, and a separator 19b that formed in a strip shape and are rolled in their longitudinal directions. Both surfaces of each of the cathode 8 and the anode 9 are coated with polymer electrolyte 20. As shown in FIG. 6B, the polymer electrolyte 20 are applied fully to both the surfaces of each of the cathode 8 and the anode 9 so that the polymer electrolyte 20 fully covers the end portions of the cathode 8 and the anode 9. A cathode terminal 5a connected to the cathode 8 and an anode terminal 5b connected to the anode 9 extend from the battery element 4 (unless electrode terminals are specified, the cathode terminal 5a and the anode terminal 5b are simply referred to as the electrode terminals 5). Both the surfaces of each of the cathode terminal 5a and the anode terminal 5b are coated with resin pieces 7a and 7b that improve adhesive property with laminate films that will be described later as the outer jacket member 1 (hereinafter, the resin pieces 7a and 7b are referred to as sealant).

The cathode 8 is composed of a strip-shaped cathode current collector, a cathode active material layer formed on the cathode current collector, and a polymer electrolyte layer formed on the cathode active material layer. The cathode current collector is made of metal foil such as aluminum (Al) foil, nickel (Ni) foil, or stainless steel foil. The anode 9 is composed of a strip-shaped anode current collector, an anode active material formed on the anode current collector, and polymer electrolyte formed on the anode active material. The anode current collector is made of metal foil such as copper (Cu) foil, nickel (Ni) foil, or stainless steel foil. The electrode terminals 5a and 5b of the cathode 8 and the anode 9 are connected to the cathode current collector and the anode current collector, respectively. As the cathode active material, the anode active material, and the polymer electrolyte, materials that have been proposed may be used.

The cathode active material of the cathode 8 may be an oxide metal, a sulfide metal, or a predetermined polymer depending on the type of the battery. When the battery pack is a lithium ion battery, the cathode active material may be for example a lithium multi-oxide $Li_xMO_2$ (where M represents one or more types of transition metals; X represents a value ranging from 0.05 to 1.10 that depends on the charging/discharging states of the battery). The transition metals that compose the lithium multi-oxide are preferably cobalt (Co), nickel (Ni), manganese (Mn), and so forth.

The cathode active material layer is composed of for example a cathode active material, a conductive agent, and a binding agent. These materials are equally mixed and a cathode mixture is formed. The cathode mixture is dispersed in a solvent. As a result, a slurry of cathode mixture is obtained. The slurry of cathode mixture is equally applied to the cathode current collector by for example doctor blade method. The cathode current collector is heated at high temperature so that the solvent is evaporated. As a result, the cathode active material is obtained. In this case, the mixing ratio of the cathode active material, the conductive agent, the binding agent, and the solvent is not restricted as long as they are equally dispersed in the solvent.

Specific examples of the lithium ion multi-oxide are $LiCoO_2$, $LiNiO_2$, $LiNi_yCo_{1-y}O_2$ (where 0<y<1), and $LiMnO_4$. Instead, solid solution of which a part of transition metals is replaced with another metal may be used as the lithium ion multi-oxide. Examples of the solid solution are $LiNi_{0.5}Co_{0.5}O_2$ and $LiNi_{0.8}Co_{0.2}O_2$. These lithium multi-oxides can generate a high voltage and have a high energy density. Instead, the cathode active material may be a metal sulfide or a metal oxide that does not contain lithium for example $TiS_2$, $MoS_2$, $NbSe_2$, or $V_2O_5$. The cathode may be made of a plurality of types of these cathode active materials. When the cathode is made of these cathode active materials, a conductive agent and/or a binding agent may be added.

As the conductive agent, a carbon material such as carbon black or graphite is used. As the binding agent, for example poly(vinylidene fluoride), poly(tetrafluoroethylene), or polyvinylidene fluoride (PVDF) is used. As the solvent, for example N-methylpyrrolidone is used.

The cathode 8 has the cathode terminal 5a that is spot-welded or ultrasonic-welded to a part of the current collector. The cathode terminal 5a is preferably mesh-type metal foil. However, the cathode terminal 5a may be made of a non-metal material that conducts electricity as long as the material is electrochemically or chemically stable and conducts electricity. The material of the cathode terminal 5a is for example aluminum (Al).

The anode active material layer is composed of for example an anode active material and when necessary a conductive agent and a binding agent. These materials are equally mixed and an anode mixture is formed. The anode mixture is dispersed in a solvent. As a result, a slurry of anode mixture is obtained. The slurry of anode mixture is equally applied to the anode current collector by for example doctor blade method. The anode current collector is heated at high temperature so that the solvent is evaporated. As a result, the anode active material is obtained. In this case, the mixing ratio of the anode active material, the conductive agent, the binding agent, and the solvent is not restricted as long as they are equally dispersed in the solvent.

As the material of the anode 9, for example a material from and to which lithium can be doped and dedoped can be used. Examples of this material are carbon materials of non-graphitizing carbon and a graphite type material. More specifically, pyrolyzing carbon group, coke group (pitch coke, needle coke, petroleum coke, and so forth), graphite group, glass type carbon group, organic polymer sintered body (carbonized body of which phenol resin or furan resin is sintered at a proper temperature), carbon fibers, active carbon, and so forth can be used. As the material to and from which lithium is doped or dedoped, for example polymers such as poly-acetylene and polypyrrole and oxides such as $SnO_2$ can be used. When the anode 9 is made of these materials, a binding agent or the like may be added.

Examples of the material that can be alloyed with lithium are various types of metals such as tin (Sn), cobalt (Co), indium (In), aluminum (Al), silicon (Si), and their alloys. When metallic lithium is used, it is not always necessary to coat its powder with a binding agent. Instead, rolled Li metal plate may be used.

Examples of the binding agent are polyvinylidene fluoride and styrene-butadiene rubber (SBR). Examples of the solvent are N-methylpyrrolidone and methyl ethyl ketone.

Like the cathode 8, the anode 9 has the anode terminal 5b that is spot-welded or ultrasonically welded to a part of the current collector. The anode terminal 5b is preferably mesh-type metal foil. However, the anode terminal 5b may be made of a non-metal material that conducts electricity as long as the material is electrochemically or chemically stable and conducts electricity. The material of the anode terminal 5b is for example copper (Cu) or nickel (Ni).

It is preferred that the cathode terminal 5a and the anode terminal 5b extend from the same opening of the battery element 4. Instead, the cathode terminal 5a and the anode terminal 5b may extend from any openings of the battery element 4 as long as the short-circuit does not take place and the battery performance does not deteriorate. In addition, the cathode terminal 5a and the anode terminal 5b may be connected in any positions and in any method as long as the cathode terminal 5a and the anode terminal 5b are electrically contacted to the cathode 8 and the anode 9, respectively.

The polymer electrolyte is made of a polymer material, electrolyte, and electrolytic salt. They are mixed and gelled electrolyte is polymerized. The polymer material is dissolved with electrolyte. Examples of the polymer material are silicon gel, acrylic gel, acrylic nitrile gel, polyphosphazen denatured polymer, polyethylene oxide, and polypropylene oxide. As examples of these conjugated polymers, these cross-linked polymers, denatured polymers, and fluoride polymers, a polymer material such as poy(vinylidene fluororide), poly(vinylidene fluororide-co-hexafluoropropylene), and poly(vinylidene fluororide-co-trifluoroethylene) and their mixtures are used.

Examples of the electrolyte component are for example aprotic solvents that can disperse the foregoing polymer materials. Examples of the aprotic solvents are ethylene carbonate (EC), propylene carbonate (PC), and butylene carbonate (BC). The electrolyte salt is dissolvable in a solvent and is made of cations and anions. As examples of the cations, alkali metals and alkali earth metals are used. As examples of the anions, $Cl^-$, $Br^-$, $I^-$, $SCN^-$, $ClO_4^-$, $BF_4^-$, $PF_6^-$, and $CF_3SO_3$ are used. Specific examples of the electrolyte salt are lithium hexafluorophosphate ($LiPF_6$) and lithium tetrafluoroborate ($LiBF_4$) that have a concentration dissolvable in an electrolyte solution.

Electrolyte solution as a mixture of the foregoing electrolyte and electrolyte salt is gelled with a matrix polymer. As a result, gelled electrolyte is obtained. The matrix polymer is not limited as long as it is dissolved in non-electrolyte solution of which electrolyte salt is dissolved in non-water solvent and is gelled. An example of the matrix polymer is a polymer that repetitively contains poly(vinylidene fluoride), polyethylene oxide, polypropylene oxide, polyacrylonitorile, and/or poly(methacrylonitrile) in predetermined units. This polymer may be one of these components or a mixture thereof.

Outer Jacket Member

FIG. 7A, FIG. 7B, and FIG. 7C show a first example of the outer jacket member 1. As shown in FIG. 7A to FIG. 7C, the outer jacket member 1 is composed of a soft laminate member 1a that has a concave portion 15 that contains the battery element 4, and a hard laminate member 1b that covers the concave portion 15 on the hard laminate member 1b. The concave portion 15 has been spin-molded in the shape of the battery element 4. A heat adhesive sheet 15a is disposed on the outer surface at the bottom of the concave portion 15.

The soft laminate member 1a is formed in a rectangular shape. The soft laminate member 1a has a top longer side 11a, a bottom longer side 12a, a left shorter side 13a, and a right shorter side 14a. The length of the top longer side 11a is the same as the length of the bottom longer side 12a. The length of the left shorter side 13a is the same as the length of the right shorter side 14a. Likewise, the hard laminate member 1b is formed in a rectangular shape. The hard laminate member 1b has a top longer side 11b, a bottom longer side 12b, a left shorter side 13b, and a right shorter side 14b. The length of the top longer side 11b is the same as the length of the bottom longer side 12b. The length of the left shorter side 13b is the same as the length of the right shorter side 14b. The left side and right side of each of the soft laminate member 1a and the hard laminate member 1b are based on the positions viewed from the top of FIG. 13A.

The longer sides 11b and 12b of the hard laminate member 1b have lengths so that the shorter sides 13b and 14b contact with each other or they are spaced apart by a small distance when the concave portion 15 that contains the battery element 4 is coated with the hard laminate member 1b. The lengths of the longer sides 11a and 12a of the soft laminate member 1a are smaller than the lengths of the longer sides 11b and 12b of the hard laminate member 1b. The longer sides 11a and 12a of the soft laminate member 1a have lengths so that the shorter sides 13a and 14a contact with each other or they are spaced apart when the concave portion 15 that contains the battery element 4 is coated with the soft laminate member 1a. The space of the shorter sides 13a and 14a of the soft laminate member 1a is not limited to a small distance, but a certain distance.

The lengths of the shorter sides 13a and 14a of the soft laminate member 1a are smaller than the lengths of the shorter sides 13b and 14b of the hard laminate member 1b. Thus, the soft laminate member 1a and the hard laminate member 1b can be layered so that only the hard laminate member 1b is present at the top of the outer jacket member 1. In this case, the periphery of the top cover 2 disposed at the top opening of the outer jacket member 1 can be heat-adhered by the polypropylene layer of the hard laminate member 1b. Likewise, the adhesive layer of the hard laminate member 1b may be exposed at the bottom of the outer jacket member 1 so that the periphery of the bottom cover 3 disposed at the bottom opening of the outer jacket member 1 may be heat-adhered by the polypropylene layer of the hard laminate member 1b.

One longer side of the hard laminate member 1b has the cut portions 10a and 10b. The cut portions 10a and 10b are formed at least at positions of which the concave portions 6a and 6b of the top cover 2 are exposed when the battery element 4 is coated with the outer jacket member 1 and the top cover 2 is fitted to the top opening of the outer jacket member 1. The cut portions 10a and 10b are formed in a shape so that at least the concave portions 6a and 6b of the top cover 2 are exposed when the top cover 2 is fitted to the top opening of the outer jacket member 1.

The soft laminate member 1a is suitable to form the concave portion 15 that contains the battery element 4 by spin-molding. The soft laminate member 1a is softer than the hard laminate member 1b.

Figure 8:
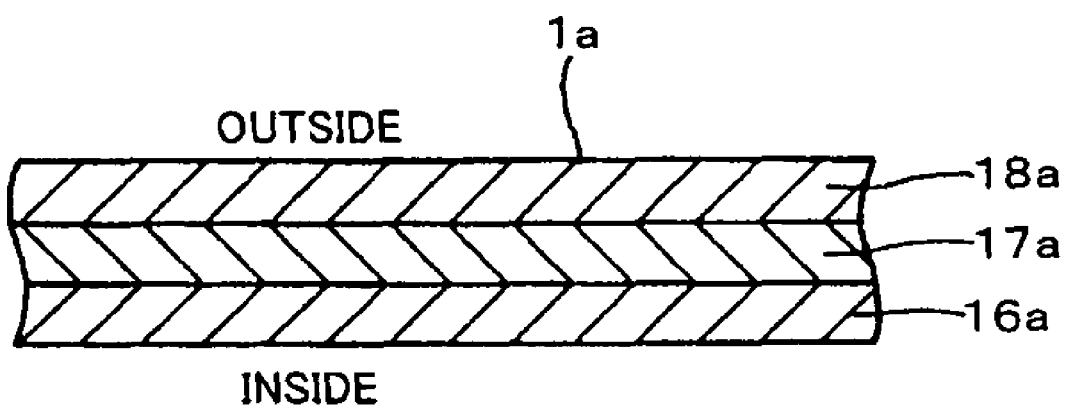
FIG. 8 is a sectional view showing an example of the structure of a soft laminate member that composes the outer jacket member.

FIG. 8 is a sectional view showing an example of the structure of the soft laminate member 1a that composes the outer jacket member 1. The soft laminate member 1a has a laminate structure of which a polypropylene (PP) layer 16a as an adhesive layer, a soft aluminum layer 17a as a metal layer, a nylon layer or polyethylene terephthalate (PET) layer 18a as a surface protection layer are successively layered in the order. The polypropylene layer 16a is the innermost layer (that contact the hard laminate member 1b).

The soft aluminum layer 17a has a function that prevents the polymer electrolyte from becoming denatured. As the polypropylene layer 16a, for example cast polypropylene (CPP) is used. The thickness of the polypropylene (PP) layer 16a is for example 30 μm.

The soft aluminum layer 17a has a function that prevents moisture from entering the inside. Examples of the material of the soft aluminum layer 17a is annealed aluminum (JIS A8021P-O) or (JIS A8079P-O). The thickness of the soft aluminum layer 17a is in the range from 30 μm to 130 μm. The nylon layer or the PET layer 18a has a function that protects the surface. The thickness of the nylon layer or the PET layer 18a is in the range from 10 μm to 30 μm.

The hard laminate member 1b can keep the shape that was bent against the external deformation. The hard laminate member 1b has a laminate structure of which a polypropylene layer as an adhesive layer, a hard aluminum layer as a metal layer, and a nylon layer or a PET layer as a surface protection layer that are successively layered in the order.

The polypropylene layer and the nylon layer or the PET layer of the hard laminate member 1b are the same as those of the soft laminate member 1a. The hard aluminum layer is made of non-annealed aluminum (JIS A3003P-H18) or (JIS A3004P-H18). The thickness of the hard aluminum metal is in the range from 30 μm to 130 μm. The thickness of each layer of the soft laminate member 1a and the hard laminate member 1b is selected in consideration of the total thickness of the battery pack.

Figure 9:
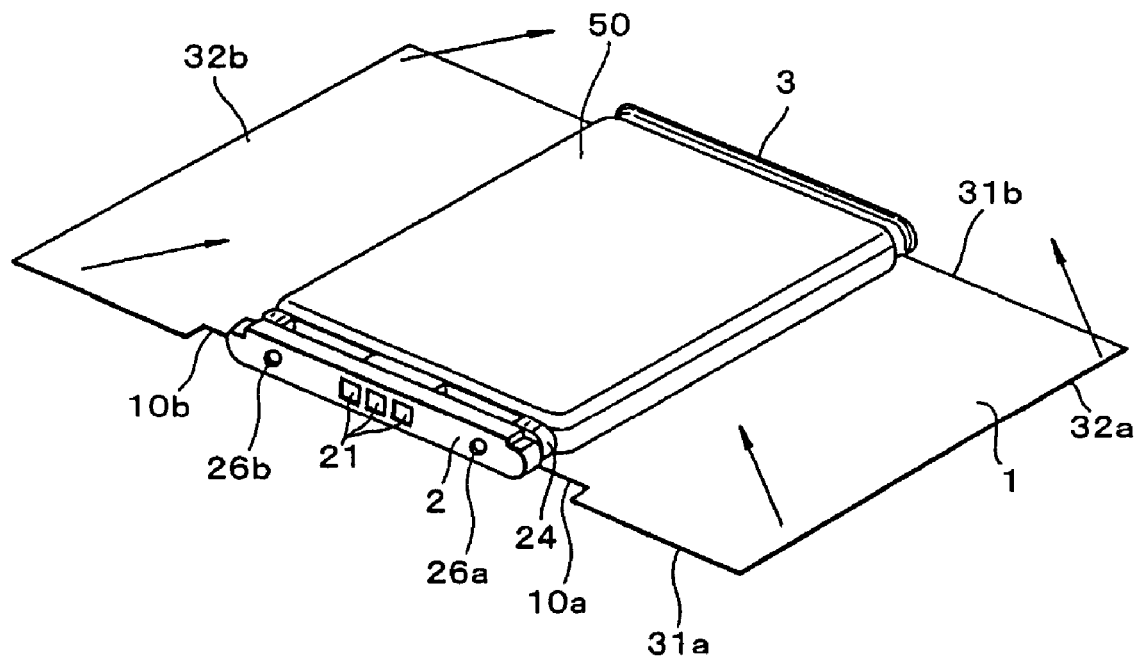
FIG. 9 is a perspective view showing a second example of the outer jacket member.

FIG. 9 shows a second example of the outer jacket member 1. In FIG. 9, a laminate battery element 50 is coated with the outer jacket member 1. The top cover 2 and the bottom cover 3 are disposed on both end surfaces of the laminate battery element 50.

The outer jacket member 1 is a hard laminate member that has an adhesive layer, a metal layer, and a surface protection layer that are successively layered in the order. The materials of the layers of the second example of the outer jacket member 1 are the same as the materials of the layers of the first example of the hard laminate member 1b.

The electrode terminals 5a and 5b extend from the laminate battery element 50. The battery element 4 is coated with a soft laminate member. The periphery of the soft laminate member is heat-adhered and sealed. It is preferred that the soft laminate member preferably have a container portion that contains the battery element 4. The container portion is formed by spin-molding a soft laminate member in a predetermined shape. The soft laminate member has an adhesive layer, a metal layer, and a surface protection layer that are successively layered. The materials of the layers of the soft laminate member of the second example are the same as the materials of the layers of the soft laminate member 1a of the first example.

The outer jacket member 1 is formed in a rectangular shape. The outer jacket member 1 has a top longer side 31a, a bottom longer side 31b, a shorter side 32a, and a shorter side 32b. The length of the top longer side 31a is the same as the length of the bottom longer side 31b. The length of the shorter side 32a is the same as the length of the shorter side 32b. The top longer side 31 of the outer jacket member 1 has cut portions 10a and 10b. The cut portions 10a and 10b are formed at least at positions of which the concave portions 6a and 6b of the top cover 2 are exposed when the battery element 4 is coated with the outer jacket member 1 and the top cover 2 is fitted to the top opening of the outer jacket member 1. The cut portions 10a and 10b are formed in a shape so that at least the concave portions 6a and 6b of the top cover 2 are exposed when the top cover 2 is fitted to the top opening of the outer jacket member 1.

The laminate battery element 50 is coated with the outer jacket member 1 for example in the following manner. Firstly, the electrode terminals 5a and 5b that extend from the top of the laminate battery element 50 are connected to the circuit board contained in the top cover 2. The laminate battery element 50 is placed at a center portion of the outer jacket member 1 so that the upper surface of the top cover 2 nearly matches the top longer side 31a of the outer jacket member 1. Thereafter, the bottom cover 3 is placed on the end surface of the bottom of the laminate battery element 50.

Thereafter, the shorter side 32a and the shorter side 32b of the outer jacket member 1 are folded in the directions of the laminate battery element 50. The surface protection layer of the laminate battery element 50 and the adhesive layer of the outer jacket member 1 are for example heat-adhered. Thereafter, with a predetermined jig, the laminate battery element 50, the top cover 2, and the bottom cover 3 are held and heat-adhered. In other words, heater blocks made of a metal such as copper are placed above and below the end of the top of the outer jacket member 1. The end of the top of the outer jacket member 1 is pressed with the heater blocks so that the periphery of the top cover 2 and the adhesive layer of the inner surface of the hard laminate member 1b are heat-adhered. Likewise, the heater blocks are placed above and below the end of the bottom of the outer jacket member 1. The end of the bottom of the outer jacket member 1 is pressed with the heater blocks so that the periphery of the bottom cover 3 and the adhesive layer of the inner surface of the hard laminate member 1b are heat-adhered.

Thereafter, molten resin is injected into the space formed between the battery element 4 and the top cover 2 through through-holes 26a and 26b of the top cover 2. Thereafter, the molten resin is solidified. Thereafter, molten resin is injected into the space formed between the battery element 4 and the bottom cover 3 through through-holes of the bottom cover 3. Thereafter, the molten resin is solidified.

After the laminate battery element 50 is coated with the outer jacket member 1 and the top opening and the bottom opening are formed at both end surfaces of the outer jacket member 1, the top cover 2 and the bottom cover 3 may be fitted to the top opening and the bottom opening, respectively.

Top Cover

Figure 10:
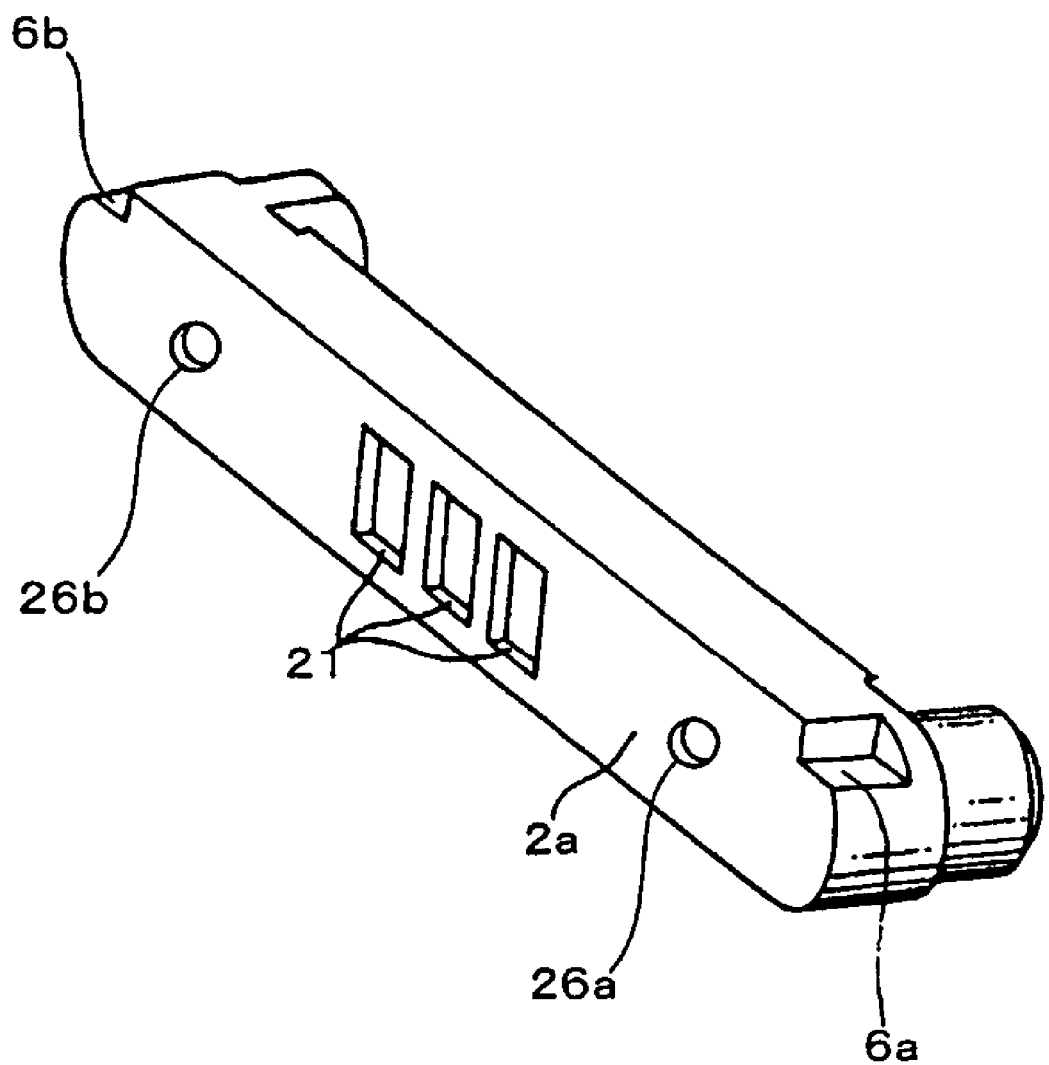
FIG. 10 is a perspective view showing an example of the shape of an upper holder.

The top cover 2 is composed of an upper holder 2a and a lower holder 2b. FIG. 10 is a perspective view showing an example of the shape of the upper holder 2a. The top cover 2 closes the top opening of the outer jacket member 1. When the top cover 2 is viewed from the front, the upper holder 2a has a rectangular shape and both shorter sides protrude in an elliptical arc shape. The upper holder 2a has the concave portions 6a and 6b at corners of one longer side and both shorter sides. The concave portions 6a and 6b are used to prevent the battery pack from being attached to an electronic device with reverse polarities. The outer jacket member 1 has the cut portions 10a and 10b corresponding to the concave portions 6a and 6b of the upper holder 2a. Thus, while the battery pack can be prevented from being attached to an electronic device with reverse polarities, the volume efficiency of the battery pack can be improved.

Although the shapes of the concave portions 6a and 6b formed on both ends of one longer side of the upper holder 2a are not limited, it is preferred that they be formed in consideration of the flexibility of the design of the electronic device side. For example, the concave portions 6a and 6b are concaved in a stair shape toward the shorter sides of the upper holder 2a.

The upper holder 2a has the through-holes 26a and 26b. The through-holes 26a and 26b pierce the upper holder 2a from the surface adjacent to the battery element 4 to the surface opposite thereto. Although the number of through-holes is not limited, at least one through-hole is necessary. Preferably, two or more through-holes are necessary. When there are two or more through-holes, when resin is injected, at least one through-hole can be used to remove air from the space formed between the battery element 4 and the top cover 2. Thus, the injection property of resin can be improved.

In addition, the top cover 2 has a circuit board. The electrode terminals 5a and 5b, which extend from the battery element 4, are connected to the circuit board.

The circuit board has protection circuits that include temperature protection devices such as a fuse, a positive temperature coefficient (PTC) circuit, and a thermistor, and an ID resistor that identifies the battery pack. In addition, the circuit board has a plurality of for example three contact portions. The protection circuits contain an IC that monitors the battery element 4 and controls a field effect transistor (FET) and a charging/discharging control FET.

The PTC circuit is connected to the battery element 4 in series. When the temperature of the battery element 4 becomes higher than the setting temperature thereof, the electric resistance of the PTC circuit sharply increases and it substantially stops the current that flows in the battery element 4. The fuse and the thermistor are also connected to the battery element 4 in series. When the temperature of the battery element 4 becomes higher than the setting temperatures of the fuse and thermistor, they shut off the current that flows in the battery element 4. The protection circuits containing the IC, which monitors the battery element 4 and controls the FET, and the charging/discharging control FET, monitor the voltage of the battery element 4. When the voltage of the battery element 4 exceeds 4.3 to 4.4 V, since a dangerous situation may take place in the battery element 4 such as heat generation, the protection circuits turn off the charging/discharging control FET so as to prohibit the battery element 4 from being charged. When the battery element 4 over-discharges, the terminal voltage of the battery element 4 decreases to the discharging prohibition voltage, and the voltage of the battery element 4 becomes 0 V, the battery element 4 may become an internal shortcircuit state in which the battery element 4 is not rechargeable. Thus, the protection circuits monitor the voltage of the battery element 4. When the voltage of the battery element 4 becomes lower than the discharging prohibition voltage, the protection circuits turn off the discharging control FET to prohibit the battery element 4 from being discharged.

Bottom Cover

The bottom cover 3 closes the bottom opening of the outer jacket member 1. When viewed from the front of the bottom cover 3, it has a rectangular shape and both shorter sides protrude in an elliptical arc shape. The bottom cover 3 has a side wall on its surface that is adjacent to the battery element 4. The side wall fits the bottom opening of the outer jacket member 1. The side wall is formed along a part or whole outer periphery of the bottom cover 3. The side wall is formed at a position spaced apart from the outer periphery of the bottom cover 3 by a length of the outer jacket member 1.

The bottom cover 3 has through-holes. The through-holes pierce the bottom cover 3 from the surface adjacent to the battery element 4 to the surface opposite thereto. Although the number of through-holes is not limited, at least one through-hole is necessary. Preferably, two or more through-holes are necessary. When there are two or more through-holes, when resin is injected, at least one through-hole can be used to remove air from the space formed between the battery element 4 and the bottom cover 3. Thus, the injection property of resin can be improved.

The bottom cover 3 may be formed by directly injecting hot melt resin for example polyamide type resin into the bottom opening of the outer jacket member 1.

Next, a method of producing the battery pack according to the first embodiment of the present invention will be described.

Battery Element Production Step

An anode, a separator, a cathode, and a separator are successively layered in the order. As a result, a laminate is formed. The anode and the cathode have gel electrolyte layers on their both surfaces. The laminate is wound around a flat plate core many times in the lateral direction of the core. As a result, a roll type battery element 4 is produced.

Outer Jacket Member Coating Step

A concave portion 15 that contains a battery element 4 is formed by deeply spin-molding a soft laminate member 1a. At this point, as shown in FIG. 7A, the concave portion 15, which contains the battery element 4, is formed at a position slightly shifted to the right from the center position of the soft laminate member 1a. The battery element 4 is placed in the concave portion 15 formed in the soft laminate member 1a.

Thereafter, as shown in FIG. 7A, a hard laminate member 1b and the soft laminate member 1a are layered so that the hard laminate member 1b is slightly shifted to the right from the soft laminate member 1a. Thus, when the soft laminate member 1a and the hard laminate member 1b are layered as shown in FIG. 7A, a left non-layered area of the soft laminate member 1a and a right non-layered area of the hard laminate member 1b take place. As will be described later, after the ends of the soft laminate member 1a and the hard laminate member 1b are folded outside the bottom surface of the concave portion 15 of the soft laminate member 1a, these areas allow the polypropylene layer of the soft laminate member 1a and the polypropylene layer of the hard laminate member 1b to be adhered with a predetermined width.

In the layout shown in FIG. 7A, the four sides of the opening of the concave portion 15 are heat-adhered under a reduced atmospheric pressure. In this case, the overlap portions of the polypropylene layers may be heat-adhered. When the periphery of the concave portion 15 is heat-adhered, the battery element 4 is sealed.

Thereafter, as shown in FIG. 7A, a heat adhesive sheet 15a of predetermined shape is placed outside the bottom surface of the concave portion 15. The heat adhesive sheet 15a is an auxiliary member that heat-adheres the nylon layers or the PET layers of the soft laminate member 1a. In consideration of the whole thickness of the battery pack, it is preferred that the thickness of the heat adhesive sheet 15a be in the range from 10 μm to 60 μm and the melting point thereof be around 100° C. It is preferred that the melting point of the heat adhesive sheet 15a not thermally affect the battery element 4.

Figure 11:
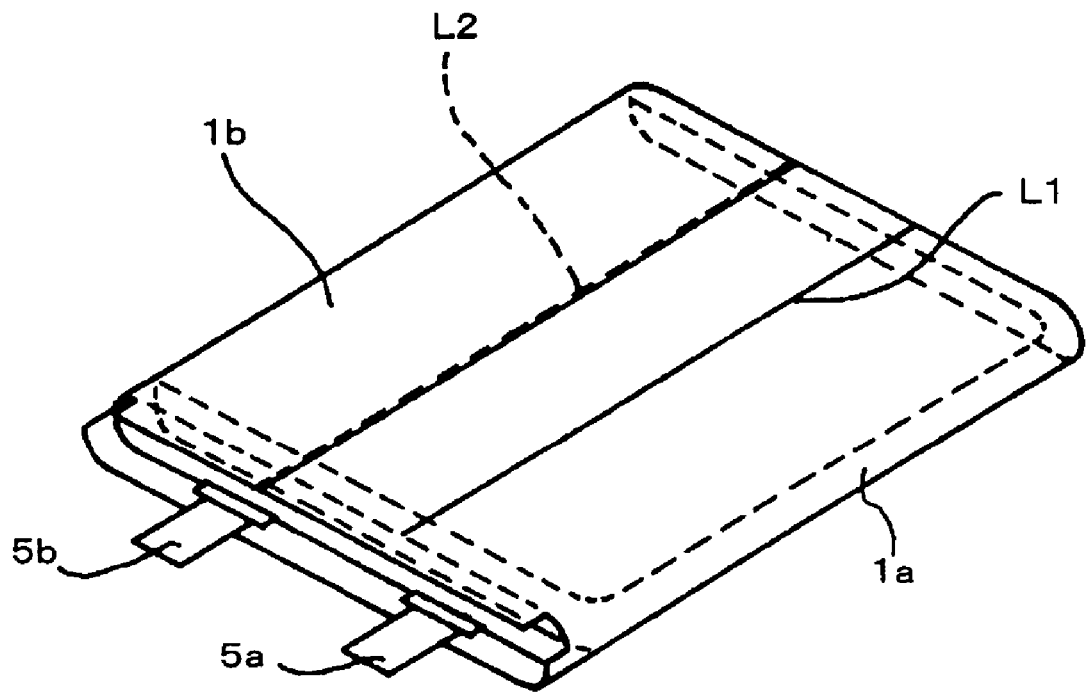
FIG. 11 is a perspective view showing an example of the appearance of the battery element coated with the outer jacket member.

Thereafter, as shown in FIG. 11, both the ends of the soft laminate member 1a and the hard laminate member 1b are folded outside the bottom surface of the concave portion 15 of the soft laminate member 1a. Namely, the shorter sides 13a and 14a of the soft laminate member 1a and the shorter sides 13b and 14b of the hard laminate member 1b are folded inward. Thereafter, the end portions of the soft laminate member 1a and the hard laminate member 1b are heat-adhered. In addition, the soft laminate member 1a is heat-adhered to the outside of the bottom surface of the concave portion 15. Thus, the soft laminate member 1a and the hard laminate member 1b seal the concave portion 15 that contains the battery element 4. As a result, a top opening and a bottom opening are formed.

Figure 12:
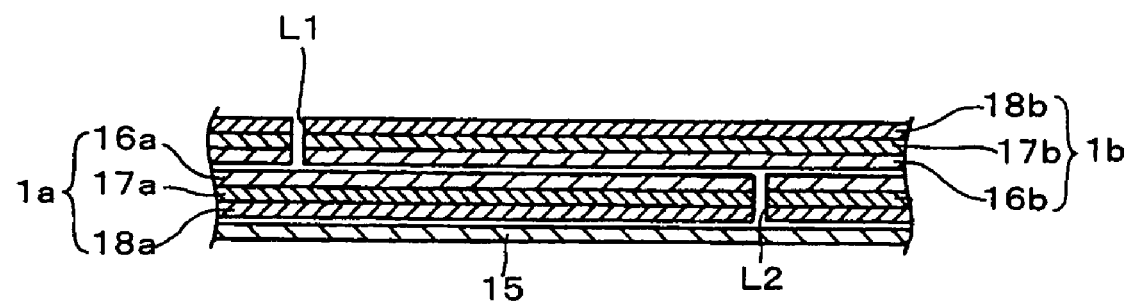
FIG. 12 is an enlarged sectional view showing the outer jacket member that coats the battery element.

As shown in FIG. 12, when the hard laminate member 1b coats the battery element 4, the shorter sides 13b and 14b of the hard laminate member 1b contact or a joint L1 of which the end surfaces of the shorter sides 13b and 14b face with a short gap takes place. Inside the hard laminate member 1b, the shorter sides 13a and 14a of the soft laminate member 1a contact or a joint L2 of which the end surfaces of the shorter sides 13a and 14a face with a short gap takes place. In FIG. 12, reference numeral 16b represents a polypropylene layer of the hard laminate member 1b. Reference numeral 17b represents a hard aluminum layer. Reference numeral 18b represents a nylon layer or a PET layer. In this example, the shorter sides 13a and 14a contact or their end surfaces face with a small gap. Instead, the end surfaces of the shorter sides 13a and 14a may face with a gap having a predetermined width.

As shown in FIG. 12, the nylon layer or the PET layer 18a of the soft laminate member 1a is placed above the heat adhesive sheet 15a. Thus, the heat adhesive sheet 15a is sandwiched by the nylon layers or the PET layers 18a. Thus, when the nylon layers or PET layers 18a are heated from the outside, they can be adhered. In addition, since the polypropylene layers 16a and 16b of the soft laminate member 1a and the hard laminate member 1b contact, when they are heated from the outside, the polypropylene layers 16a and 16b can be adhered.

Thus, a battery pack that is coated with the laminate members that function as an outer jacket member can be produced without need to use a box-shaped resin case and left and right resin frames.

Top Cover Fitting Step

Figure 13:
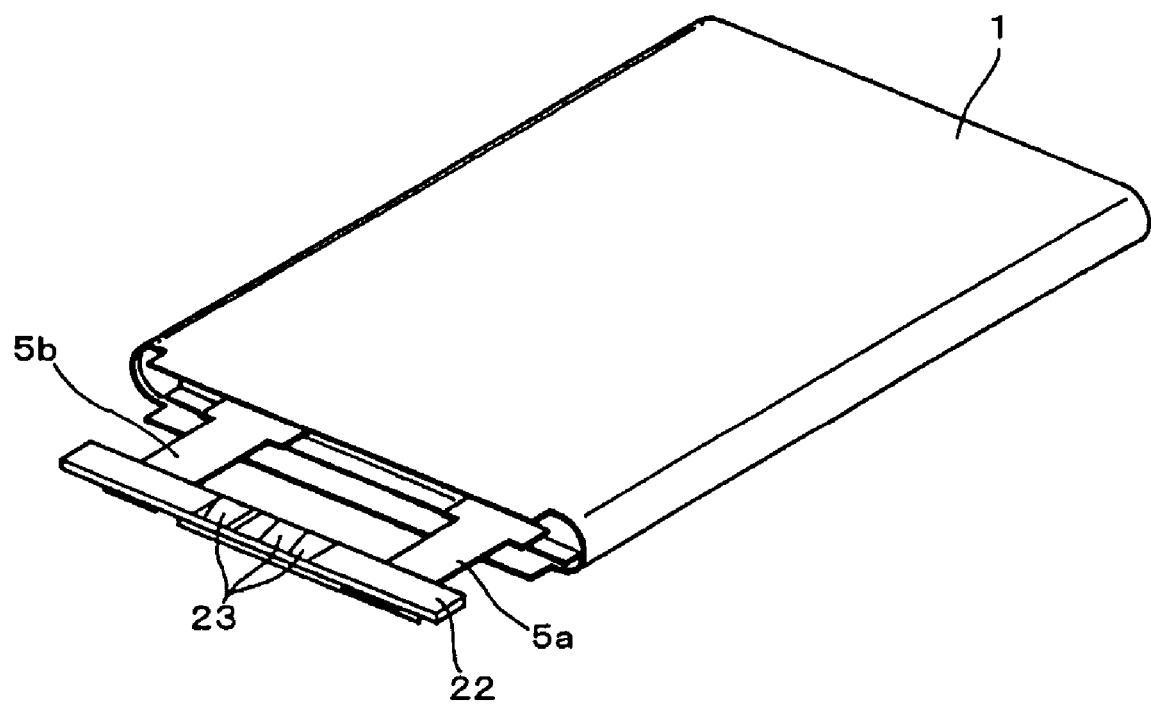
FIG. 13 is a perspective view describing a production method of the battery pack according to the first embodiment of the present invention.

Thereafter, as shown in FIG. 13, electrode terminals 5a and 5b are connected to a circuit board 22 by for example resistance welding or ultrasonic welding. Thereafter, as shown in FIG. 14, the circuit board 22 is inserted into an open space of the upper holder 2a so that the upper holder 2a covers the circuit board 22. The upper holder 2a is a resin mold member produced at for example a different injection molding step.

A hold member that horizontally holds the circuit board 22 is disposed in the upper holder 2a. Three openings 21 are formed on the upper surface of the upper holder 2a at positions corresponding to contact portions 23 of the circuit board 22. The contact portions 23 extend outside through the openings 21. The width of the upper holder 2a is slightly smaller than the inner size of the top opening of the outer jacket member 1.

Thereafter, as shown in FIG. 15, a lower holder 2b is mounted to the upper holder 2a. The lower holder 2b is a resin mold member produced at for example a different injection molding step. Ribs 25a, 25b, and 25c are disposed at both the ends and the center position of one longer side of the lower holder 2b. The ribs 25a, 25b, and 25c face the upper holder 2a. The end surfaces of the ribs 25a, 25b, and 25c receive the circuit board 22 of the upper holder 2a. Thus, the ribs 25a, 25b, and 25c can securely support the circuit board 22.

Figure 16:
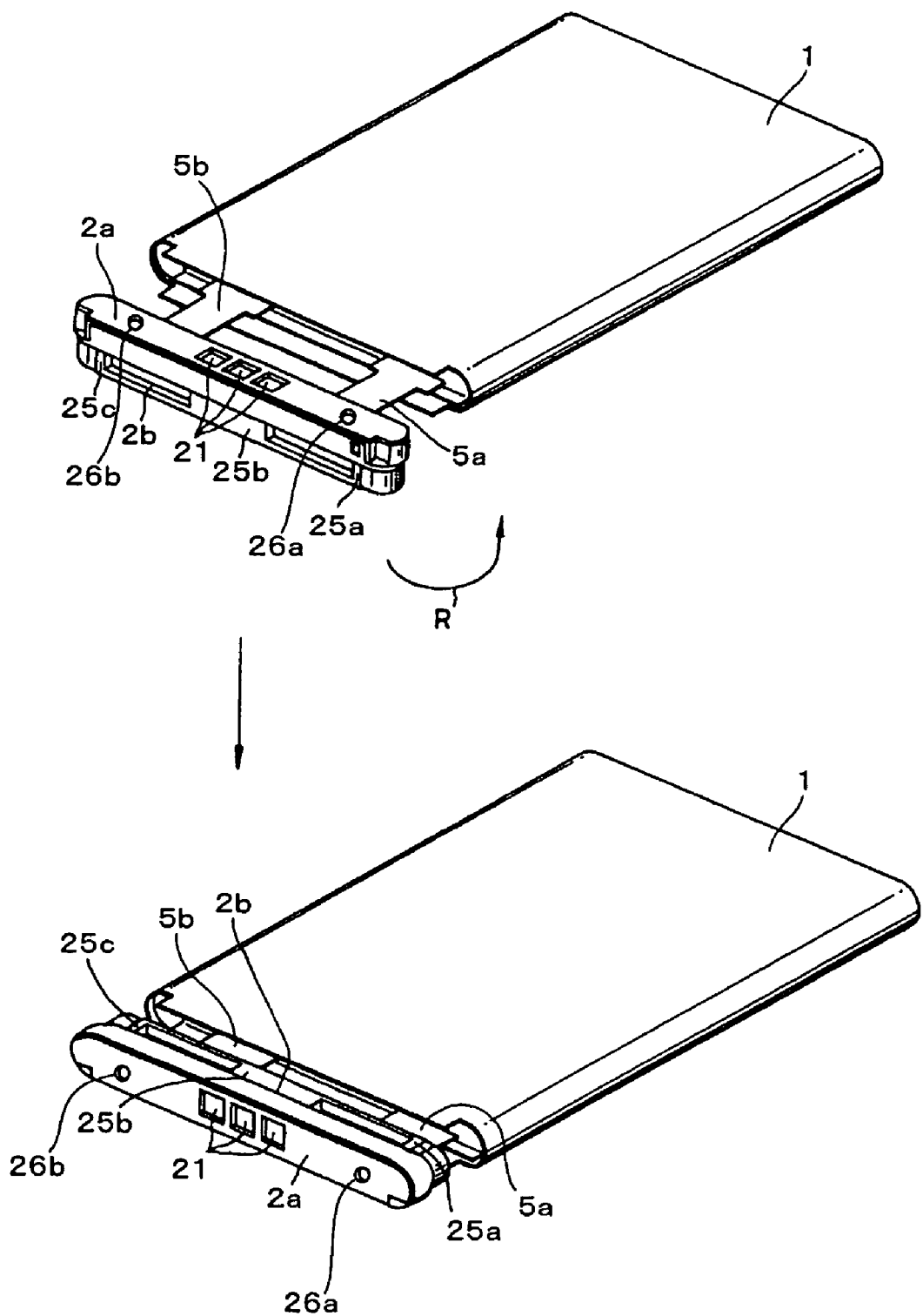
FIG. 16 is a perspective view describing the production method of the battery pack according to the first embodiment of the present invention.

Thereafter, as denoted by arrow R shown in FIG. 16, the upper holder 2a and the lower holder 2b that have been fitted are turned in the counterclockwise direction for 90 degrees by hand or jig. As a result, the orientation of the circuit board 22 is changed by 90 degrees. The circuit board 22 is held by the upper holder 2a and the lower holder 2b, not exposed outside. Thus, when the circuit board 22 is turned, it can be prevented from being contaminated and damaged by hand or jig.

Figure 17:
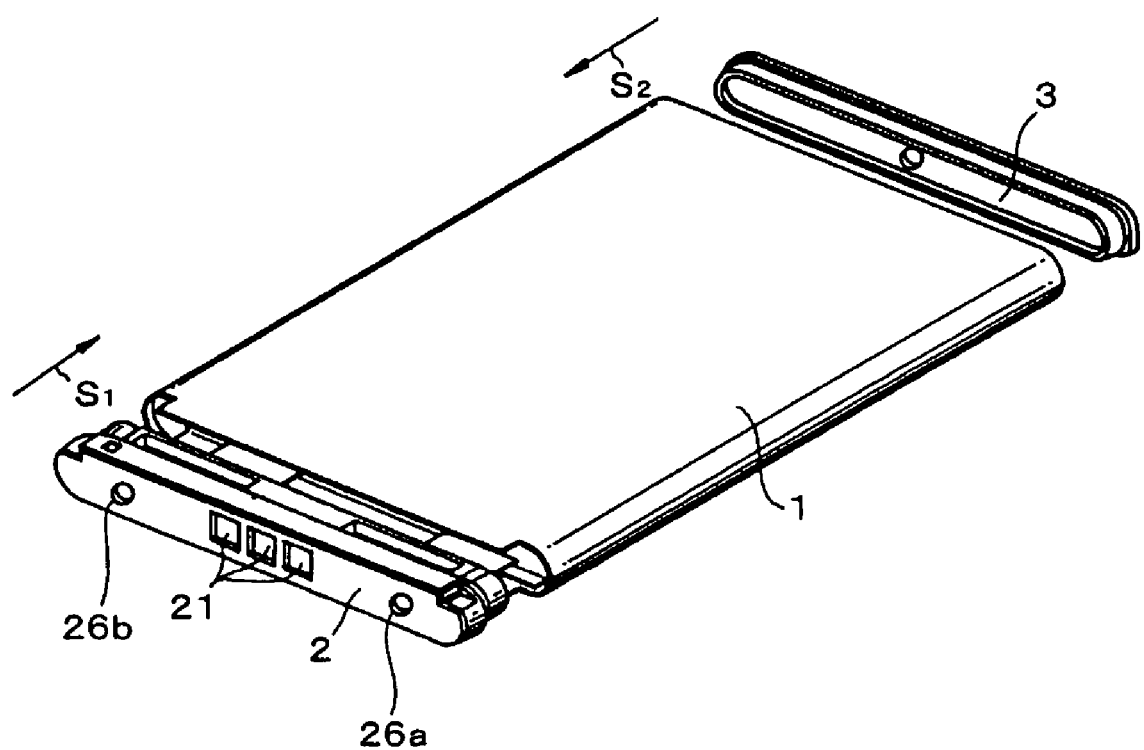
FIG. 17 is a perspective view describing the production method of the battery pack according to the first embodiment of the present invention.

Thereafter, as shown in FIG. 17, while the electrode terminals 5a and 5b are being folded, the upper holder 2a and the lower holder 2b are pushed into the top opening (in the direction of arrow S1) of the outer jacket member 1. As a result, the top cover 2 is fitted to the top opening of the outer jacket member 1. As described above, since the width of the top cover 2 is slightly smaller than the inner size of the top opening of the outer jacket member 1, the upper holder 2a and the lower holder 2b, which hold the circuit board 22, can be contained in the top opening formed of the hard laminate member 1b in the vicinity of the end surface of the outer jacket member 1.

Bottom Cover Fitting Step

Thereafter, as shown in FIG. 17, the side wall of the bottom cover 3 is pushed into the bottom opening of the outer jacket member 1 (in the direction denoted by arrow S2). As a result, the side wall of the bottom cover 3 is fitted to the bottom opening of the outer jacket member 1. In addition, the bottom cover 3 covers the bottom opening of the outer jacket member 1. The bottom cover 3 is a resin mold member produced at for example a different injection molding step.

Heat Adhesive Step

Thereafter, with a predetermined jig, the outer jacket member 1, the top cover 2, and the bottom cover 3 are held and heat-adhered. In other words, heater blocks made of a metal such as copper are placed above and below the end of the top of the outer jacket member 1. The end of the top of the outer jacket member 1 is pressed with the heater blocks so that the periphery of the top cover 2 and the adhesive layer of the inner surface of the hard laminate member 1b are heat-adhered. Likewise, the heater blocks are placed above and below the end of the bottom of the outer jacket member 1. The end of the bottom of the outer jacket member 1 is pressed with the heater blocks so that the periphery of the bottom cover 3 and the polypropylene layer of the inner surface of the hard laminate member 1b are heat-adhered.

Resin Injection Step

Thereafter, molten resin is injected into the space formed between the battery element 4 and the top cover 2 through the through-holes 26a and 26b. Thereafter, the resin is solidified. As a result, the top cover 2 is adhered to the end surface of the battery element 4.

Thereafter, molten resin is injected into the space formed between the battery element 4 and the bottom cover 3 through through-holes of the bottom cover 3. Thereafter, the resin is solidified. As a result, the bottom cover 3 is adhered to the end surface of the battery element 4. The injected resin is not limited to a particular type as long as the resin has low viscosity when it is injected into the top and bottom openings of the outer jacket member 1. Examples of the resin are polyamide type hot melt resin, polyolefin type hot melt resin, nylon, polypropylene (PP) resin, polycarbonate (PC) resin, and acrylonitrile-butadiene-styrene resin (ABS).

In the steps described above, a battery pack according to the first can be produced.

According to the first embodiment, the following effect can be obtained.

The battery pack has the square or rectangular outer jacket member 1 having open ends, the battery element 4 contained therein, and the top cover 2 and bottom cover 3 that are fitted to both the open ends of the outer jacket member 1. The top cover 2 has the concave portions 6a and 6b at both sides of one longer side. The outer jacket member 1 has the cut portions 10a and 10b that expose at least the concave portions 6a and 6b of the top cover 2. Thus, the battery pack can be prevented from being attached with reverse polarities without a tradeoff of the decrease of the volume efficiency.

The outer jacket member 1 is composed of the soft laminate member 1a and the hard laminate member 1b, the shorter sides 13a and 14a of the soft laminate member 1a being slightly smaller than the shorter sides 13b and 14b of the hard laminate member 1b. The soft laminate member 1a and the hard laminate member 1b are layered so that only the hard laminate member 1b is present at the top of the outer jacket member 1. As a result, the top cover 2 is aligned and fitted on the shorter sides of the soft laminate member 1a and the hard laminate member 1b. The periphery of the top cover 2 is heat-adhered with the polypropylene layer of the hard laminate member 1b on the longer sides of the soft laminate member 1a and the hard laminate member 1b.

Next, the first embodiment will be specifically described. The present invention is not limited to the following examples. Next, with reference to the accompanying drawings, the first embodiment and comparison examples will be described.

First Embodiment

Figure 18:
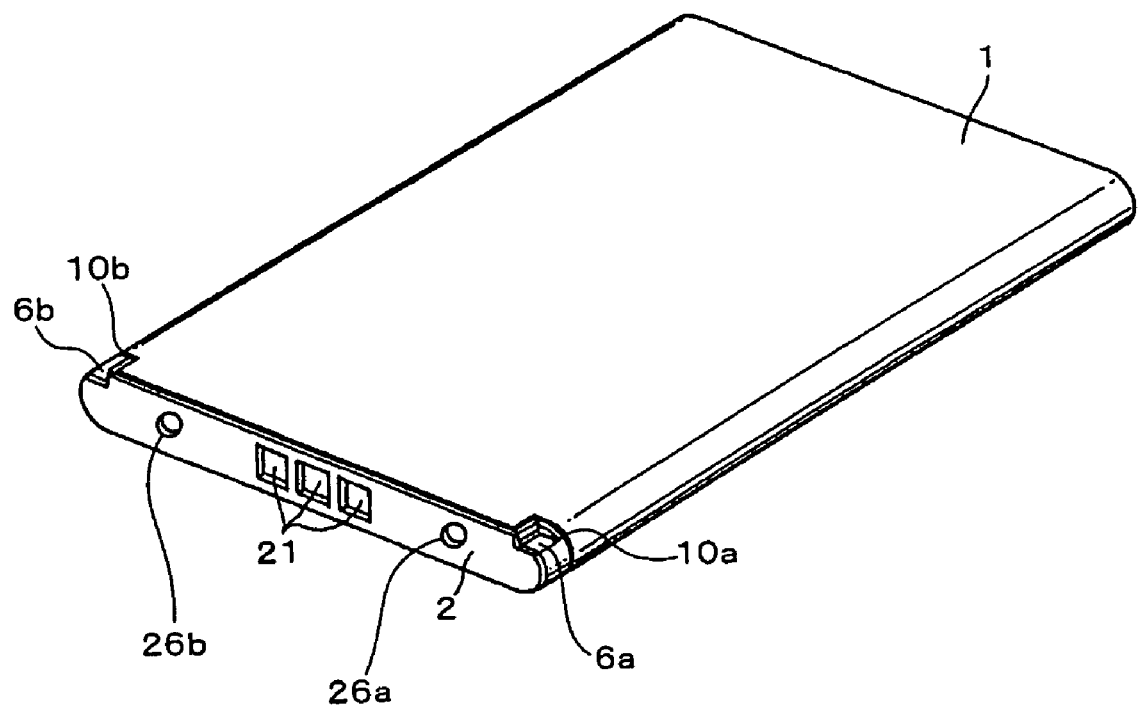
FIG. 18 is a perspective view showing the outer shape of the battery pack according to the first embodiment of the present invention.

FIG. 18 is a perspective view showing the outer shape of the battery pack according to the first embodiment. The concave portions 6a and 6b are formed at both ends of one longer side of the top cover 2. The outer jacket member 1 has the cut portions 10a and 10b that expose the concave portions 6a and 6b of the top cover 2.

First Comparison Example

Figure 19:
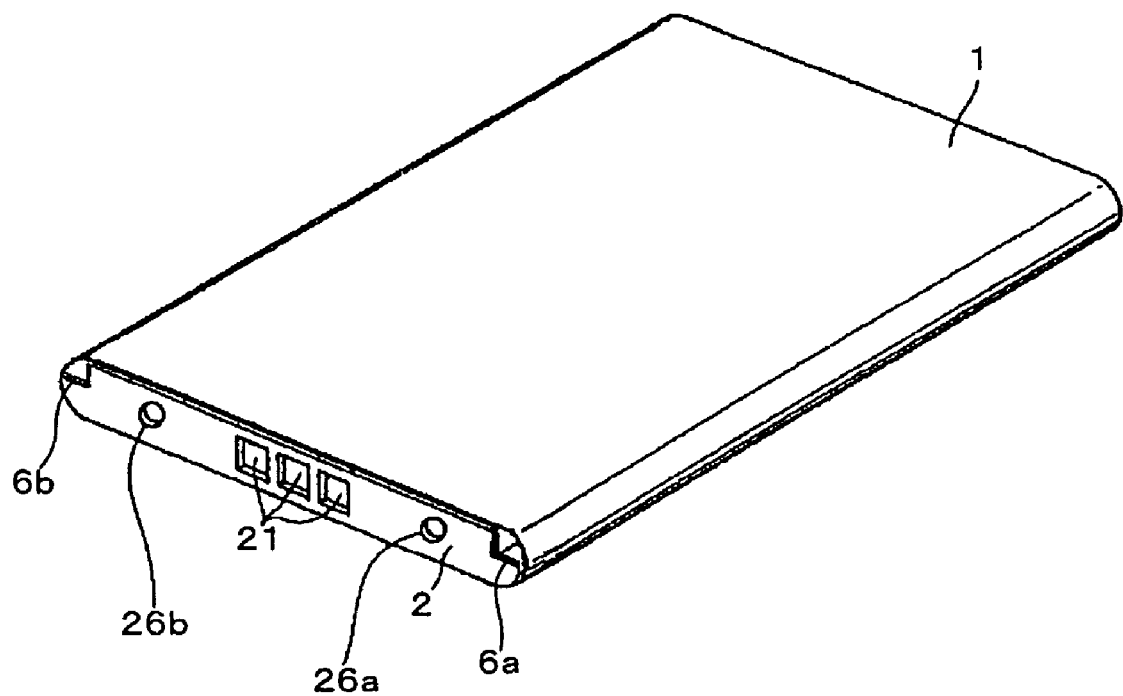
FIG. 19 is a perspective view showing the outer shape of a battery pack according to a first comparison example.

FIG. 19 is a perspective view showing the outer shape of a battery pack according to a first comparison example. The structure of the battery pack according to the first comparison example is the same as the structure of the battery pack according to the first embodiment except that the battery pack according to the first comparison example omits the cut portions 10a and 10b of the outer jacket member 1.

Second Comparison Example

Figure 20:
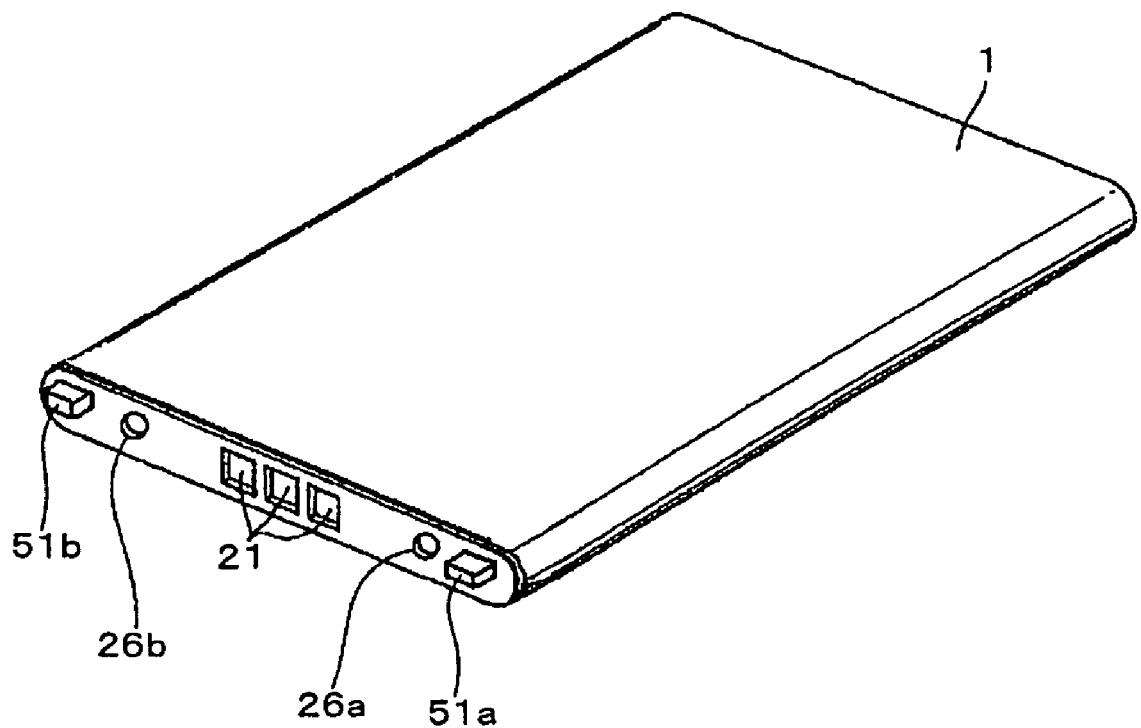
FIG. 20 is a perspective view showing the outer shape of a battery pack according to a second comparison example.

FIG. 20 is a perspective view showing the outer shape of a battery pack according to a second comparison example. The structure of the battery pack according to the second comparison example is the same as the structure of the battery pack according to the first embodiment except that the battery pack according to the second comparison example has protrusion portions 51a and 51b that distinguish the cathode and anode on an end surface of the top of the battery pack instead of the concave portions 6a and 6b of the top cover 2 and the cut portions 10a and 10b of the outer jacket member 1.

Third Comparison Example

Figure 21:
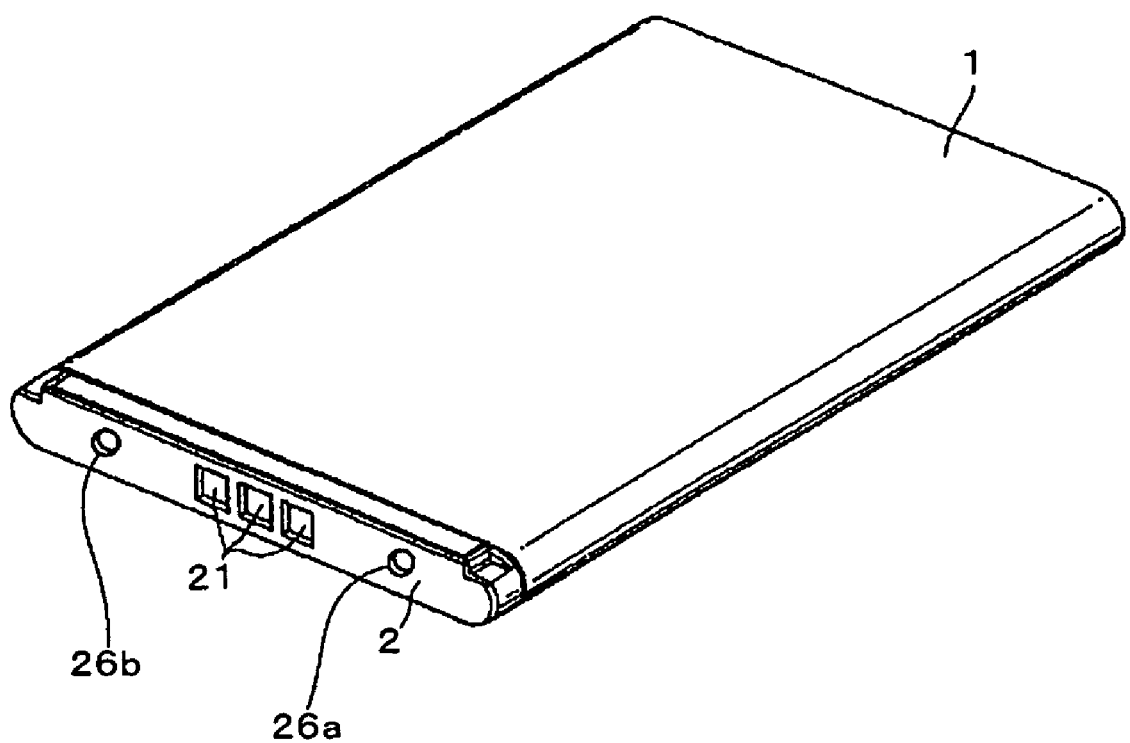
FIG. 21 is a perspective view showing the outer shape of a battery pack according to a third comparison example.

FIG. 21 is a perspective view showing the outer shape of a battery pack according to a third comparison example. The structure of the battery pack according to the third comparison example is the same as the structure of the battery pack according to the first embodiment except that the end surface of the top cover 2 protrudes from the top opening of the outer jacket member 1 instead of the cur portions 10a and 10b of the outer jacket member 1 so that the concave portions 6a and 6b of the top cover 2 are not coated with the outer jacket member 1.

With the first embodiment and the comparison examples, the following results are obtained.

In the battery pack according to the first comparison example, since the whole periphery of the top cover 2 is coated with the outer jacket member 1, the electronic device side does not have the flexibility of the design of protrusion portions that fit the concave portions 6a and 6b. When the outer jacket member 1 that covers the concave portions 6a and 6b is dented at the concave portions 6a and 6b due to an external shock for example in the case that the battery pack is dropped to the floor, the battery pack may be prevented from being attached to the electronic device.

In the battery pack according to the second comparison example, although the protrusion portions 51a and 51b disposed on the end surface of the top cover can distinguish the cathode and anode, the external size of the battery pack becomes large. In addition, the shapes of the protrusion portions 51a and 51b need to be matched with the shape of the electronic device side. Thus, the versatility of the battery pack is lost. In addition, when the protrusion portions 51a and 51b are damaged due to an external shock for example in the case that the battery pack is dropped to the floor, the cathode and anode may not be distinguished.

In the battery pack according to the third comparison example, since the space for the heat adhesion of the top cover 2 and the outer jacket member 1 is large, it is necessary to increase the height of the top cover 2. As a result, the volume efficiency of the battery pack may not be improved.

In contrast, in the battery pack according to the first embodiment, since the top cover 2 has the concave portions 6a and 6b on both sides of one longer side and the outer jacket member 1 has the cut portions 10a and 10b that expose at least the concave portions 6a and 6b of the top cover 2, the problems of the first to third comparison examples do not occur. In other words, in the battery pack according to the first embodiment, the volume efficiency does not decrease. In addition, the battery pack according to the first embodiment provides benefits of which the outer jacket member 1 is not deformed due to an external shock for example in the case that the battery pack is dropped to the floor, excellent versatility, and excellent volume efficiency.

Next, a second embodiment will be described. According to the second embodiment, an outer jacket member is molded so that it has an elliptical section that has different radiuses of curvature. In the following description, similar portions to those of the first embodiment are denoted by similar reference numerals and their description will be omitted.

According to the second embodiment, when a battery element is coated with an outer jacket member, a hard laminate member 1b and a soft laminate member 1b are bent along the shape of the battery element. Since the soft laminate member 1a is spin-molded, end portions of top and bottom openings of the hard laminate member 1b can be easily bent. When the soft laminate member 1a is molded, the radius of curvature from the bottom surface portion of the battery pack to each of the side surface portions thereof becomes small. On the other hand, the radius of curvature from each of the side surface portions of the battery pack to the upper surface thereof is larger than the radius of curvature from the bottom surface portion to each of the side surface portions due to the rigidity of a metal layer of a laminate film. The soft laminate member 1a and the hard laminate member 1b are molded so that their elliptical section has different radiuses of curvature as a battery cell 29 shown in FIG. 22. Thereafter, CPP layers of the hard laminate member 1b and the soft laminate member 1a are heat-adhered. As a result, a battery pack of which the hard laminate member 1b as the outermost layer protects the battery element 4 is obtained.

In this case, it is preferred that an adhesive sheet 15a be placed outside a bottom surface of a concave portion 15 formed in the soft laminate member 1a. The adhesive sheet 15a is an auxiliary member that allows nylon layers or PET layers of the soft laminate member 1a to be heat-adhered.

Thereafter, a cathode terminal 5a and an anode terminal 5b that extend from the top portion of the battery cell 29 molded in a predetermined shape and a protection circuit that has been mounted on a circuit board are resistance-welded or ultrasonic-welded. The circuit board connected to the battery element 4 is inserted into a space of a top cover 27 of which an upper holder 27a and a lower holder 27b have been molded and fitted as shown in FIG. 23.

Figure 24:
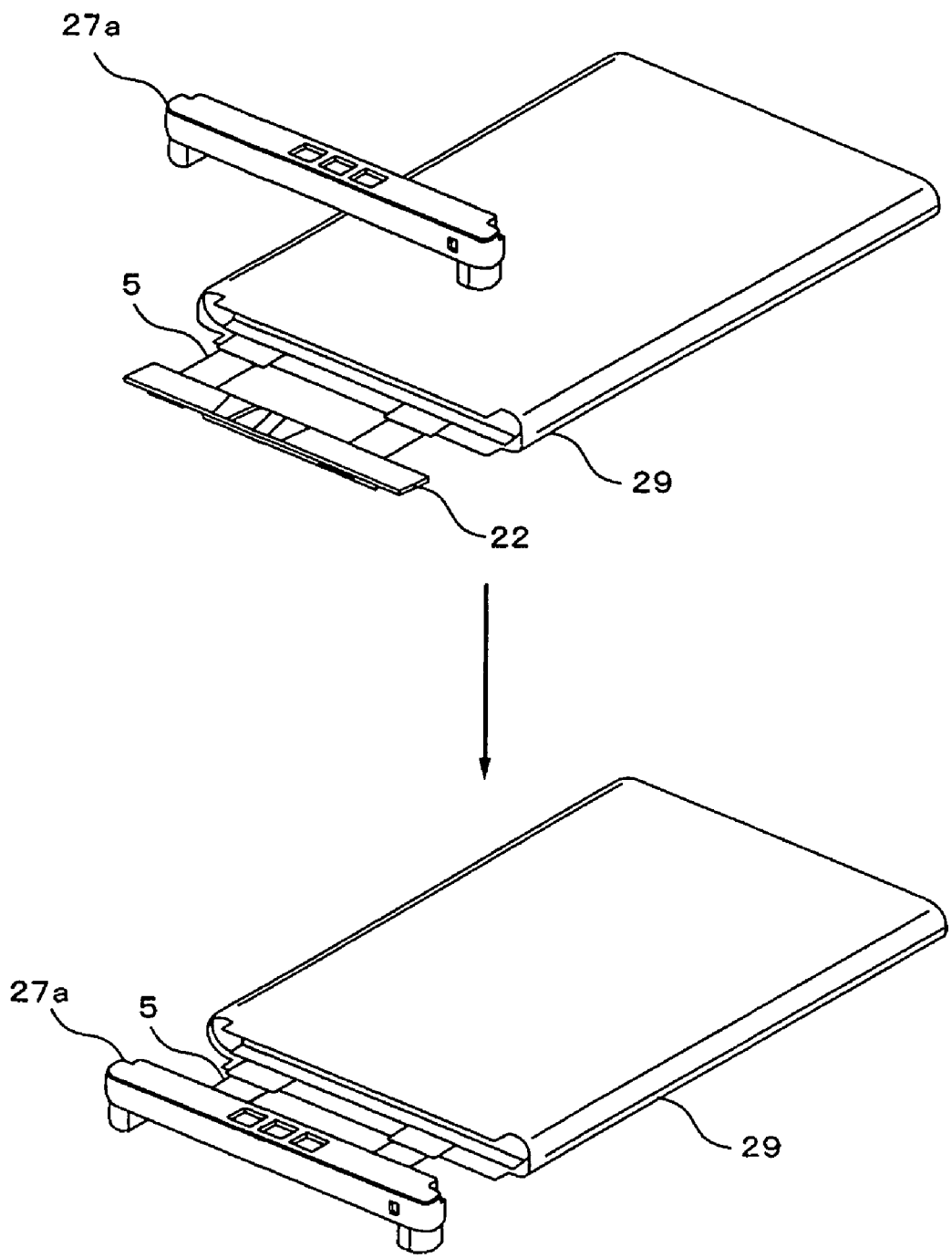
FIG. 24 is a schematic diagram showing the state of which the top cover produced according to the second embodiment of the present invention is fitted to a battery cell.
Figure 25:
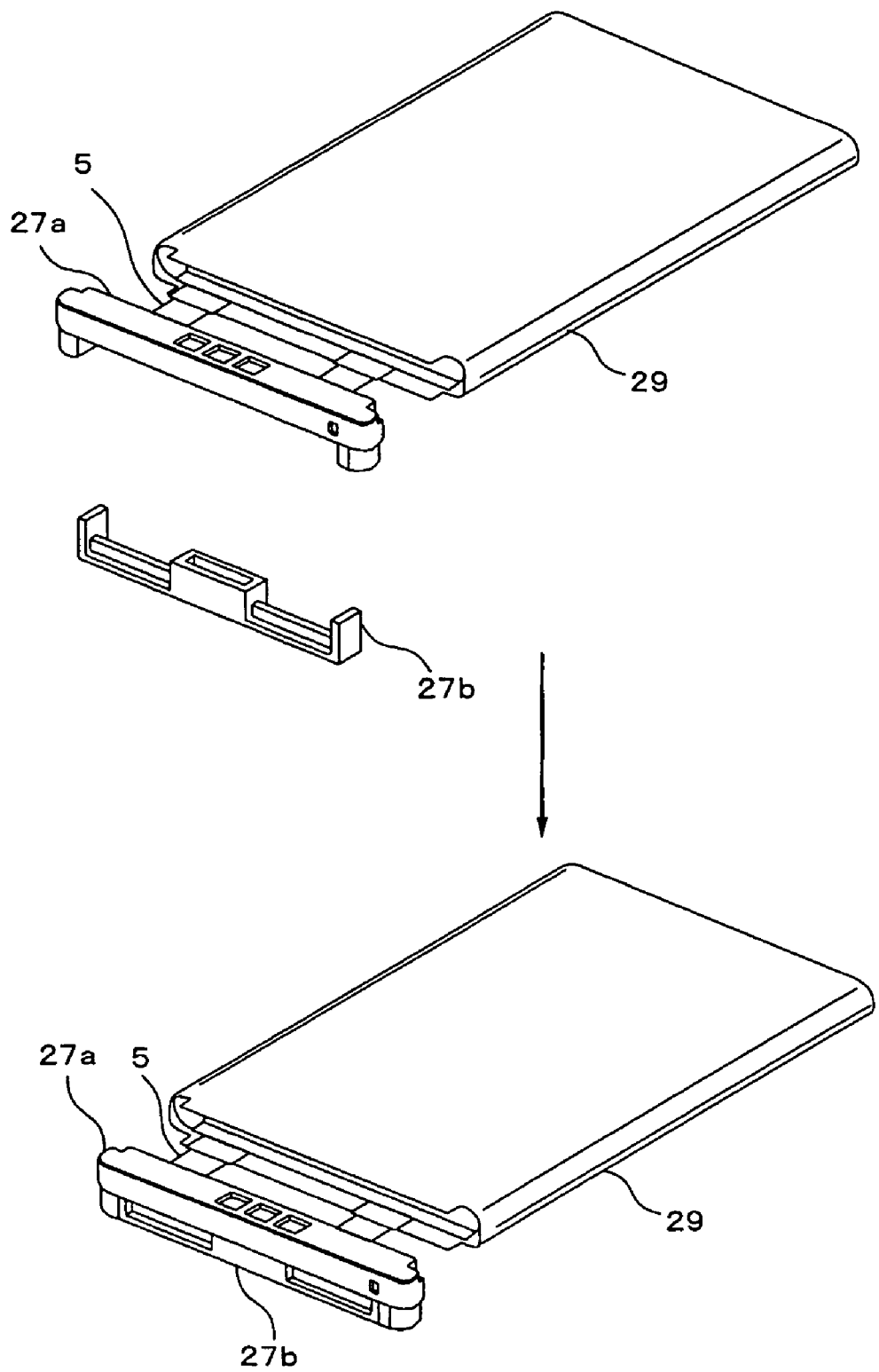
FIG. 25 is a schematic diagram showing the state of which the top cover produced according to the second embodiment of the present invention is fitted to the battery cell.

Next, with reference to FIG. 24, FIG. 25, and FIG. 26, a process of steps that start with a step of which the circuit board is contained in the top cover and that end with a step of which the top cover is connected to the hard laminate member 1b as the outer jacket member will be described. FIG. 24, FIG. 25, and FIG. 26 are perspective views showing steps of which the top cover is fitted to the outer jacket member.

As shown in FIG. 24, the upper holder 27a is placed above the circuit board 22 connected to the battery cell 29 so that the upper holder 27a covers the circuit board 22. Thereafter, as shown in FIG. 25, the lower holder 27b and the upper holder 27a are aligned and fitted so that the circuit board 22 is contained therebetween. As shown in FIG. 26, the orientation of the top cover 27 is changed so that the lower holder 27b faces the battery cell 29. Thereafter, the top cover 27 is fitted to one opening portion of the battery cell 29. When the top cover 27 is fitted to the opening portion of the battery cell 29, the electrode terminals 5 is folded and contained in the battery cell 29.

Figure 27A:
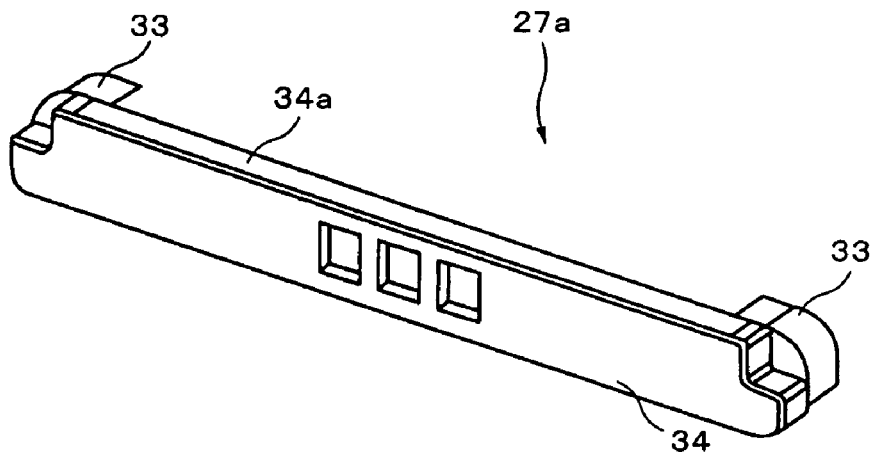
FIG. 27A, FIG. 27B, and FIG. 27C are a perspective view, a front view, and a perspective view showing the top cover produced according to the second embodiment of the present invention.
Figure 27B:
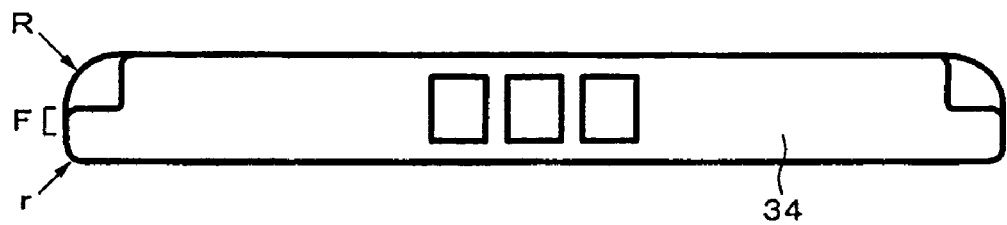

The top cover 27 is heat-adhered to the hard laminate member 1b, which is the outer jacket member, along with a bottom cover 28 that is fitted to the bottom portion of the battery cell 29. As shown in FIG. 27A, the upper holder 27a of the top cover 27 is composed of an end surface R portion 33 fitted to the inside of the battery cell 29, an upper surface portion 34 as a part of the outer jacket of the battery pack, and a heat adhesion portion 34a that is disposed at a side surface portion on a longer side of the upper surface portion 34 and that is heat-adhered to the hard laminate member 1b.

Figure 27C:
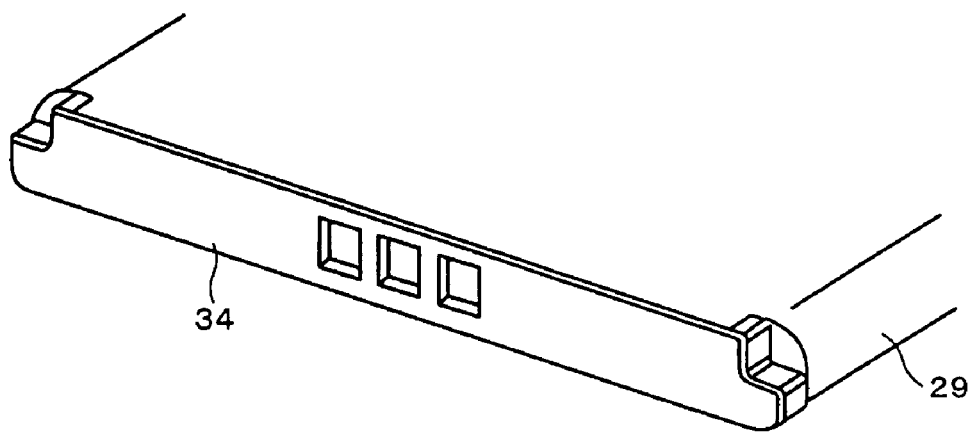

When the top cover 27 is fitted to the battery cell 29, the contact property of the upper holder 27a and the hard laminate member 1b may deteriorate. To prevent this problem, the end surface R portion 33 is molded so that it has corner portions that have different radiuses of curvature R and r. In addition, the upper surface portion 34 is molded so that it has corner portions having the same radiuses of curvature as the end surface R portion 33. Thus, as shown in FIG. 27C, the shape of the top cover 27 and the shape of the battery cell 29 become the same. As a result, the contact property of the battery cell 29 and the top cover 27 is improved and the top cover 27 is prevented from peeling off with a shock.

The upper surface portion 34 has flat surface portions F on the left and right side surfaces. The flat surface portions F allow the battery pack to easily aligned with the battery pack slot of the electronic device. In addition, the flat surface portions F prevent the battery pack from being misaligned from the battery pack slot of the electronic device.

Figure 28:
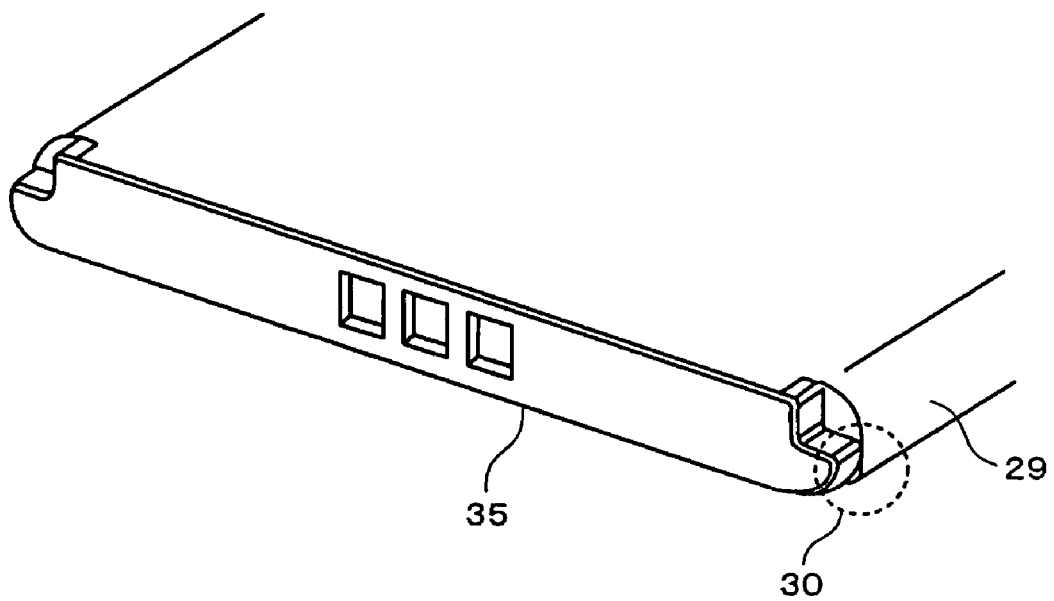
FIG. 28 is a schematic diagram showing the structure of a battery pack of related art.

For easy understanding for this embodiment, FIG. 28 shows the state of which a top cover 35 that is used in the related art and that has an elliptical section is fitted to a battery cell. In this case, since the radius of curvature of the top cover 35 is larger than the radius of curvature of both the ends of the bottom surface portion of the battery cell 29, gaps take place at both the ends of the bottom surface portion of the battery cell 29 as denoted by a dotted line 30. Thus, the contact property of the top cover 35 and the battery cell 29 becomes insufficient. As a result, the insufficient contact property may result in breakage of the battery pack.

Figure 22:
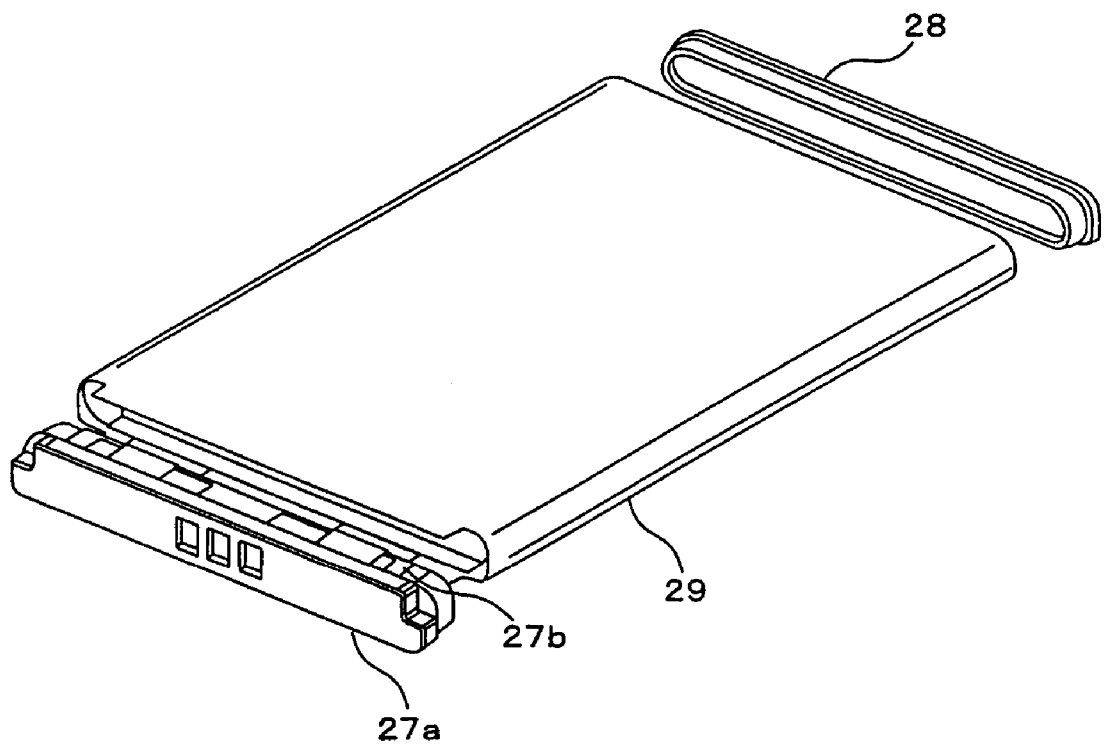
FIG. 22 is a schematic diagram showing the structure of a battery pack according to a second embodiment of the present invention.

As shown in FIG. 22, the bottom cover 28 made of a resin mold member that has been injection-molded is fitted to the bottom opening portion of the battery cell 29. The bottom cover 28 and the outer jacket member of the battery cell 29 are heat-adhered. The bottom cover 28 may have a nearly elliptical section. Instead, like the top cover 27, the bottom cover 28 may have corner portions having different radiuses of curvature r and R. In this case, the contact property of the bottom cover 28 is improved. In addition, the bottom cover 28 can be prevented from peeling off. When the bottom cover 28 has the flat portions F on the left and right sides of a portion as a part of the outer jacket member, the battery pack can be easily aligned with the battery pack slot of the electronic device and prevented from being misaligned therefrom.

As a result, a battery pack that has excellent volume efficiency, strong external shock resistance, and easy alignment property for the battery pack slot can be obtained.

Next, test results of drop tests conducted for the battery pack according to the second embodiment will be described.

A test battery pack that has a structure as shown in FIG. 22 was dropped from a height of 1.5 m to a concrete floor and the separation state of the top cover from the battery pack checked. The end surface R portion fitted to the upper holder that composes the top cover had corner portions so that the radius of curvature of both ends of the bottom surface portion of the battery pack was different from the radius of curvature of both ends of the upper surface of the battery pack. The upper surface portion of the upper holder had concave portions that distinguished the cathode and anode at corner portions having the larger radius of curvature and flat surface portions on the side surfaces formed between the corner portions having the larger radius of curvature and the corner portions having the smaller radius of curvature. The drop tests were conducted in the following conditions.

(1) The battery pack was dropped in the state that the top cover faced downward.

(2) The battery pack was dropped in the state that one side surface faced downward.

As battery packs conducted for the drop tests, 50 test battery packs A having a top cover of which the radius of curvature of both side surfaces of a fitting portion was ½ the thickness of the battery pack and 50 test battery packs B having a top cover of which the radius of curvature from the opening portion of the concave portion containing the battery element to the side surface was smaller than the radius of curvature from the surface of the outside of the bottom surface of the concave portion to the side surface were produced. Each battery pack was tested 30 times. In the drop test (2), each battery pack was tested for each side 15 times.

The states of battery packs that were tested 30 times each were categorized as three types. The number of battery packs categorized as each type was counted.

State A: The top cover was peeled off from the outer jacket member for less than ¼ area of the outer periphery of the top cover.

State B: The top cover was peeled off from the outer jacket member for ¼ to ¾ area of the outer periphery of the top cover.

State C: The top cover was peeled off from the outer jacket member for more than ¾ area of the outer periphery of the top cover (including the state of which the cover was removed from the outer jacket member).

Table 1 shows the test results of the drop test (1).

TABLE 1

| TYPE OF BATTERY PACK | FITTING ERROR RATIO | MEASURED RESULT (PIECES) | | |
|---|---|---|---|---|
| | | STATE A | STATE B | STATE C |
| TEST BATTERY PACK A | 0.50% | 21 | 26 | 3 |
| TEST BATTERY PACK B | 0.02% | 35 | 15 | 0 |

Table 2 shows the test results of the drop test (2).

TABLE 2

| TYPE OF BATTERY PACK | MEASURED RESULTS (PIECES) | | |
|---|---|---|---|
| | STATE A | STATE B | STATE C |
| TEST BATTERY PACK A | 11 | 32 | 7 |
| TEST BATTERY PACK B | 30 | 18 | 2 |

The test results of the drop test (1) represent that in the test battery packs A that use the top cover A used in the related art, when the battery packs were assembled, the fitting error ratio of the outer jacket member and the top cover was high and the peel-off frequency of the top cover and the outer jacket member was relatively high. In contrast, in the test battery packs B having the top cover B according to the embodiment of the present invention, when the battery pack was assembled, the fitting error ratio of the outer jacket member and the top cover was very low and the peel-off frequency of the top cover and the outer jacket member was low. Thus, it is clear that the battery packs B having the top cover B have higher external shock resistance than the battery packs A having the top cover A.

The test results in the drop test (2) represent that in the test battery packs A that use the top cover A used in the related art, the peel-off frequency of the top cover and the outer jacket member was high. In the test battery packs B having the top cover B according to the embodiment of the present invention, the peel-off frequency was low. In the test battery packs A having the top cover A, the outer size difference of the outer jacket member and the top cover A was large. In the test battery packs B having the top cover B, the equality of the shape of the side surface portion was high. That would result in the difference of shock absorption performances.

Figure 1A:
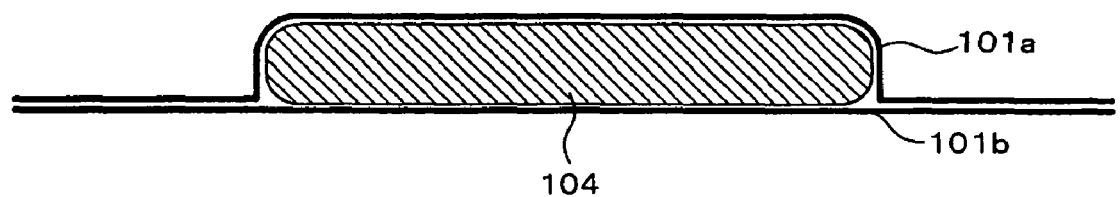
FIG. 1A and FIG. 1B are sectional views showing the structure of a related art battery cell.
Figure 1B:
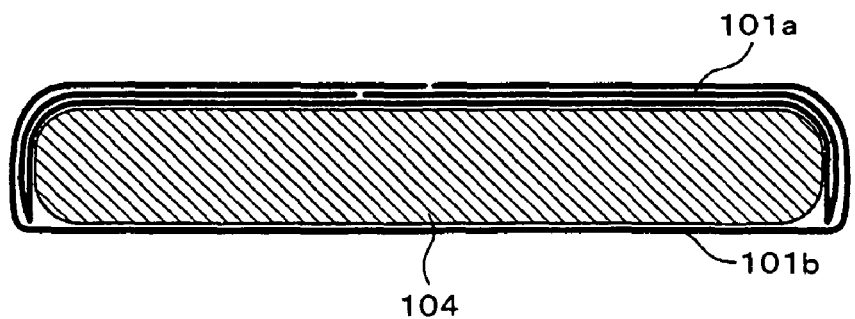
Figure 2:
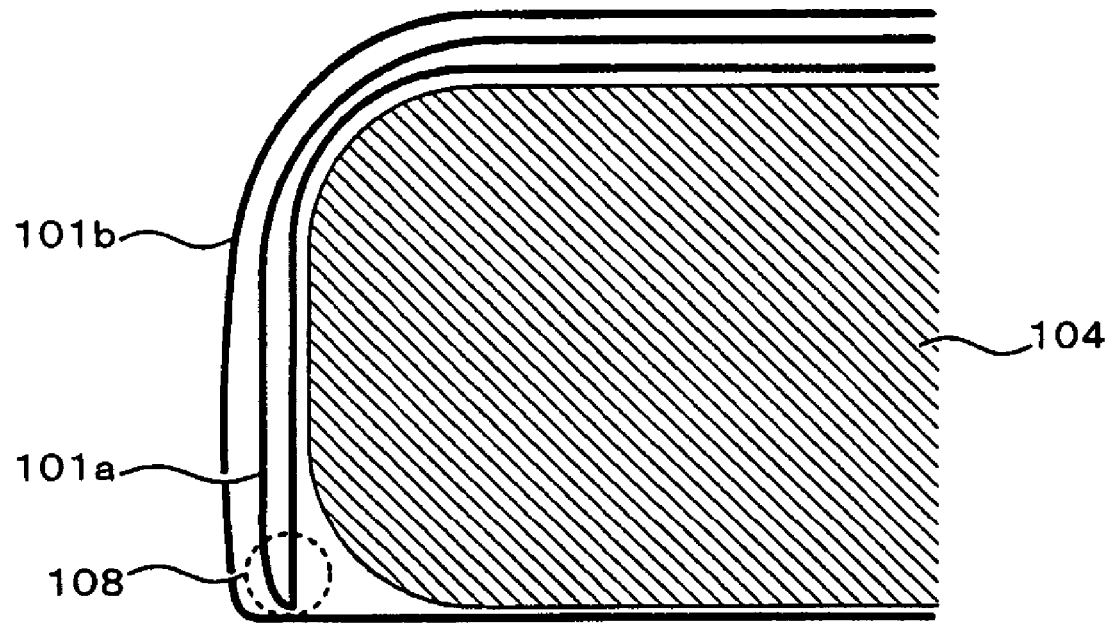
FIG. 2 is a schematic diagram showing the structure of a related art battery cell.
Figure 3A:
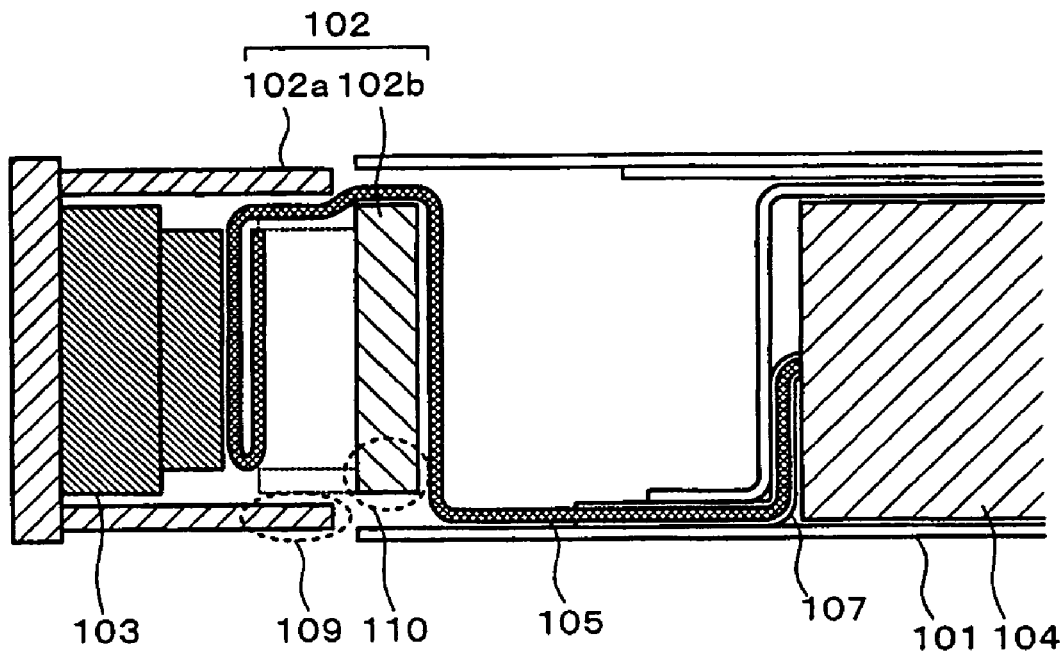
FIG. 3A and FIG. 3B are sectional views showing the structure of a related art battery pack.
Figure 3B:
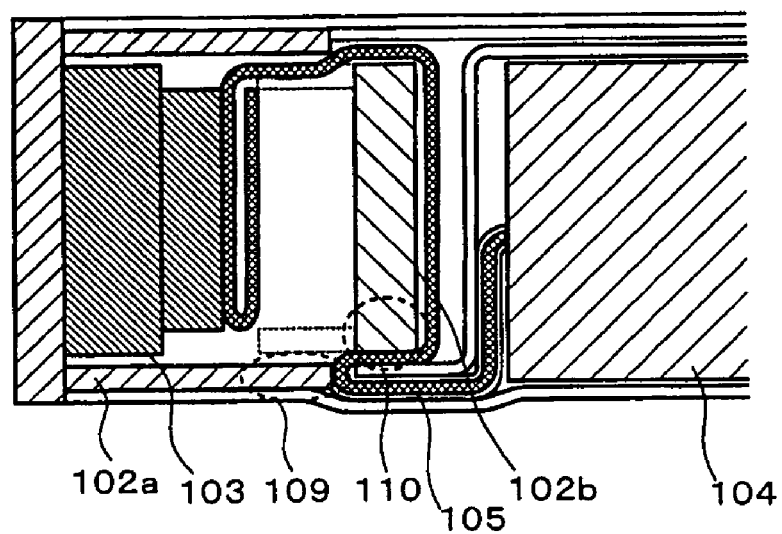

Next, a third embodiment will be described. In the battery pack used in the related art, the circuit board 103 is contained in the top cover 102 composed of the upper holder 102a and the lower holder 102b. The top cover 102 is fitted to one opening portion of the outer jacket member 1. At this point, as shown in FIG. 3A and FIG. 3B, the electrode terminals 105 connected to the circuit board 103 are folded and contained in the battery pack.

Figure 29:
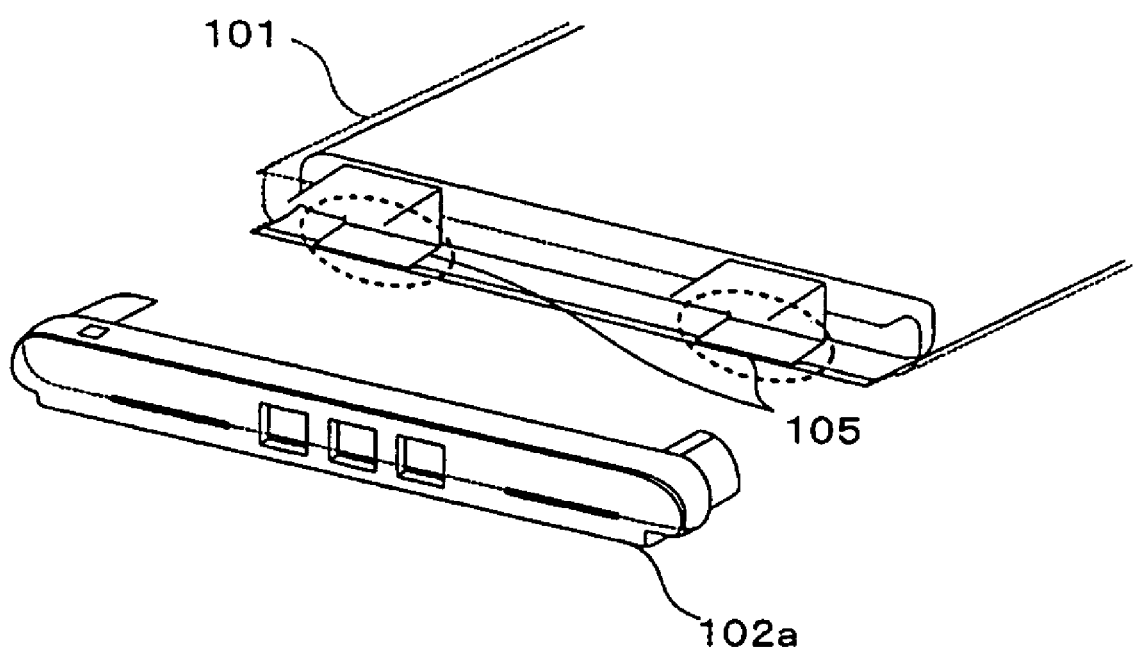
FIG. 29 is a schematic diagram showing the structure of a top cover and a battery cell used in the battery pack of related art.

For easy understanding of the third embodiment of the present invention, FIG. 29 shows the layout of an electrode terminal lead portion and an upper holder 102a of a battery pack used in the related art. In the electrode terminal lead portion denoted by dotted lines shown in FIG. 29, electrode terminals extend from nearly end portions of a hard laminate member as an outer jacket member. Thus, when the top cover is fitted to the hard laminate member, opposite portions denoted by solid lines shown in FIG. 29 of the upper holder 102a press the electrode terminals 5 of the electrode terminal lead portion.

To prevent the opposite portions from interfering with the folded electrode terminals 105, it is necessary to provide a space between the top cover 102 and the battery element or decrease the fitting portion that is heat-adhered to the outer jacket member. However, in the former structure, the volume efficiency deteriorates. In the later structure, the heat adhesion strength of the top cover and the hard laminate member is not sufficient.

Figure 30:
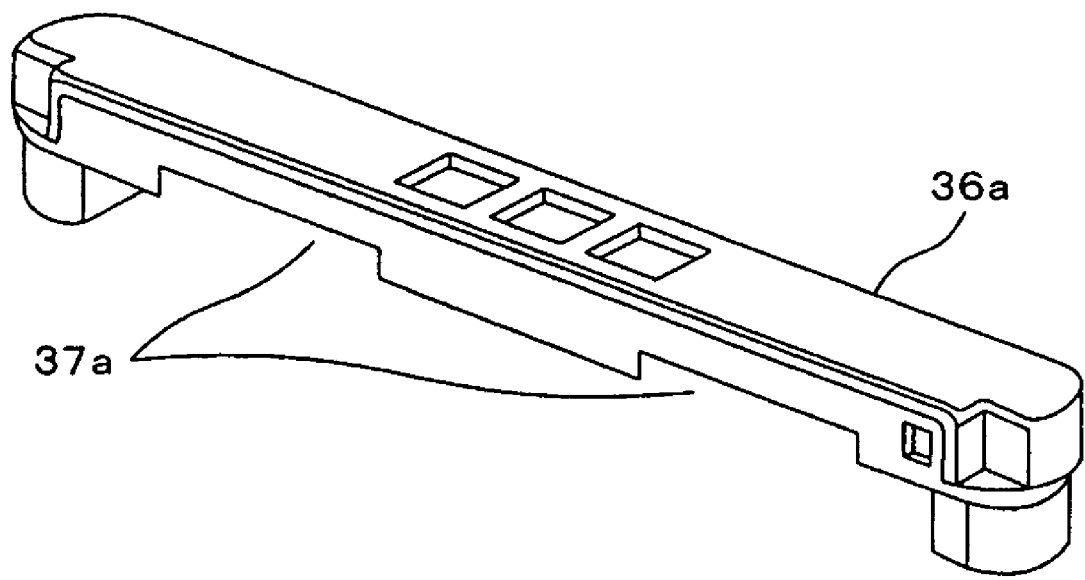
FIG. 30 is a perspective view showing the structure of an upper holder of a top cover used in a battery pack according to a third embodiment of the present invention.
Figure 31:
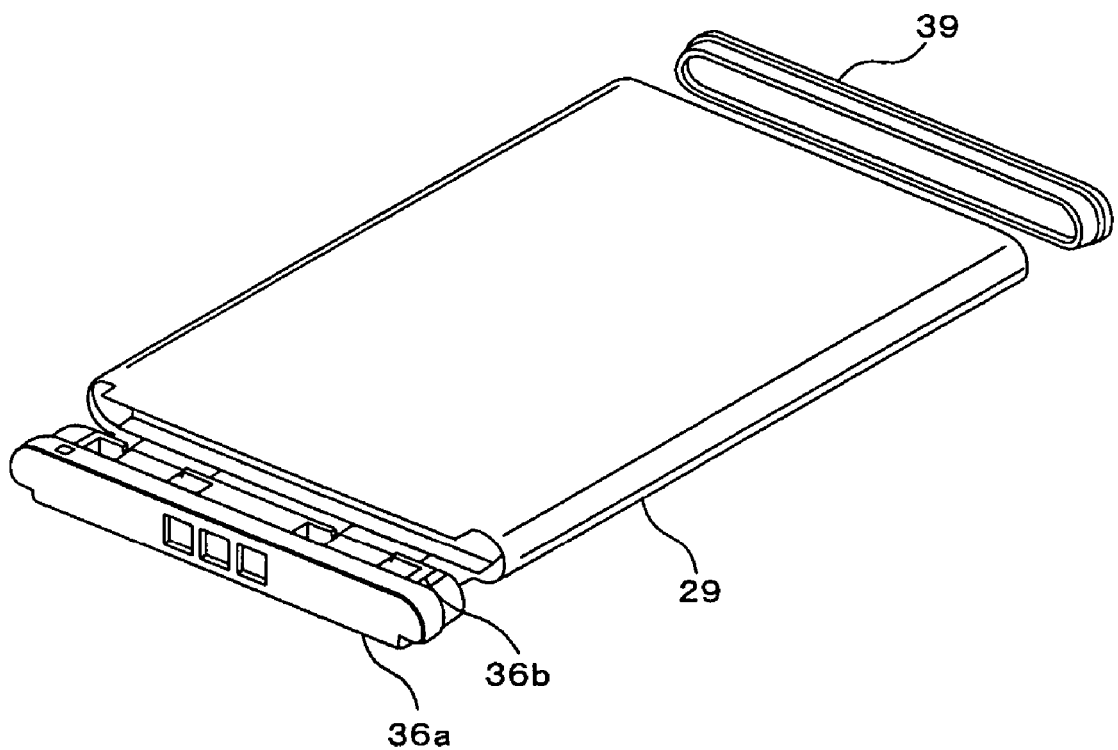
FIG. 31 is a perspective view showing an example of the structure of the battery pack according to the third embodiment of the present invention.

Thus, as shown in FIG. 30, according to the third embodiment invention, cut portions 37a are formed at a part of the upper holder 36a. The cut portions prevents the upper holder 36a from interfering with the electrode terminals 5. FIG. 31 shows an example of the structure of the battery pack according to the third embodiment of the present invention. In this battery pack, the top cover composed of the upper holder 36a and a lower holder 36b that will be described later is fitted to the opening portion of the hard laminate member. As a result, the stress to the electrode terminals and the increase of the thickness of the battery pack can be prevented. In the following description, similar portions to those of the first and second embodiments are denoted by similar reference numerals and their description will be omitted.

Figure 32:
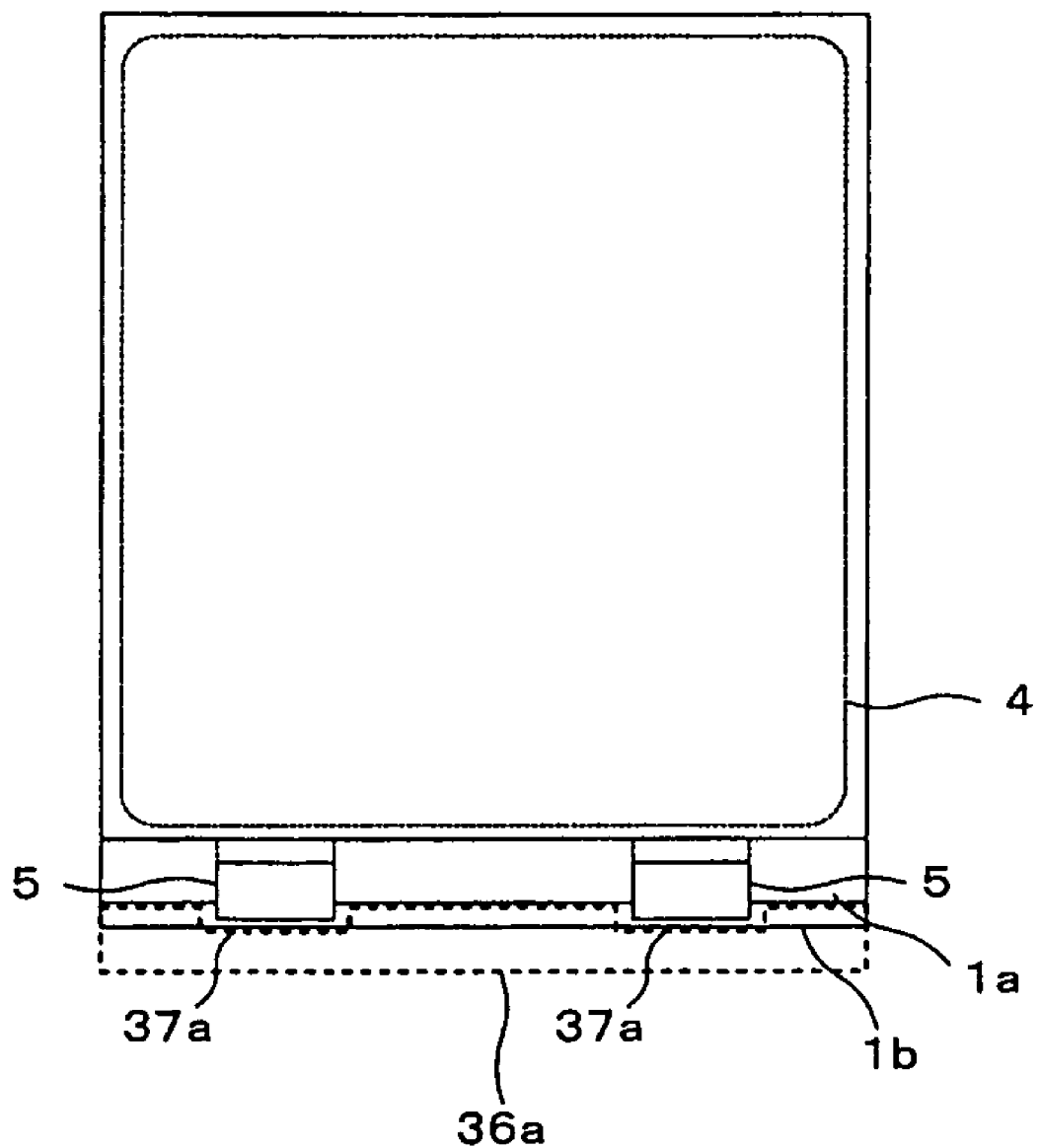
FIG. 32 is a plan view showing an electrode terminal lead portion of a battery cell in the state of which the top cover used in the battery pack according to the third embodiment of the present invention is fitted to the battery cell.

FIG. 32 shows the state of the electrode terminal lead portion in the case that the upper holder 36a shown in FIG. 30 is fitted to the soft laminate member 1a. As shown in FIG. 32, the fitting portion of the upper holder 36a is inserted into the end portion of the soft laminate member 1a. However, since the upper holder 36a has the cut portions 37a, the upper holder 36a does not interfere with the electrode terminals 5. Thus, since the upper holder 36a has the cut portions opposite to the electrode terminals 5, the space formed between the top cover 36 and the battery element 4 can be decreased. As a result, a battery pack of which the electrode terminals 5 do not interfere with the top cover 36 can be produced with sufficient heat adhesion strength.

When the thickness of the battery pack is small, the electrode terminals 5 interfere with the lower holder and the electrode terminals 5 protrude in the direction of the thickness of the battery pack. To prevent those, as shown in FIG. 33, cut portions 37b and 37c are formed on the bottom surface of the top cover 36 so that the cut portions 37b and 37c correspond to routing of the electrode terminals. As a result, the electrode terminals 5 are folded and contained in the cut portions 37b and 37c.

In this case, since the cut portions 37b and 37c are formed on the side surface portions of the bottom surface of the lower holder 36b, the area of the bottom surface that has the cut portions becomes small. As a result, the strength of the lower holder 36b decreases. In addition, when the lower holder 36b is molded from resin, the lower holder 36b tends to warp. To prevent this problem, as shown in FIG. 33, it is preferred that a protrusion wall be formed in the longitudinal direction of the bottom surface portion of the lower holder 36b with a thickness equal to or larger than the thickness of the bottom portion so as to maintain the strength and moldability of the lower holder 36b.

Figure 34A:
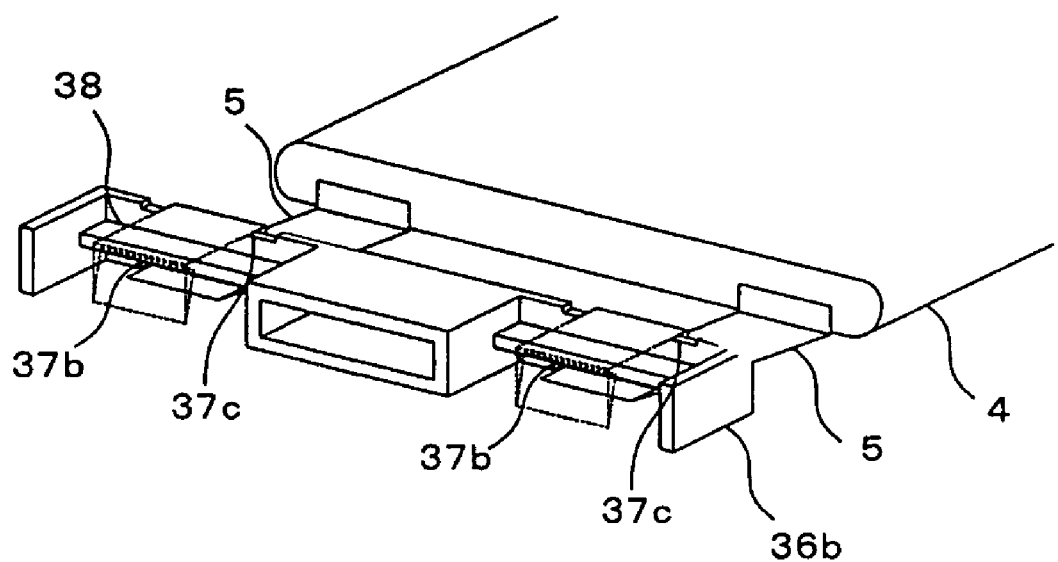
FIG. 34A and FIG. 34B are perspective views showing routing of electrode terminals in the battery pack according to the third embodiment of the present invention.
Figure 34B:
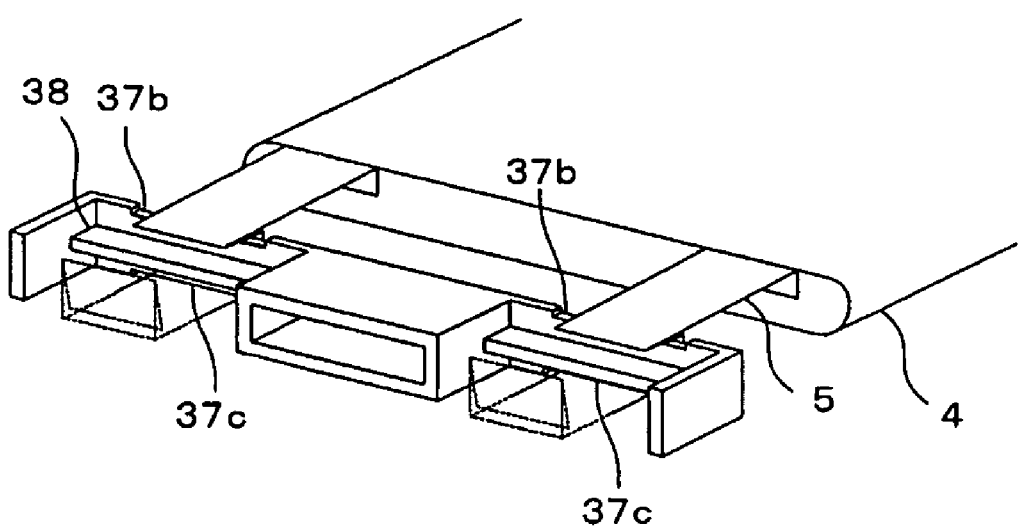

FIG. 34A and FIG. 34B show the layout of the lower holder 36b and the electrode terminals 5 in the state that the top cover is fitted to the hard laminate member. FIG. 34A shows the layout of the lower holder 36b and the battery element 4 in the state that the electrode terminal lead portion of the battery cell faces downward. FIG. 34B shows the layout of the lower holder 36b and the battery element 4 in the state that the electrode terminal lead portion of the battery cell faces upward. When the top cover is fitted to the hard laminate member, the position of the lower holder 36b is close to the battery element 4. In FIG. 34A and FIG. 34B, for clearness, the lower holder 36b and the battery element 4 are spaced apart.

FIG. 34A and FIG. 34B show that the cut portions 37b and 37c formed at predetermined positions of the lower holder 36b allow a space for the electrode terminals 5 to be secured and prevent the upper holder 36a from pressing the electrode terminals 5 and the thickness of the battery pack from increasing.

Figure 35:
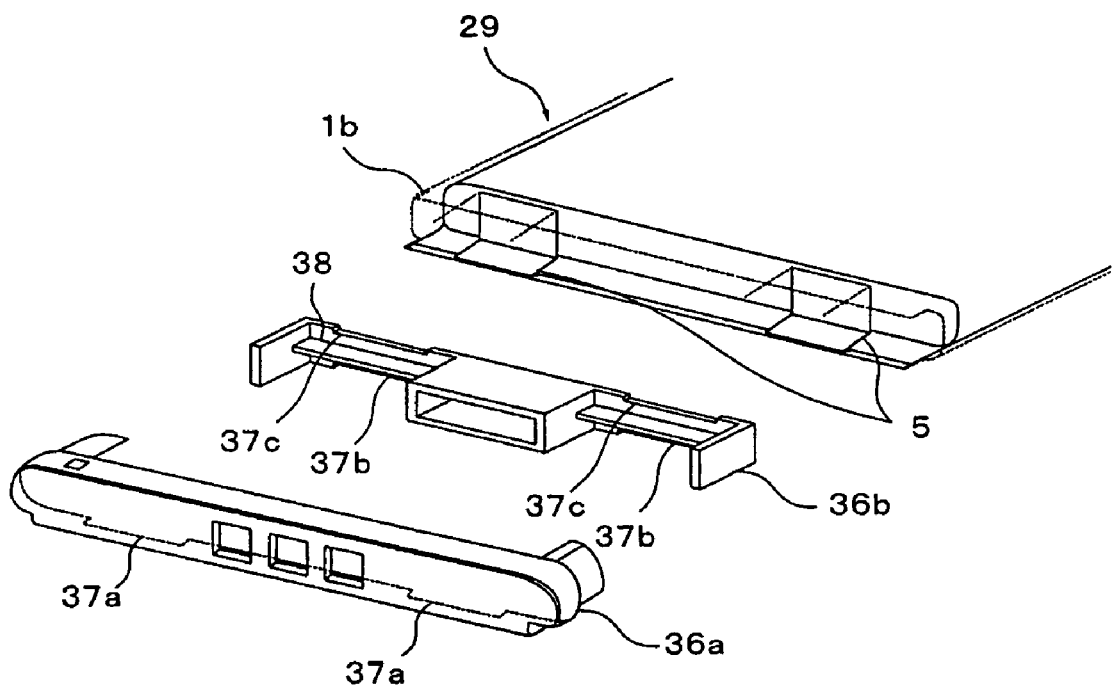
FIG. 35 is a perspective view showing the structure of the upper holder, the lower holder, and the battery cell according to the third embodiment of the present invention.

FIG. 35 shows the structure of the upper holder 36a, the lower holder 36b, and the battery cell 29 according to the third embodiment of the present invention. When the thickness of the battery pack is small, as shown in FIG. 35, with the top cover 36 having the cut portion 37a and the lower holder 36b having the cut portions 37b and 37c, these cut portions can more effectively prevent the top cover 36 and the lower holder 36b from pressing the electrode terminals.

When the thickness of the battery pack is relatively large, with the lower holder 36b that has a bottom surface portion whose thickness is smaller than the upper holder 36a, the same effect as the cut portions 37b and 37c of the lower holder 36b can be obtained. Thus, the cut portions 37b and 37c of the lower holder 36b can be omitted. When the thickness of the battery pack is large, since the thickness of the upper holder 36a is large, even if the upper holder 36a and the lower holder 36b are designed so that the thickness of the lower holder 36b is smaller than the thickness of the upper holder 36a, the strength of the battery pack is not adversely affected. Even if the thickness of the battery pack increases, the position of the electrode terminal lead portion does not change as long as the structure of the battery element according to this embodiment is used. Thus, the upper holder 36a needs to have the cut portion 37a.

Figure 36:
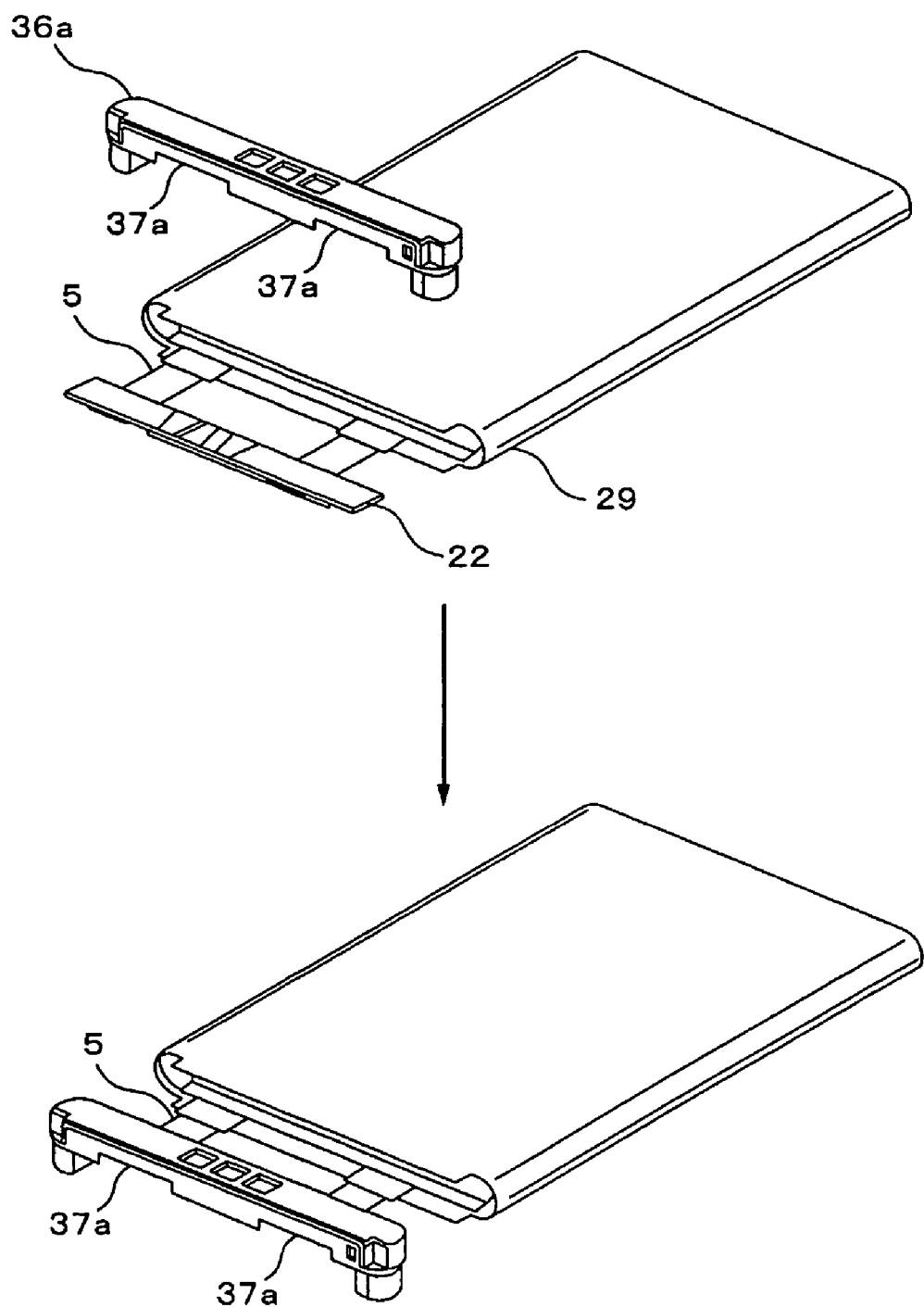
FIG. 36 is a perspective view showing the state of which the top cover produced according to the third embodiment of the present invention is fitted to the battery cell.
Figure 37:
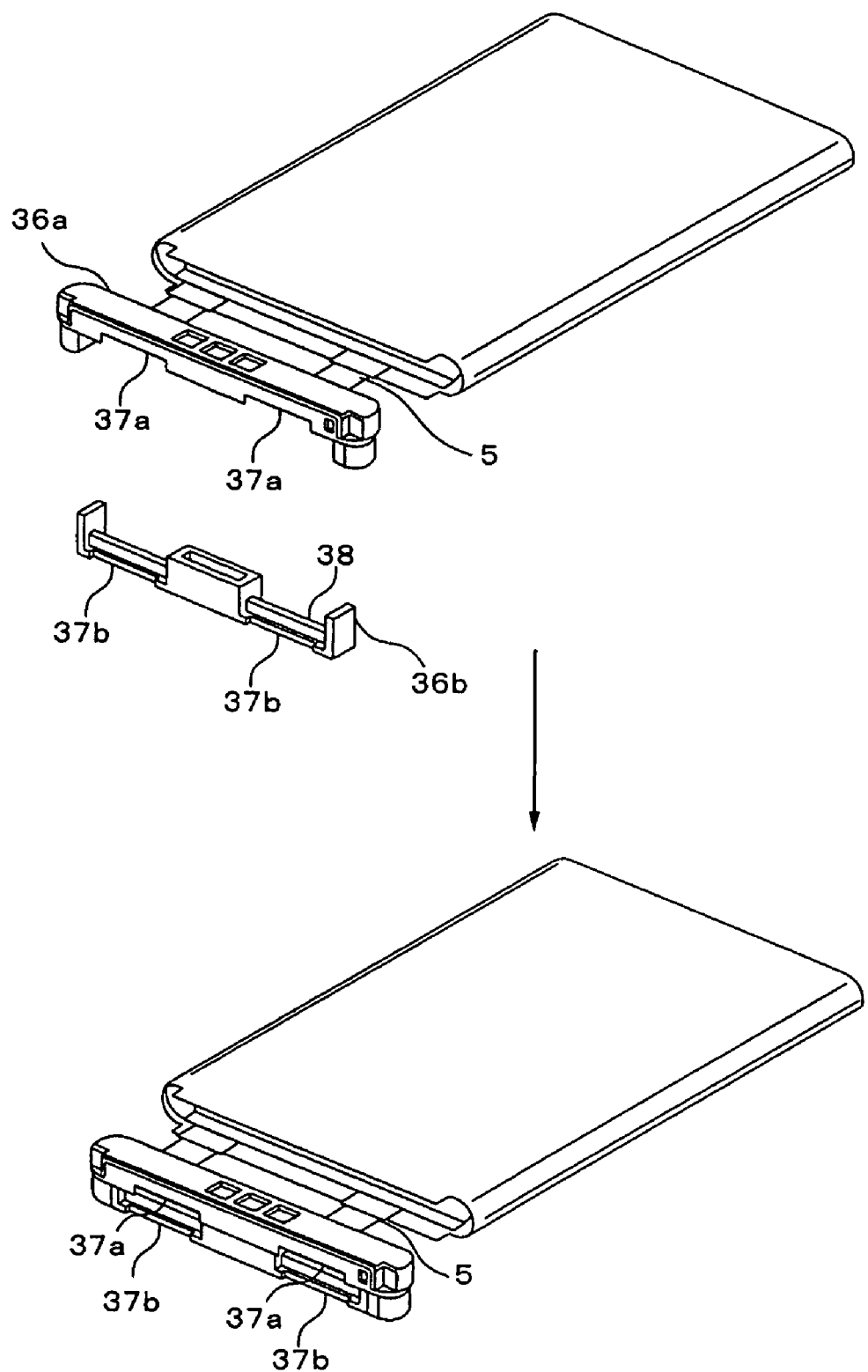
FIG. 37 is a perspective view showing the state of which the top cover produced according to the third embodiment of the present invention is fitted to the battery cell.
Figure 38:
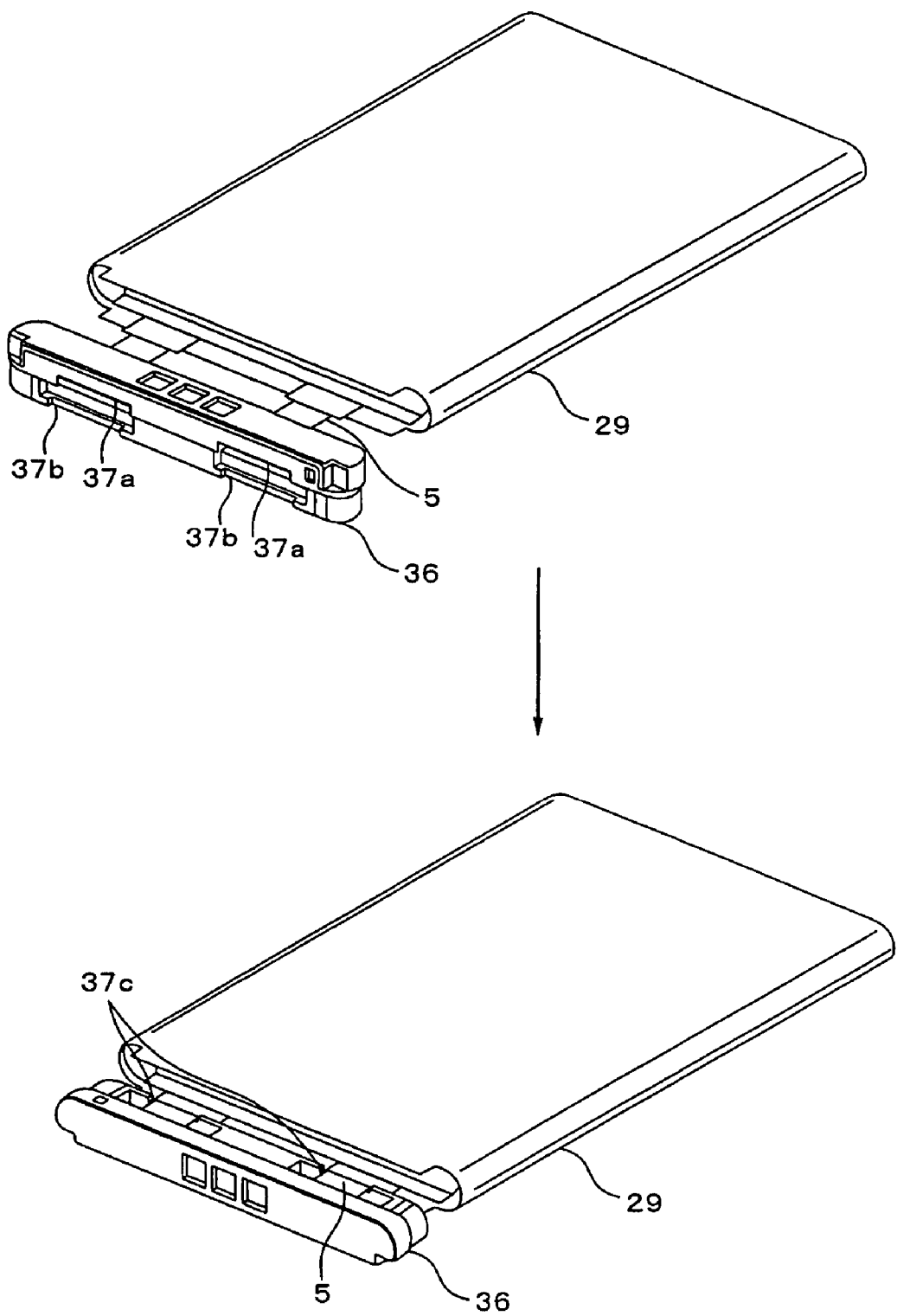
FIG. 38 is a perspective view showing the state of which the top cover produced according to the third embodiment of the preset invention is fitted to the battery cell.

Next, with reference to FIG. 36, FIG. 37, FIG. 38, FIG. 39A, FIG. 39B, FIG. 39C, and FIG. 39D, a process of steps that start with a step of which a circuit board is contained in a top cover and that end with a step of which the top cover is fitted to a hard laminate member 1b as an outer jacket member will be described. FIG. 36 to FIG. 38 are perspective views showing the step of which the top cover 36 is fitted to the hard laminate member 1b. FIG. 39A to FIG. 39D are sectional views showing the top cover 36 and the folded electrode terminals 5.

Figure 39A:
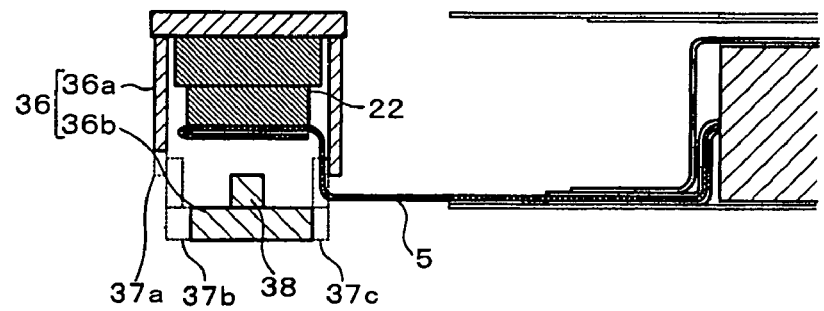
FIG. 39A, FIG. 39B, FIG. 39C, and FIG. 39D are sectional views showing the state of which the top cover produced according to the third embodiment of the preset invention is fitted to the battery cell.
Figure 39B:
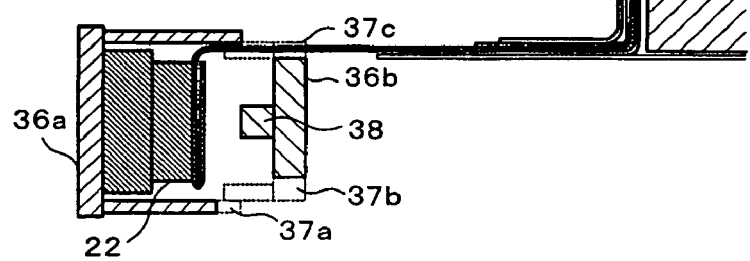
Figure 39C:
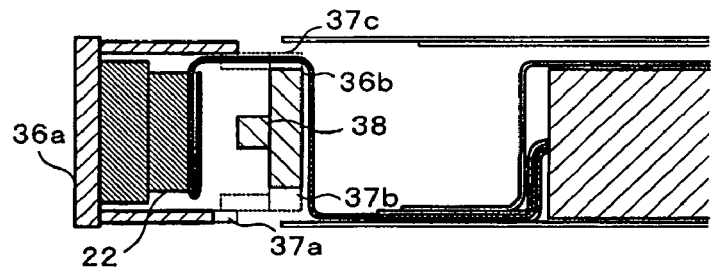

Firstly, as shown in FIG. 36, the upper holder 36a is placed above the circuit board 22 connected to the battery cell 29. Thereafter, as shown in FIGS. 37 and 39A, the lower holder 36b and the upper holder 36a are aligned and fitted so that the circuit board 22 is contained therebetween. Thereafter, as shown in FIG. 38 and FIG. 39B, the orientation of the top cover 36 is changed so that the lower holder 36b approaches the battery cell 29. After the top cover 36 is fitted to one opening portion of the battery cell 29 (see FIG. 39C and FIG. 39D), the top cover 36 and the outer jacket member of the battery cell 29 are heat-adhered. When the top cover 36 is fitted to the opening portion, the electrode terminals 5 are folded and contained in the cut portions 37b and 37c.

Figure 39D:
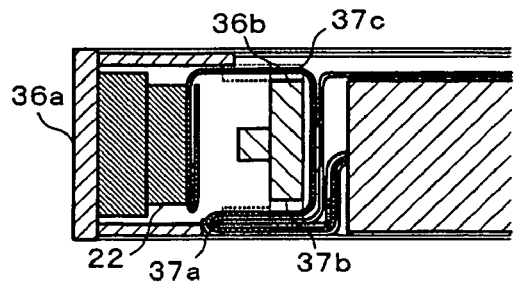

FIG. 39D shows that the cut portions 37a, 37b, and 37c of the upper holder 36a and the lower holder 36b prevent the upper holder 36a and the lower holder 36b from pressing the electrode terminal lead portion of the battery cell 29. As a result, the thickness of the battery pack can be effectively prevented from increasing. In addition, since the cut portion 37b of the lower holder 36b contains the folded electrode terminals 5, the cut portion 37b of the lower holder 36b need to have a space for the folded electrode terminals 5 coated with sealant 7. In contrast, since the cut portion 37c corresponds to routing of the electrode terminals 5, the cut portion 37c needs to have a space for the electrode terminals 5 coated with the sealant 7.

As shown in FIG. 31, the bottom cover 39 as a resin mold member produced at a different injection molding step is fitted to the opening portion opposite to the opening fitted to the top cover 36. The bottom cover 39 and the hard laminate member 1b as the outer jacket member of the battery cell 29 are heat-adhered. Instead, the bottom cover 39 and the outer jacket member may be connected by injecting hot resin material (hot melt agent) into the opening. When the hot resin is injected, it is necessary to prevent the circuit board from being thermally deformed and/or damaged.

In such a manner, a battery pack that has high quality and high yield with high volume efficiency, pressure resistance against the electrode terminals without increase of the thickness of the battery pack can be accomplished.

Next, test results for tests conducted for the battery pack according to the third embodiment will be described.

A test battery pack having a thickness of 3.97 mm was produced with a structure shown in FIG. 31. After the top cover and the outer jacket member were heat-adhered, the thickness of the heat-adhered portion of the battery pack was measured. 10 test battery packs were produced in each of the following conditions.

(1) The upper holder and the lower holder each have a cut portion.
(2) The upper holder has a cut portion, whereas the lower holder does not have a cut portion.
(3) The upper holder does not have a cut portion, whereas the lower holder has a cut portion.
(4) The upper holder and the lower holder do not have a cut portion.

The designed maximum thickness of each battery pack was 4.00 mm. After the top cover and the outer jacket member were heat-adhered, it was determined whether each test pack was good or no good. Table 1 shows the measured results of the thickness of each test battery pack of which the top cover and the outer jacket member were heat-adhered.

TABLE 3

| CUT PORTION OF UPPER HOLDER | | ○ | ○ | X | X |
|---|---|---|---|---|---|
| CUT PORTION OF LOWER HOLDER | | ○ | X | ○ | X |
| THICKNESS OF BATTERY (mm) | BATTERY 1 | 3.97 | 3.97 | 3.97 | 3.97 |
| | BATTERY 2 | 3.97 | 3.97 | 3.97 | 3.97 |
| | BATTERY 3 | 3.97 | 3.97 | 3.97 | 3.98 |
| | BATTERY 4 | 3.97 | 3.97 | 3.98 | 3.98 |
| | BATTERY 5 | 3.97 | 3.98 | 3.98 | 3.98 |
| | BATTERY 6 | 3.97 | 3.98 | 3.98 | 3.99 |
| | BATTERY 7 | 3.97 | 3.98 | 3.99 | 3.99 |
| | BATTERY 8 | 3.97 | 3.99 | 3.99 | 4.00 |
| | BATTERY 9 | 3.98 | 3.99 | 4.00 | 4.01 |
| | BATTERY 10 | 3.98 | 3.99 | 4.00 | 4.02 |

The test results represent that the thicknesses of some battery packs of type (4), namely both the upper holder and the lower holder do not have a cut portion, exceed the designed maximum thickness. However, the thicknesses of battery packs of types (1), (2), and (3) do not exceed the designed maximum thickness. In particular, battery packs of type (1) do not deviate in their thicknesses.

Next, with reference to the accompanying drawings, a fourth embodiment will be described. According to the fourth embodiment, a cut portion is formed at the center portion of a fitting rib of the lower holder. In addition, a trapezoidal circuit board support protrusion is disposed in parallel with or perpendicular to the longitudinal direction of the lower holder. As a result, resin can be sufficiently and equally injected into the top cover. In this embodiment, portions similar to those of the first embodiment, the second embodiment, and the third embodiment are denoted by similar reference numerals and their description will be omitted.

In addition, as will be described later, the lower holder 41 may be represented as a lower holder 41a, a lower holder 41b, a lower holder 41c, a lower holder 41d, or a lower holder 41e. In the following description, when it is not necessary to identify the lower holders 41a, 41b, 41c, 41d, and 41e, they are simply represented as the lower holder 41.

As shown in FIG. 40, a circuit board 22 is inserted into a free surface of the upper holder 40a. The upper holder 40a is mounted on the circuit board 22 so that the upper holder 40a covers the circuit board 22. The upper holder 40a has a hold portion that horizontally holds the circuit board 22. A plurality of for example three openings 21 are formed on the upper holder 40a at positions corresponding to contact portions 23 of the circuit board 22. The contact portions 23 extend outside through the openings 21. The width of the upper holder 40a is slightly smaller than the width of the opening on the end surface of the top of the battery cell 29.

Through-holes 26a and 26b are formed in the vicinity of both ends of the upper holder 40a so that the through-holes 26a and 26b do not interfere with the circuit board 22. The diameters of the through-holes 26a and 26b are in the range from $\phi 0.8$ mm to $\phi 1.5$ mm.

Figure 41:
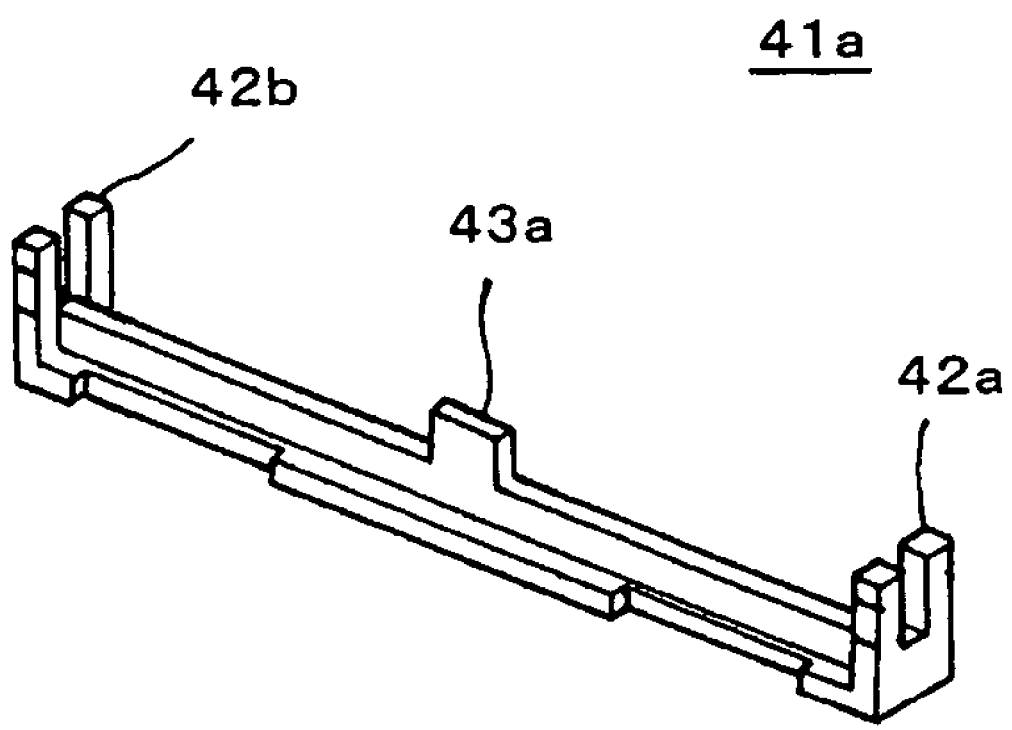
FIG. 41 is a perspective view showing a first example of a lower holder according to the fourth embodiment of the present invention.

The lower holder 41a is a resin mold member produced at for example a different injection molding step. In FIG. 41, reference numeral 41a represents a first example of the lower holder. Ribs 42a and 42b are formed at both ends of the lower holder 41a. The ribs 42a and 42b are fitted to the upper holder 40a. Cut portions are formed at the center portions of the ribs 42a and 42b.

In addition, a circuit board support protrusion 43a is formed nearly at the center of the lower holder 41a. The substrate support protrusion 43a has a surface in parallel with the longitudinal direction of the lower holder 41a. When the upper holder 40a and the lower holder 41a are fitted, the circuit board support protrusion 43a holds the circuit board 22 disposed therebetween.

Figure 43:
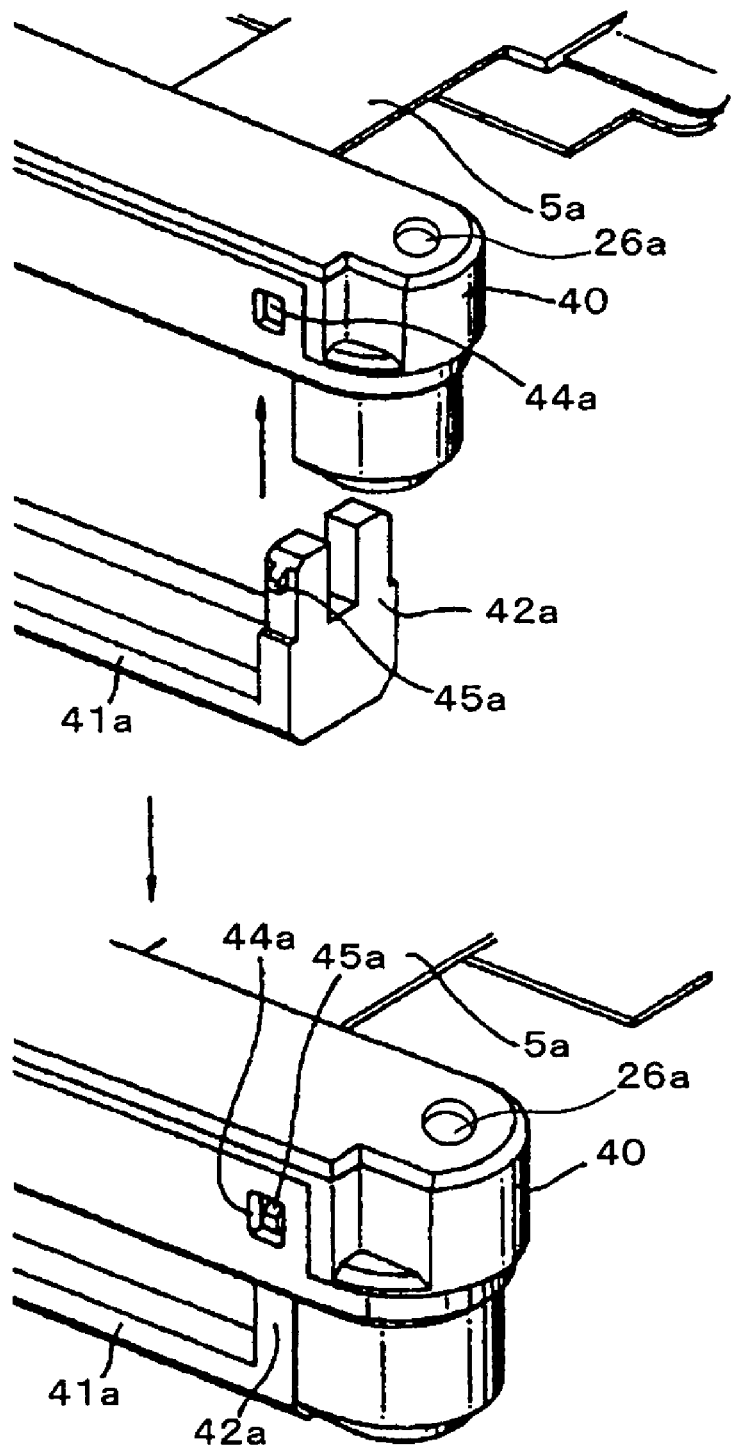
FIG. 43 is a perspective view showing details of a portion at which the upper holder and the lower holder are fitted according to the fourth embodiment of the present invention.

FIG. 42 shows the state of which the upper holder 40a and the lower holder 41a are fitted. The lower holder 41a is fitted to the upper holder 40a so that the circuit board 22 is placed therebetween. According to the fourth embodiment, the upper holder 40a and the lower holder 41a are fitted by a mechanical connection means. In other words, as shown in FIG. 43, the upper holder 40a has securing holes 44a and 44b. A hook 45a formed at the edge of the rib 42a of the lower holder 41a is inserted into the hole 44a. A hook 45b formed at the edge of the rib 42b of the lower holder 41a is inserted into the hole 44b. As a result, the upper holder 40a and the lower holder 41a are fitted.

Figure 44:
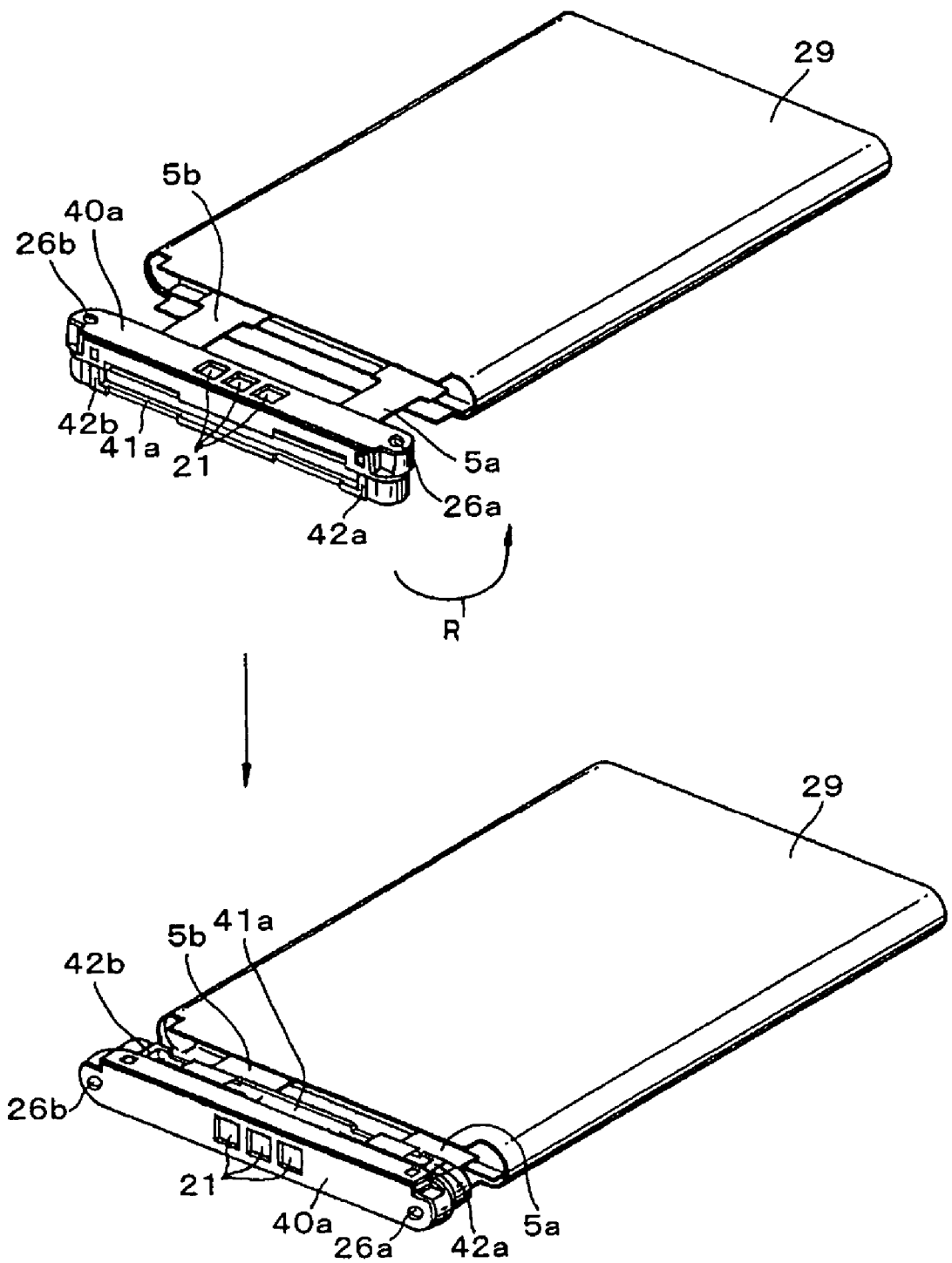
FIG. 44 is a perspective view showing the state of which the upper holder and the lower holder are inserted into an opening at an end surface of the battery cell according to the fourth embodiment of the present invention.

The upper holder 40a and the lower holder 41a that have been fitted are turned by hand or jig for 90 degrees in the counterclockwise direction as denoted by arrow R shown in FIG. 44. As a result, the orientation of the circuit board 22 is changed by 90 degrees. The circuit board 22 is held by the upper holder 40a and the lower holder 41a, not exposed outside. Thus, when the circuit board 22 is turned, it can be prevented from being contaminated and damaged by hand or jig.

Thereafter, the upper holder 40a and the lower holder 41a that have been fitted is inserted into the battery cell 29. Thereafter, hot melt resin is injected into the battery cell 29 through through-holes 26a and 26b. The injected hot melt resin allows the circuit board 22 to be held and the mechanical strength of the battery pack to be improved.

Figure 45:
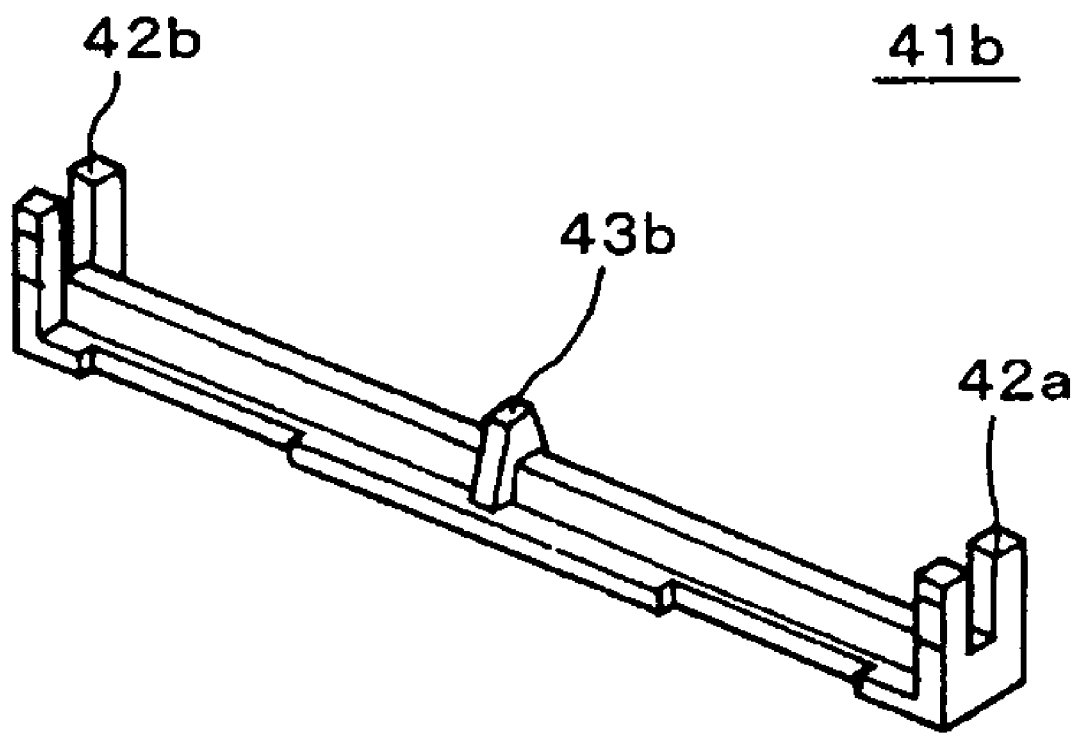
FIG. 45 is a perspective view showing a second example of the lower holder according to the fourth embodiment of the present invention.

In FIG. 45, reference numeral 41b represents a second example of the lower holder. The lower holder 41b has a circuit board support protrusion 43b integrally formed thereon. The circuit board support protrusion 43b has a surface perpendicular to the longitudinal direction of the lower holder 41b. The circuit board support protrusion 43b is formed in a trapezoidal shape of which the edge of the circuit board support protrusion 43b tapers. Thus, since the circuit board support protrusion decreases the resistance of the hot melt resin, the injection property of the resin can be improved.

Figure 46:
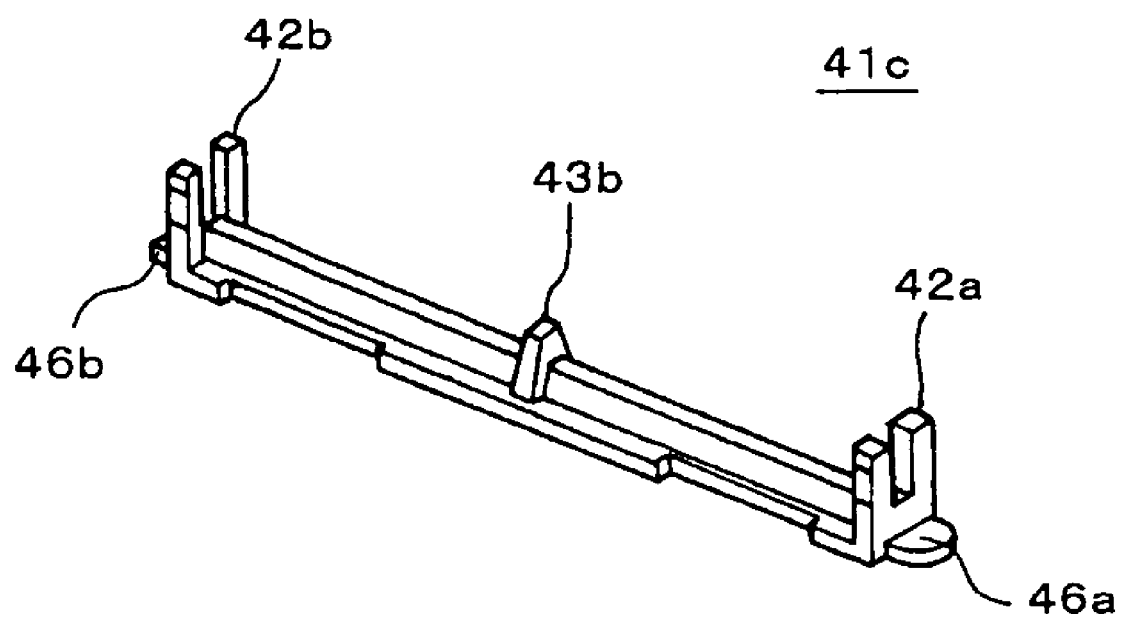
FIG. 46 is a perspective view showing a third example of the lower holder according to the fourth embodiment of the present invention.

Next, a third example of the lower holder will be described. As the third example, as shown in FIG. 46, protrusion portions 46a and 46b protrude from ribs at both ends of the lower holder in the longitudinal direction of the lower holder 41c. The lower holder 41c allows the injection property of the hot melt resin to be more improved than the foregoing examples.

Figure 47:
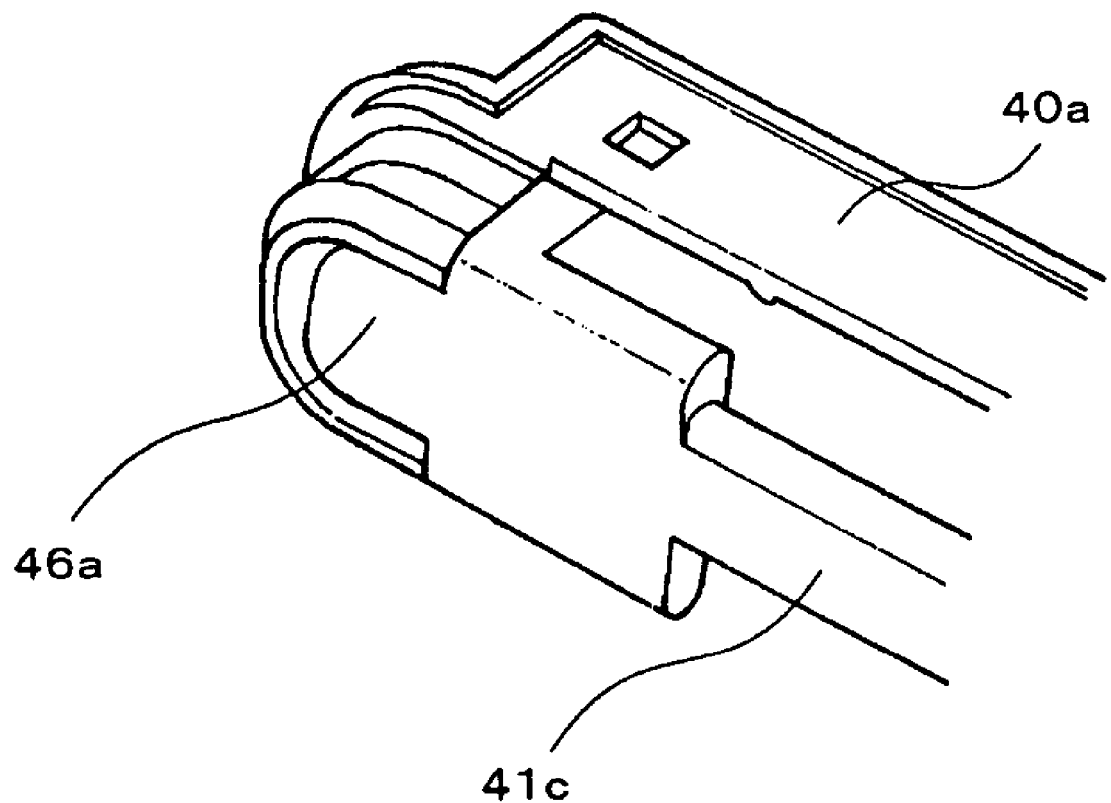
FIG. 47 is an enlarged perspective view showing the vicinity of a through-hole of the lower holder in the state of which the upper holder and the lower holder are fitted according to the fourth embodiment of the present invention.

In other words, when the upper holder 40a and the lower holder 41c are fitted, the protrusion portions 46a and 46b face through-holes 26a and 26b of the upper holder 40a, respectively. FIG. 47 is a bottom perspective view showing the vicinity of the through-hole 26a in the state that the upper holder 40a and the lower holder 41c are fitted. As shown in FIG. 47, since the lower holder 41c and the upper holder 40a are fitted so that the protrusion portion 46a of the lower holder 41c covers the through-hole 26a of the upper holder 40a, the hot melt resin can be equally injected. As a result, the injection property of the resin can be improved.

When a metal pin is inserted into the battery pack through one of the through-holes 26a and 26b, the protrusion portions 46a and 46b can prevent the metal pin from contacting the battery element 4. As a result, the protrusion portions 46a and 46b can prevent a shortcircuit from occurring.

Next, test results of drop tests conducted for the battery pack according to the fourth embodiment will be described. The drop tests were conducted by dropping the battery pack from a height of 1.5 m to a concrete floor in the state that a top cover 40 faced downward and abnormality and peer-off of the top cover 40 and the outer jacket member were checked.

Figure 48:
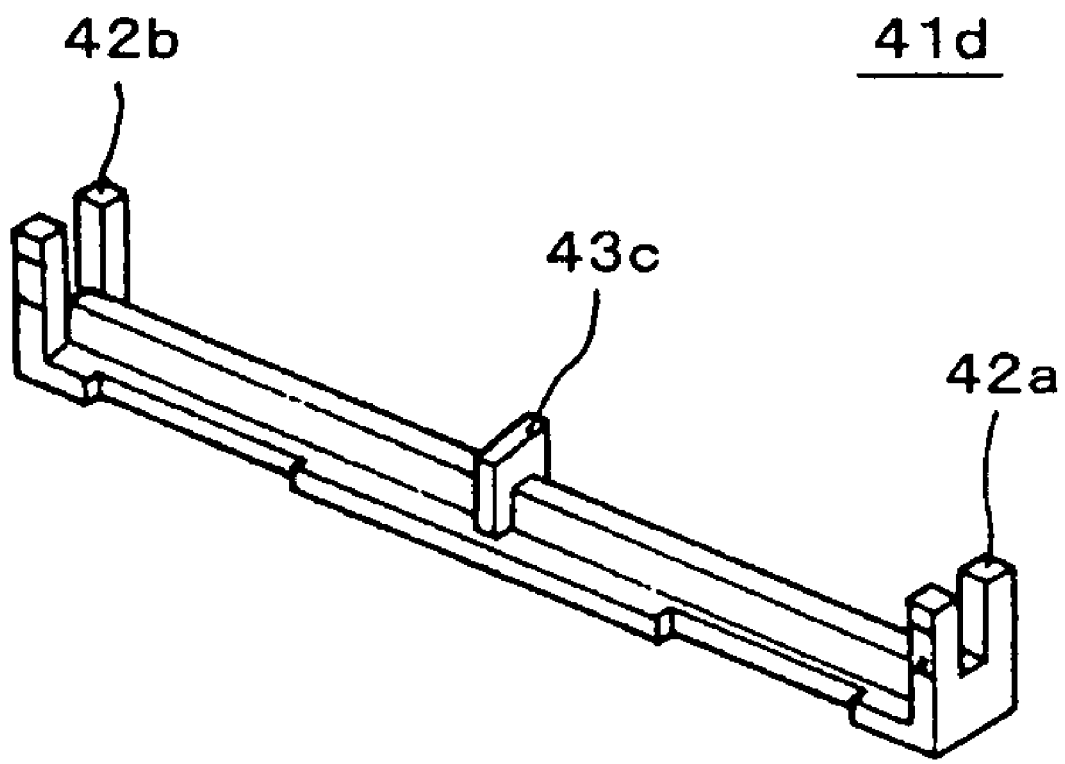
FIG. 48 is a perspective view showing an example of the shape of the lower holder according to the fourth embodiment of the present invention.
Figure 49:
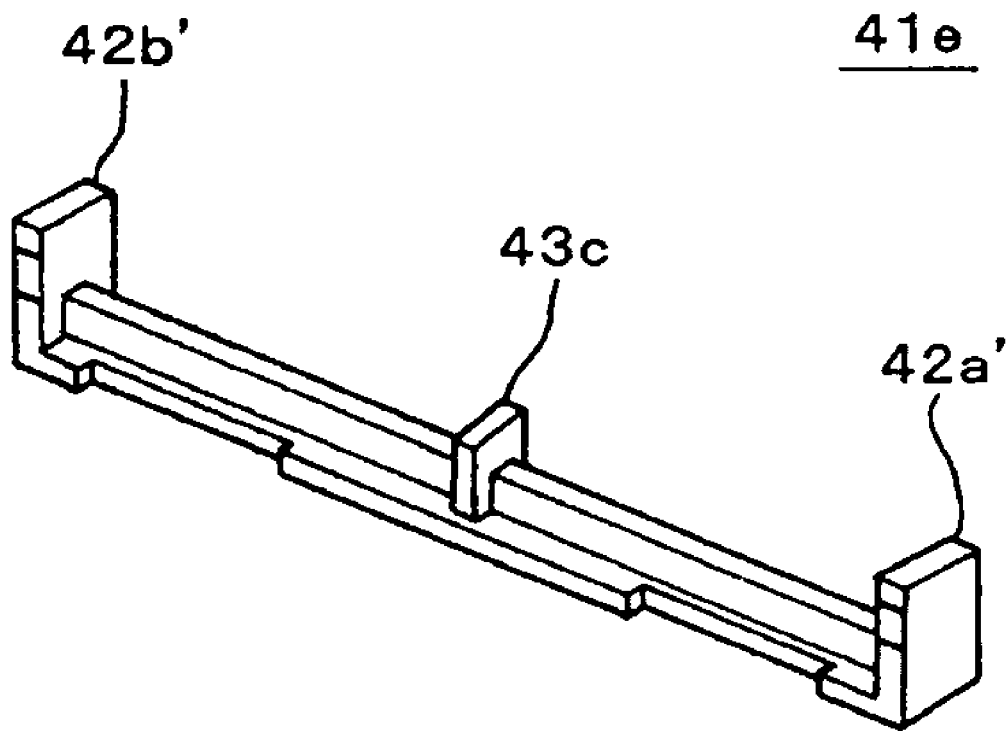
FIG. 49 is a perspective view showing an example of the shape of the lower holder used in a battery pack of related art.

50 battery packs that had each of the lower holder 41a, the lower holder 41b, the lower holder 41c, the lower holder 41d shown in FIG. 48, and the lower holder 41e shown in FIG. 49 were produced and tested. The lower holder 41d had the ribs 42a and 42b at both ends in the longitudinal direction. The ribs 42a and 42b were fitted to the top cover 40a. Cut portions were formed at center portions of the ribs 42a and 42b. Cut portions are formed at center portions of the ribs 42a and 42b. A circuit board support protrusion 43c was integrally formed on the lower holder 41d. The circuit board support protrusion 43c had a rectangular surface. The rectangular surface was formed in the vicinity of the center of the lower holder 41d. The rectangular surface was formed perpendicular to the longitudinal direction of the lower holder 41d.

The lower holder 41e is used in the battery pack of the related art. Ribs 42a' and 42b' that were fitted to the top cover 40a were formed at both ends of the lower holder 41e. A circuit board support protrusion 43c was integrally formed on the lower holder 41e. The circuit board support protrusion 43c had a rectangular surface. The rectangular surface was formed in the vicinity of the center of the lower holder 41e. The rectangular surface was formed perpendicular to the longitudinal direction of the lower holder 41e. Table 4 shows test results of drop tests.

TABLE 4

| TYPE OF LOWER HOLDER | NUMBER OF BATTERY PACKS IN WHICH CIRCUIT ABNORMALITY OCCURRED | STATE | | |
| --- | --- | --- | --- | --- |
| | | A | B | C |
| 41a | 0/50 | 0/50 | 6/50 | 44/50 |
| 41b | 0/50 | 5/50 | 12/50 | 33/50 |
| 41c | 0/50 | 1/50 | 8/50 | 41/50 |
| 41d | 0/50 | 8/50 | 20/50 | 22/50 |
| 41e | 7/50 | 12/50 | 23/50 | 15/50 |

The "number of battery packs in which circuit abnormality occurred" represents the number of battery packs having circuit board 22 in which abnormality was detected. The "state" represents the number of battery packs whose top cover 40 was deformed. The "state" is subdivided into "state A" to "state C" depending on the peel-off degree of the top cover 40 and the outer jacket member. The "state A" represents the number of battery packs of which the peel-off degree of the top cover 40 was ¾ or more of the outer periphery including the removable of the top cover 40. The "state B" represents the number of battery packs of which the peel-off degree of the top cover 40 was ½ to ¾ of the outer periphery. The "state C" represents the number of battery packs of which the peel-off degree of the top cover 40 was less than ½ of the outer periphery. In table 4, "*/50" represents the number of battery packs in which the abnormality of the circuit board or one of the "state A" to the "state C" took place in drop tests of 50 battery packs that were produced with each of the lower holders 41a to 41e. In the battery packs that used the lower holder 41a to lower holder 41d, abnormality of the circuit substrate did not occur. In seven of 50 battery packs that used the lower holder 41e, abnormality of the circuit substrate occurred. In the drop tests for battery packs that used the lower holder 41a, the "state A" of the peel-off degree of the top cover 40 and the outer jacket member did not occur. In six of 50 battery packs that used the lower holder 41a, the "state B" occurred. In 44 of 50 battery packs that used the lower holder 41a, the "state C" occurred.

As the test results of the drop tests, in battery packs that used the lower holder 41a, abnormality of the circuit board 22 did not occur. In addition, the "state A" did not occur. In battery packs that used the lower holders 41b and 41c, abnormality of the circuit board 22 did not occur. In one or several of 50 battery packs, the "state A" occurred. The peel-off degrees of the other battery packs were relatively small.

In battery packs that used the lower holder 41d, abnormality of the circuit board 22 did not occur. The peel-off degree of the top cover 40 in battery packs that used the lower holder 41d was larger than that in battery packs that used the lower holder 41a to lower holder 41c. In some of battery packs that used the lower holder 41e, abnormality of the circuit board 22 occurred. In battery packs that used the lower holder 41e, the peel-off degree of the top cover 40 was the largest in battery packs that used the other lower holders 41a to 41d.

The battery packs that used the five types of lower holders 41 were disassembled and the inside of the battery packs was checked. In battery packs that used the lower holder 41e, resin was not sufficiently injected into the battery packs and many of them had large cavities.

The first embodiment, the second embodiment, the third embodiment, and the fourth embodiment were described. However, the present invention is not limited to these embodiments. Instead, various modification according to the spirit of the present invention may be made.

For example, the values used in the foregoing first embodiment, the second embodiment, the third embodiment, and the fourth embodiment are just examples. When necessary, other values may be used.

The aluminum (Al) foil used for the hard laminate member and the soft laminate member are not limited to the foregoing example. Instead, various materials may be used. In particular, as the hard laminate member, besides JIS 1100H group, other hard aluminum materials such as 2000 group, 5000 group, and 6000 group may be used.

Figure 50:
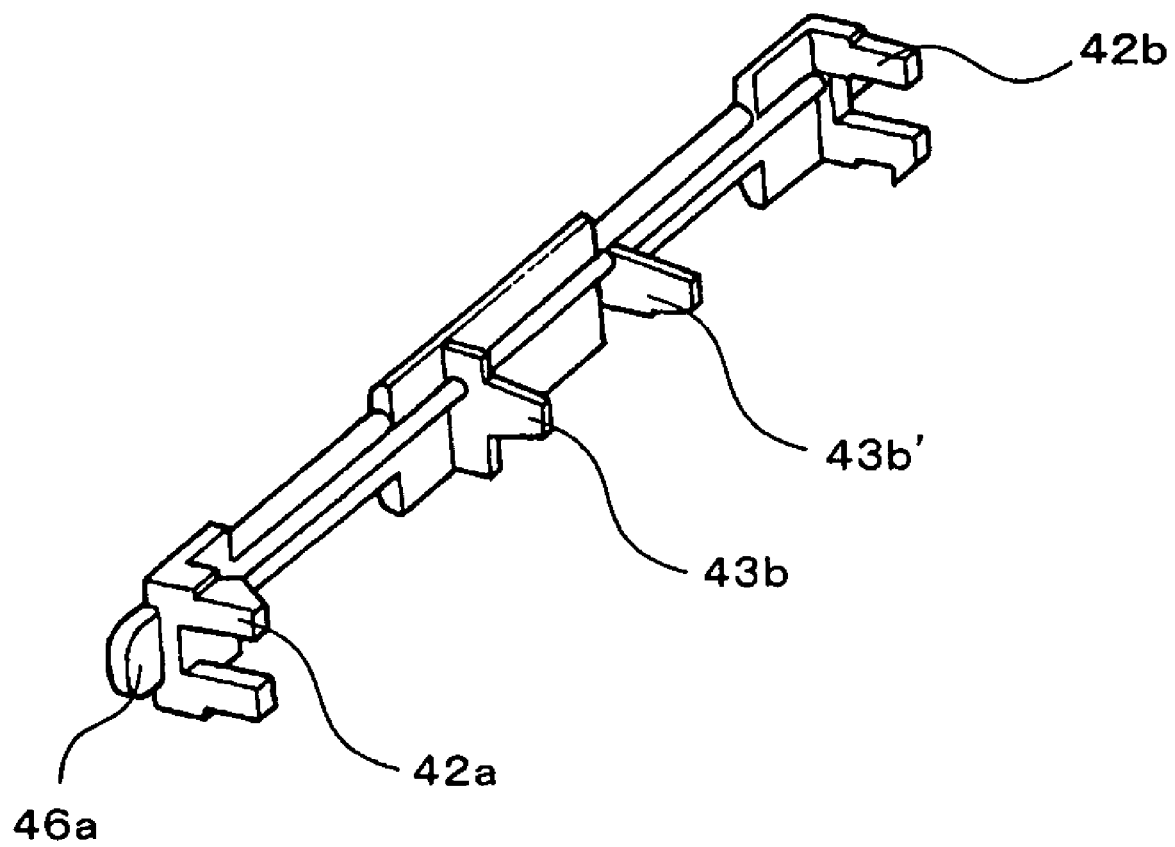
FIG. 50 is a perspective view showing an example of the shape of a lower holder that has a plurality of circuit board hold protrusions.

In addition, when necessary, a plurality of the substrate support protrusions 43a and 43b may be formed. As shown in FIG. 50, when a plurality of substrate support protrusions 43a and 43b are formed, they may securely support the circuit board 22.

It should be understood by those skilled in the art that various modifications, combinations, sub-combinations and alternations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A box-shaped or plate-shaped battery pack, comprising:
an outer jacket member composed of a first laminate member and a second laminate member, the outer jacket member having a first opening formed at a first end and a second opening formed at a second end;
a box-shaped or plate-shaped battery element that is contained in the outer jacket member and that has electrode terminals having leads;
a cover that is molded from resin and that is fitted to the first opening; and
a circuit board connected to the electrode terminal leads and contained in the cover,
wherein at least the electrode terminal leads extend from the first opening;
wherein the cover has concave portions on both ends of a longer side,
wherein the outer jacket member has cut portions that expose at least the concave portions of the cover,
wherein at least the longer side of the cover and the outer jacket member are heat-adhered,
wherein the first laminate member has a concave portion that contains the battery element and the first laminate member and the second laminate member are layered so that the second laminate member covers an opening of the concave portion, a periphery of the concave portion being sealed, and
wherein a heat adhesive sheet is disposed on an outer surface of the concave portion of the first laminate member, and wherein opposite sides of the heat adhesive sheet contact a nylon or polyethylene terephthalate layer of the first laminate member,
wherein two end surfaces of the first laminate member meet to form a first joint on a first side of the heat adhesive sheet, wherein two end surfaces of the second laminate member meet to form a second joint on the first side of the adhesive sheet, and the first joint and the second joint are offset by a predetermined distance.

2. The battery pack according to claim 1, wherein the first end of the outer jacket member protrudes from an end of the battery element by about the thickness of the cover through the opening fitted to the cover, and wherein a heat adhesive layer is disposed inside the protruded portion of the outer jacket member.

3. The battery pack according to claim 1, wherein the electrode terminal leads connected to the battery element extend from the sealed portion of the concave portion, wherein ends of the first laminate member and the second laminate member are connected outside a bottom of the concave portion of the first laminate member, and wherein when viewed from a front of the first opening, short sides of the first laminate member and the second laminate member protrude in an elliptical arc shape.

4. The battery pack according to claim 1, wherein surfaces of the electrode terminal leads are coated with resin pieces that have an adhesive property with respect to the first and second laminate members.

5. The battery pack according to claim 1, wherein the two end surfaces of the first laminate member contact one another at the first joint.

6. The battery pack according to claim 1, wherein the two end surfaces of the first laminate member have a short gap between one another at the first joint.

* * * * *